United States Patent
Nomura et al.

(10) Patent No.: US 6,792,471 B2
(45) Date of Patent: Sep. 14, 2004

(54) PROCESS AND APPARATUS FOR SPEEDING UP LAYER 2 AND LAYER 3 ROUTING BY DETERMINING LAYER 2 REACH ABILITY BY DETERMINING WHETHER LAYER 2 SUBNETWORKS ARE IDENTICAL

(75) Inventors: Yuji Nomura, Kawasaki (JP); Naoki Oguchi, Kawasaki (JP); Tetsumei Tsuruoka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 80 days.

(21) Appl. No.: 09/888,388

(22) Filed: Jun. 25, 2001

(65) Prior Publication Data

US 2001/0039591 A1 Nov. 8, 2001

Related U.S. Application Data

(62) Division of application No. 09/094,061, filed on Jun. 9, 1998, now Pat. No. 6,304,912.

(30) Foreign Application Priority Data

Jul. 24, 1997 (JP) ............................................. 9-231674
Jul. 24, 1997 (JP) ............................................. 9-231675

(51) Int. Cl.$^7$ ............................................... G06F 15/16
(52) U.S. Cl. ...................... 709/238; 709/227; 709/237; 709/239; 709/245; 709/246; 370/392; 370/400; 370/401
(58) Field of Search ............................... 709/227, 237, 709/238, 239, 245, 246; 370/392, 400, 401

(56) References Cited

U.S. PATENT DOCUMENTS

| 5,491,694 | A | | 2/1996 | Oliver |
| 5,509,123 | A | | 4/1996 | Dobbins |
| 5,515,508 | A | | 5/1996 | Pettus |
| 5,544,316 | A | | 8/1996 | Carpenter |
| 5,557,748 | A | | 9/1996 | Norris |
| 5,588,121 | A | | 12/1996 | Reddin |
| 5,600,644 | A | | 2/1997 | Chang |
| 5,612,959 | A | * | 3/1997 | Takase et al. |
| 5,617,421 | A | * | 4/1997 | Chin et al. |
| 5,625,793 | A | * | 4/1997 | Mirza |
| 5,640,394 | A | | 6/1997 | Schrier |
| 5,706,434 | A | | 1/1998 | Kremen |
| 5,710,908 | A | | 1/1998 | Man |

(List continued on next page.)

OTHER PUBLICATIONS

Mr. Laubach, "Classical IP and ARP over ATM", Request for comments: 1577, Jan. 1994.

(List continued on next page.)

Primary Examiner—Rupal Dharia
Assistant Examiner—Stephen Willett
(74) Attorney, Agent, or Firm—Katten Muchin Zavis Rosenman

(57) ABSTRACT

A communication apparatus contains a first table having entries each storing a data-link-layer path to a second communication apparatus, and a second table storing a pointer to the entry of the first table, storing the data-link-layer path to the second communication apparatus, corresponding to a network-layer address of one of the at least one other communication apparatus. In addition, a process for determining layer-2 reachability between first and second communication apparatuses, identifies first and second layer-2-connected communication networks to which first and second interfaces of first and second routers are connected, where, on a layer-3 communication path between the first and second communication apparatuses, the first router is located nearest the first communication apparatus and the second router is located nearest the second communication apparatus. When first and second layer-2-connected communication networks are identical, the layer-2 reachability is determined.

44 Claims, 46 Drawing Sheets

U.S. PATENT DOCUMENTS

| | | | |
|---|---|---|---|
| 5,721,819 | A | 2/1998 | Galles |
| 5,801,942 | A | 9/1998 | Nixon |
| 5,802,316 | A | 9/1998 | Ito |
| 5,835,710 | A | 11/1998 | Nagami |
| 5,841,769 | A | 11/1998 | Okanoue |
| 5,845,086 | A | 12/1998 | Doebrich |
| 5,845,091 | A * | 12/1998 | Dunne et al. |
| 5,854,901 | A | 12/1998 | Cole |
| 5,881,246 | A | 3/1999 | Crawley |
| 5,905,872 | A | 5/1999 | DeSimone |
| 5,909,441 | A * | 6/1999 | Alexander, Jr. et al. |
| 5,918,016 | A | 6/1999 | Brewer |
| 5,920,566 | A * | 7/1999 | Hendel et al. |
| 5,920,705 | A * | 7/1999 | Lyon et al. |
| 5,922,063 | A | 7/1999 | Olnowich |
| 5,938,736 | A | 8/1999 | Muller |
| 5,940,596 | A | 8/1999 | Rajan |
| 5,964,841 | A | 10/1999 | Relhter |
| 5,991,299 | A | 11/1999 | Radogna |
| 5,996,021 | A * | 11/1999 | Civanlar et al. ............ 709/238 |
| 6,006,272 | A | 12/1999 | Aravamudan |
| 6,014,380 | A * | 1/2000 | Hendel et al. |
| 6,081,522 | A * | 6/2000 | Hendel et al. |
| 6,115,378 | A * | 9/2000 | Hendel et al. |
| 6,147,993 | A * | 11/2000 | Kloth et al. |
| 6,157,644 | A * | 12/2000 | Bernstein et al. ........... 370/392 |
| 6,172,981 | B1 * | 1/2001 | Cox et al. |
| 6,178,171 | B1 * | 1/2001 | Alexander, Jr. et al. |
| 6,189,041 | B1 * | 2/2001 | Cox et al. ................... 709/238 |
| 6,195,356 | B1 * | 2/2001 | Anello et al. |
| 6,247,044 | B1 * | 6/2001 | Gosling et al. ............. 709/203 |
| 6,262,988 | B1 * | 7/2001 | Vig |
| 6,304,912 | B1 * | 10/2001 | Oguchi et al. |
| 6,338,089 | B1 * | 1/2002 | Quinlan ...................... 709/227 |
| 6,343,322 | B2 * | 1/2002 | Nagami et al. ............. 709/227 |
| 6,480,894 | B1 * | 11/2002 | Courts et al. ............... 709/227 |
| 6,490,622 | B1 * | 12/2002 | Nagami et al. ............. 709/225 |
| 6,515,999 | B1 * | 2/2003 | Nagami et al. ............. 370/409 |
| 6,598,080 | B1 * | 7/2003 | Nagami et al. ............. 709/227 |
| 6,611,528 | B1 * | 8/2003 | Farinacci et al. ........... 370/432 |
| 6,625,662 | B1 * | 9/2003 | Satoh et al. ................ 709/250 |
| 6,640,243 | B1 * | 10/2003 | Phillips et al. .............. 709/206 |

OTHER PUBLICATIONS

James V. Luciani, "NBMA Next Hop Resolution protocol (NHRP)", Routing over Large Cloud Working Group, Internet–Draft, <draft–ieft–rolo–nhrp–Ext>, probably issued in Mar. 1997.

Michael Beck "LINUX Kernal Internal", Addison Wesley Longman, 1996, pp. 222 –258.

A relevant portion of the source code of the current version (version2.0.14) of Linux (updated: Aug. 18, 1996), with a concise explanation of the relevance (English translation of the inventor's comments).

Yuji Nomura, Tetsumei Tsuruoka, Naoki Oguchi, and Satoshi Nojima, "NHRP implementation and evaluation— problem and solutions—", Proceedings 2 of the 1997 Communications Society Conference of IEICE, The Institute of Electronic, Information and Communications Engineers in Japan, B–7–41, pp. 119, Sep. 3, 1997, with its English translation.

Naoki Oguchi, Tetsumei Tsuruoka, Yuji Nomura, and Satoshi Nojima, "NHRP implementation and evaluation— kernel implementation—", Proceedings 2 of the 1997 Communications Society Conference of IEICE, The Institute of Electronic, Information and Communications Engineers in Japan, B–7–42, pp. 120, Sep. 3, 1997, with its English translation.

\* cited by examiner

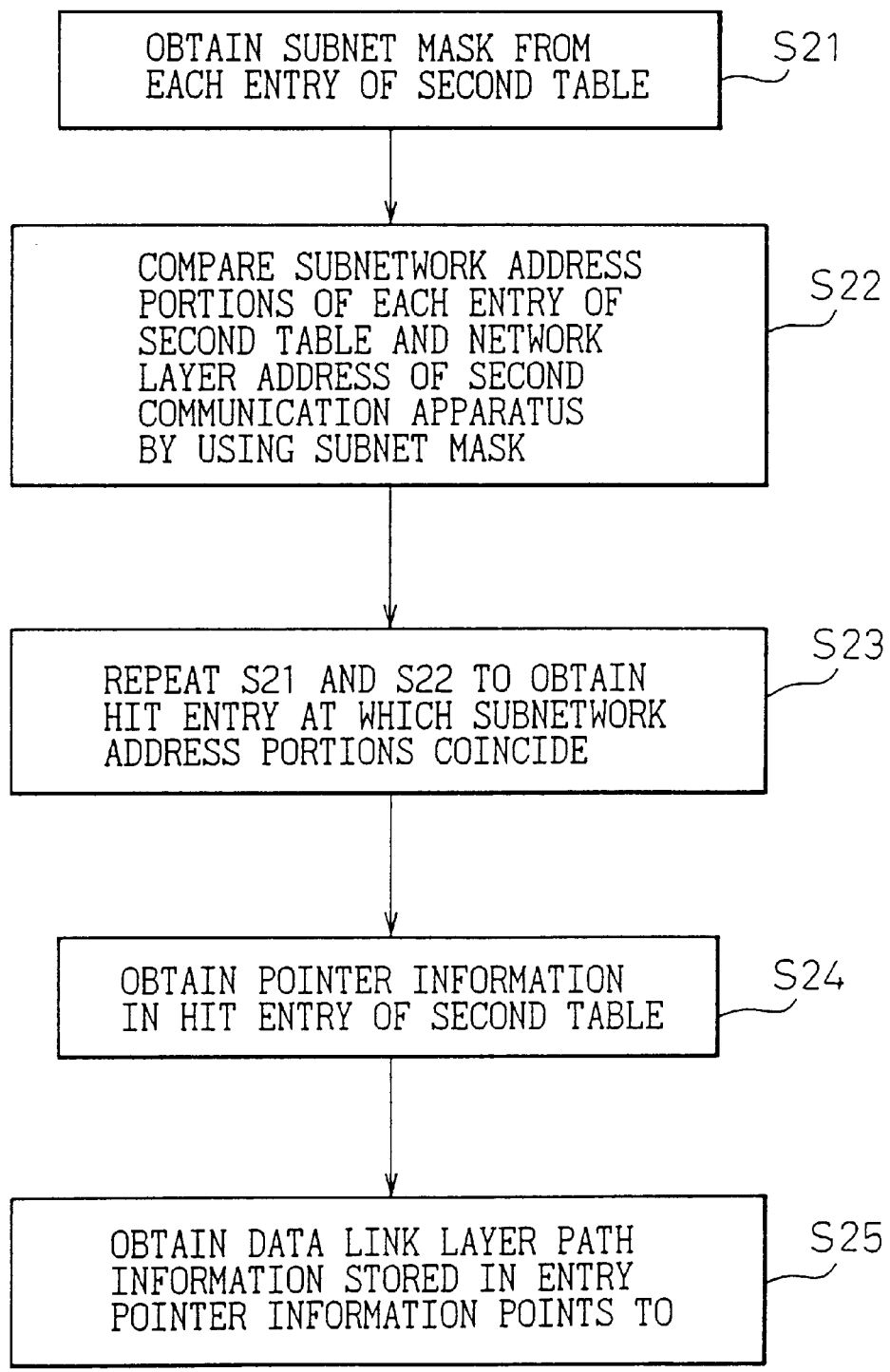

Fig.13

| DESTINATION NETWORK | NET MASK | GATEWAY ADDRESS | INTERFACE |
|---|---|---|---|
| 133.160.113.0 | 0xffffff00 | 133.160.113.2 | atm0 |
| 133.160.114.0 | 0xffffff00 | 133.160.113.1 | atm0 |
| 133.160.115.0 | 0xffffff00 | 133.160.113.1 | atm0 |
| 133.160.116.0 | 0xffffff00 | 133.160.113.1 | atm0 |

Fig.14

| DESTINATION HOST | NET MASK | GATEWAY ADDRESS | INTERFACE | SHORTCUT POINTER |
|---|---|---|---|---|
| 133.160.113.1 | 0xffffffff | 133.160.113.2 | atm0 | shortcut#1 |
| 133.160.115.2 | 0xffffffff | 133.160.113.1 | atm0 | shortcut#2 |
| 133.161.116.3 | 0xffffffff | 133.160.113.1 | atm0 | shortcut#3 |
| --- | --- | --- | --- | --- |

Fig.15

| DESTINATION HOST | NET MASK | ATM ADDRESS | POINTER TO VC STRUCTURE | DEFAULT ENTRY FLAG |
|---|---|---|---|---|
| 133.160.113.1 | 0xffffffff | atm#1 | VC#1 | 1 |
| 133.160.115.2 | 0xffffffff | atm#2 | VC#2 | 0 |
| 133.161.116.3 | 0xffffff00 | atm#3 | VC#3 | 0 |

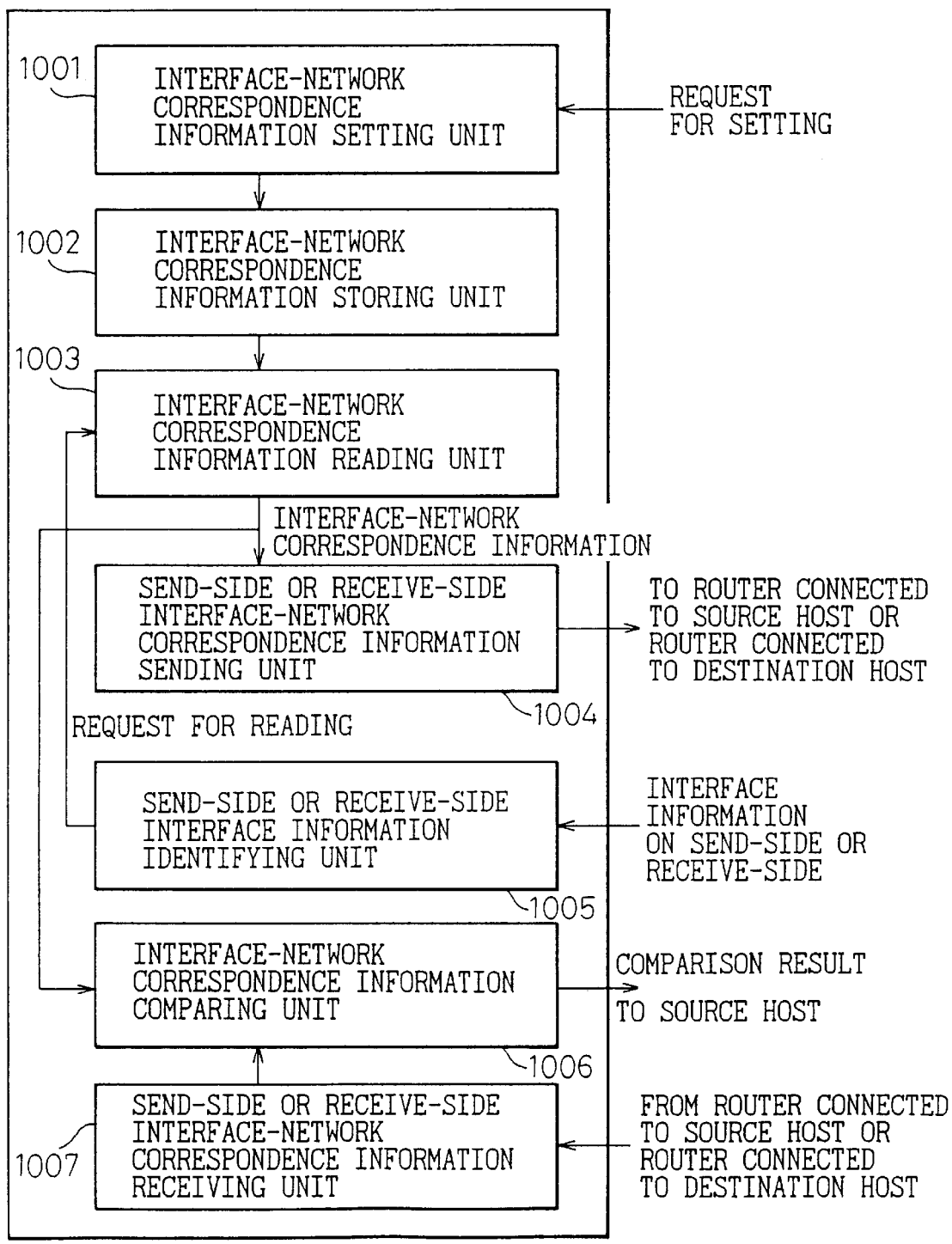

Fig. 28A

| INTERFACE | L2-CONNECTED NETWORK |
|---|---|
| R1-A | PN |
| R1-B | PN |

Fig. 28B

| INTERFACE | L2-CONNECTED NETWORK |
|---|---|
| R2-A | PN |
| R2-B | PN |

Fig. 28C

| INTERFACE | L2-CONNECTED NETWORK |
|---|---|
| R3-A | PN |
| R3-B | PN |

Fig.29

| IP ADDRESS OF DESTINATION HOST | IDENTIFICATION INFORMATION OF L2-CONNECTED NETWORK |

Fig.30A

| IP ADDRESS OF DESTINATION HOST H2 | "PN" |

Fig.30B

| L2 ADDRESS OF DESTINATION HOST H2 | "L2-REACHABLE" |

Fig. 31A

| IP ADDRESS OF DESTINATION HOST H2 | IP ADDRESS OF ROUTER R1 |

Fig. 31B

| L2 ADDRESS OF DESTINATION HOST H2 | "PN" |

Fig. 31C

| L2 ADDRESS OF DESTINATION HOST H2 | "L2-REACHABLE" |

Fig. 33A

| INTERFACE | L2-CONNECTED NETWORK |
|---|---|
| R1-A' | PN1' |
| R1-B' | PN1' |

Fig. 33B

| INTERFACE | L2-CONNECTED NETWORK |
|---|---|
| R2-A' | PN1' |
| R2-B' | PN2' |

Fig. 33C

| INTERFACE | L2-CONNECTED NETWORK |
|---|---|
| R3-A' | PN2' |
| R3-B' | PN2' |

Fig.34A

| INTERFACE | L2-CONNECTED NETWORK |
|---|---|
| R4-A' | PN2' |
| R4-B' | PN1' |

Fig.34B

| INTERFACE | L2-CONNECTED NETWORK |
|---|---|
| R5-A' | PN1' |
| R5-B' | PN1' |

Fig.35A

| IP ADDRESS OF DESTINATION HOST H2 | "PN1" |

Fig.35B

| L2 ADDRESS OF DESTINATION HOST H2 | "L2-REACHABLE" |

Fig.36A

| IP ADDRESS OF DESTINATION HOST H2 | IP ADDRESS OF ROUTER R1' |
|---|---|

Fig.36B

| L2 ADDRESS OF DESTINATION HOST H2 | "PN1" |
|---|---|

Fig.36C

| L2 ADDRESS OF DESTINATION HOST H2 | "L2-REACHABLE" |
|---|---|

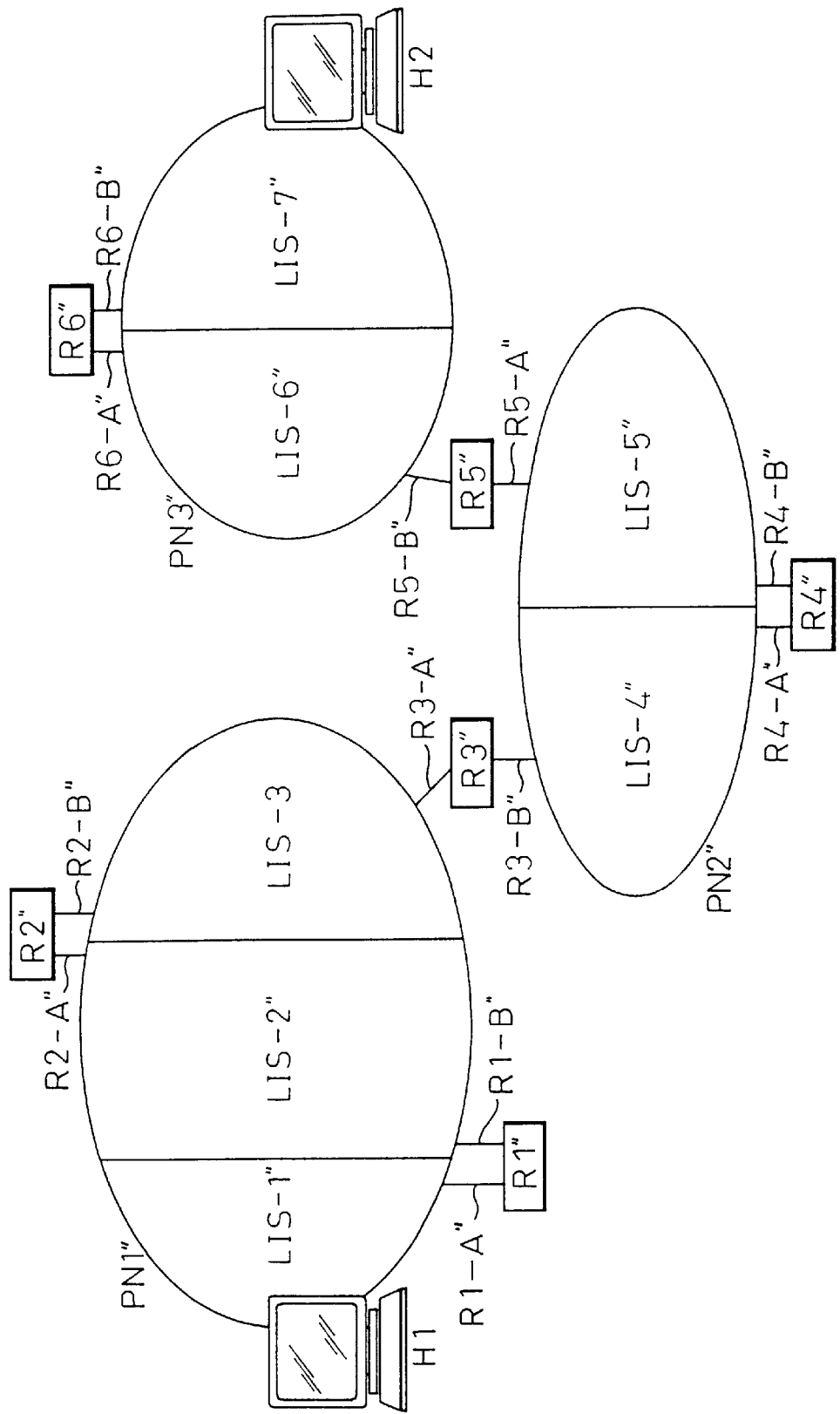

Fig.38A

| INTERFACE | L2-CONNECTED NETWORK |
|---|---|
| R1-A" | PN1" |
| R1-B" | PN1" |

Fig.38B

| INTERFACE | L2-CONNECTED NETWORK |
|---|---|
| R2-A" | PN1" |
| R2-B" | PN1" |

Fig.38C

| INTERFACE | L2-CONNECTED NETWORK |
|---|---|
| R3-A" | PN1" |
| R3-B" | PN2" |

Fig.39A

| INTERFACE | L2-CONNECTED NETWORK |
|-----------|----------------------|
| R4-A"     | PN2"                 |
| R4-B"     | PN2"                 |

Fig.39B

| INTERFACE | L2-CONNECTED NETWORK |
|-----------|----------------------|
| R5-A'     | PN2'                 |
| R5-B'     | PN3'                 |

Fig.39C

| INTERFACE | L2-CONNECTED NETWORK |
|-----------|----------------------|
| R6-A"     | PN3"                 |
| R6-B"     | PN3"                 |

Fig. 40A

| IP ADDRESS OF DESTINATION HOST H2 | "PN1" |
|---|---|

Fig. 40B

| IP ADDRESS OF DESTINATION HOST H2 | "L2-UNREACHABLE" |
|---|---|

Fig.41A

| IP ADDRESS OF DESTINATION HOST H2 | IP ADDRESS OF ROUTER R1" |
|---|---|

Fig.41B

| L2 ADDRESS OF DESTINATION HOST H2 | "PN 3" " |
|---|---|

Fig.41C

| IP ADDRESS OF DESTINATION HOST H2 | "L2-UNREACHABLE" |
|---|---|

Fig.44A

| IP ADDRESS OF DESTINATION HOST H2 | ------ |

Fig.44B

| L2 ADDRESS OF DESTINATION HOST H2 | "L2-REACHABLE" |

Fig.45

| IP ADDRESS OF DESTINATION HOST H2 | "L2-UNREACHABLE" |

Fig. 46

| L2 ADDRESS OF DESTINATION HOST H2 | "L2-UNREACHABLE" |

PROCESS AND APPARATUS FOR SPEEDING UP LAYER 2 AND LAYER 3 ROUTING BY DETERMINING LAYER 2 REACH ABILITY BY DETERMINING WHETHER LAYER 2 SUBNETWORKS ARE IDENTICAL

This application is a divisional of 09/094,061, filed Jun. 9, 1998, now U.S. Pat. No. 6,304,912, allowed Mar. 29, 2001.

BACKGROUND OF THE INVENTION

1. Field of the Invention

The present invention firstly relates to a process for storing, in a first communication apparatus, data-link-layer path information indicating a communication path in a data link layer (layer 2) from the first communication apparatus to one of at least one second communication apparatus, where the first and at least one second communication apparatuses are each connected to a network which is logically divided into a plurality of subnetworks based on network-layer addresses. The present invention also relates to a product which, when used with a communication apparatus, is able to output control information which directs the communication apparatus to execute the above process. The present invention further relates to a communication apparatus generated by the above process.

The present invention secondly relates to a process for searching, at a first communication apparatus, for one of at least one piece of data-link-layer (layer-2) or network-layer (layer-3) path information indicating a communication path in a data link layer or in a network layer from the first communication apparatus to one of at least one second communication apparatus, based on a network-layer (layer-2) address of the one of the at least one second communication apparatus, where the first communication apparatus and the at least one second communication apparatuses are each connected to a network as above. The present invention also relates to a product which, when used with a communication apparatus, is able to output control information which directs the communication apparatus to execute the above process.

The present invention thirdly relates to a process and an apparatus for determining layer-2 (data-link-layer) reachability between first and second communication apparatuses, where each of the first and second communication apparatuses are connected to a layer-3 (network-layer) communication network comprised of at least one router and a plurality of subnetworks which are logically defined over at least one layer-2-connected communication network. The present invention also relates to a product which, when used with a communication apparatus, is able to output control information which directs the communication apparatus to execute the functions of the above apparatus for determining layer-2 reachability.

The present invention fourthly relates to an apparatus, for use with each of at least one router provided in a layer-3 communication network comprised of a plurality of subnetworks which are logically defined over at least one layer-2-connected communication network, and for determining layer-2 reachability between first and second communication apparatuses each connected to the layer-3 communication network, where a layer-3 communication path passing a portion or all of the at least one router can be determined by the portion or all of the at least one router based on a layer-3 address of the second communication apparatus. The present invention also relates to a product which, when used with a communication apparatus, is able to output control information which directs the communication apparatus to execute the functions of the above apparatus for use with each router in determining layer-2 reachability.

2. Description of the Related Art 2.1 LANs (local area networks) are constructed in respective sections or task groups in many companies and campuses, and those LANs are interconnected through relaying apparatuses called routers to form a company network or a campus network. Each LAN in such a network is an example of a subnetwork. Namely, a plurality of subnetworks are interconnected to a plurality of routers to form a network.

Each terminal connected to one of the above subnetworks can communicate with another terminal connected to the same subnetwork by directly sending a packet, while each terminal sends a packet to one of the plurality of routers which is located at a boundary of the subnetwork to which the terminal is connected, when the said each terminal communicates to another terminal which is connected to a different subnetwork. When the router receives the packet, the router determines to which router the packet is to be transferred, and then transfers the packet to the determined router. Thus, communication to a terminal connected to a different subnetwork is possible.

In a typical terminal, transmission processing of a packet is performed by an operating system (OS). The packet is transmitted based on a network-layer address, For example, according to the Internet protocol (IP), an IP address is used in transmission. The transmission processing of a packet according to the Internet protocol (IP) is explained below.

The operating system (OS) has a routing table corresponding to all the network-layer addresses which are reachable from the host (router) which contains the operating system, and each entry of the routing table contains a network address, an output interface of the host, a gateway address, and the like. The gateway address is an IP address of a router to which the packet is to be sent first from the its own (source) host, when a destination host belongs to a subnetwork which is different from the subnetwork to which the source host belongs. When the destination host and the source host belong to the same subnetwork, the gateway address is not an IP address of a router and, instead, is an IP address of the destination host or an IP address of its own host. The operating system (OS) searches the routing table using the IP address of the destination host as a search key, to obtain the output interface and the gateway address.

In addition, the operating system (OS) contains a data-link-layer address table for each interface, to indicate correspondence between the network-layer addresses and the data-link-layer addresses. For example, ARP (address resolution protocol) tables in UNIX systems having Ethernet interfaces, indicate correspondences between IP addresses and MAC (media access control) addresses. MAC addresses of L2 (layer 2) reachable hosts or gateways can be obtained from their IP addresses, to enable the source host to communicate with these L2 reachable hosts or gateways. When no entry corresponding to an IP address is found, an APR request is sent to all the hosts and gateways in the same subnetwork in accordance with the ARP protocol to obtain the MAC address corresponding to the IP address.

A similar protocol called ATMARP has been proposed for ATM networks. ATM addresses corresponding to IP addresses can be obtained in accordance with the ATMARP protocol. In addition, a procedure for management and control of a plurality of subnetworks over an ATM network, called IPOA (IP over ATM) has been proposed by M. Laubach, "Classical IP and ARP over ATM", Request for comments: 1577, January 1994. According to the IPOA, a plurality of subnetworks, called LIS (Logical IP Subnetwork), are logically defined on an ATM network, and an ATMARP server is provided for each LIS to register and control ATM addresses of terminals in the LIS. Before each terminal sends a packet, the terminal searches its own routing table to determine an output interface, and then searches an ATMARP table which is provided corresponding to the determined output interface to obtain an ATM address or a VC (virtual connection) number of a host or router in the same LIS to which a packet is to be transferred next. When no ATM address corresponding to the IP address is found in the ATMARP table, the terminal inquires of the ATMARP server an ATM address corresponding to the IP address. After the terminal receives a response from the ATMARP server together with the ATM address to the router, each terminal can send the packet to the router as a next hop, and then the packet can be transferred through at least one router to a destination host in a different subnetwork (LIS) based on the IP address of the destination host.

However, the LISs are logically defined on an ATM network in which communication based on a data-link-layer address should be possible without using the router and the network-layer address. Therefore, when it is possible to obtain data-link-layer path information to a destination host in an LIS which is different from the LIS of the source host, it is unnecessary to send the packet through routers which are provided between LISs, and a direct virtual connection (called shortcut path) can be established to the destination host in the different LIS by using the data-link-layer address. In order to obtain the data-link-layer address of a destination host in the different LIS, a protocol called NHRP (Next Hop Resolution Protocol) has been proposed in IETF (Internet Engineering Task Force) by James V. Lucuani et al., "NBMA Next Hop Resolution protocol (NHRP)", Routing over Large Cloud Working Group, INTERNET-DRAFT, <draft-ietf-rolc-nhrp-11.txt>. According to the NHRP, the procedure of the ATMARP is extended to a network containing a plurality of LISs.

According to the NHRP, a server called next hop server (NHS) is provided for each LIS, and each next hop server usually functions as a router between LISs. A terminal (or station) which establishes a virtual connection in accordance with the NHRP protocol is called next hop client (NHC). Each next hop client registers its own IP address and ATM address in the next hop server of the LIS to which the next hop client belongs. When a next hop client which wants to establish a virtual connection to a destination host, the next hop client, which is denoted here as a source next hop client, sends an NHRP request packet to the next hop server in the LIS to which the source next hop client belongs, where the NHRP request packet contains an IP address of the destination host. When the next hop server receives the NHRP request, and determines that the destination host belongs to an LIS which is different from the LIS which the next hop server controls, the next hop server transfers the NHRP request to another NHS (next hop server) in accordance with its own routing table and the IP address of the destination host. Thus, the NHRP request packet is transferred through a hop-by-hop path passing through routers until the NHRP request packet reaches a next hop server to which controls the LIS which the destination host belongs. When a next hop server, which receives the NHRP request, determines that the destination host belongs to the LIS which the next hop server controls, the next hop server searches its own ATM address table for the ATM address corresponding to the IP address of the destination host, and sends an NHRP response containing the ATM address of the destination host, to the source next hop client which has sent the NHRP request, tracing back the path through which the above the NHRP request has been transferred. When the next hop client receives the NHRP response containing the ATM address, the next hop client establishes a shortcut virtual connection (shortcut VC) to the destination host based on the received ATM address. The shortcut virtual connection does not pass a router, and therefore is free from the delays due to packet reconstruction and transfer in the router, to achieve high speed communication. Each next hop client communicates to another host in an LIS which is different from the LIS of the next hop client, through the hop-by-hop path passing through routers, until the ATM address is obtained as above, and then the hop-by-hop path is switched to the above shortcut virtual connection after the ATM address is obtained and the virtual connection established.

According to the conventional packet transmission procedure, the above search of the routing table for the output interface, and the search of the ARP table for the hardware address (data-link-layer address) corresponding to the IP address, are performed for each packet to be sent. When the destination host belongs to the same subnetwork as the source host, the source host searches the ARP table by using the IP address of the destination host as a search key. When the destination host does not belong to the same subnetwork as the source host, the source host searches the ARP table by using the IP address of the gateway router as a search key, where the IP address of the gateway router is obtained from the routing table by searching the routing table by using the IP address of the destination host as a search key. In the case of the ATM interface, the ATM address of a destination host in the same LIS as the source host is obtained from the ATMARP table. When the ATM address is not obtained from the ATMARP table, the source host inquires of the ATMARP server the ATM address corresponding to the IP address of the destination host. After the ATM address is obtained from the ATMARP server, a virtual connection is established to the destination host based on the ATMARP address, and the transmission is performed through the virtual connection. The obtained ATMARP address is written in the ATMARP table, and there is one-to-one correspondence between the virtual connection and an entry of the ATMARP table. When there is an entry, of the ATMARP table, containing an ATM address, and no virtual connection is established corresponding to the entry, a virtual connection corresponding to the entry of the ATMARP table is established before the transmission of a packet.

Since, according to the conventional procedure before the NHRP, all the transmissions to destination hosts in subnetworks other than the subnetwork to which the source host belongs, are performed through routers, the ARP table contains data-link-layer path information for only the router and the hosts in the same subnetwork as the subnetwork the source host belongs to. However, according to the NHRP procedure, ATM addresses of destination hosts in the subnetworks other than the subnetwork to which the source host belongs, are held in a data-link-layer path information table (which may be denoted as an NH cache hereinafter in this specification), and it is possible to transmit a packet through a shortcut virtual connection bypassing the routers, to a destination host in a subnetwork which is different from the subnetwork to which the source host belongs. In the NHRP procedure, it is necessary to give priority to a search for a shortcut virtual connection to a destination host in a different subnetwork, over a search for a virtual connection to a router in the same subnetwork as the source host, where the latter virtual connection to the router is used for transmission through routers. In the NHRP procedure, it is also desirable to reduce a processing amount and a processing time to realize high speed routing processing.

In addition, it is necessary to use the virtual connection to the router in the same subnetwork when there is no shortcut virtual connection to the destination host. However, the tables in the conventional next hop client initially contains no data-link-layer path information (no gateway address) corresponding to IP addresses of destination hosts in the same LIS as the source host. Therefore, the source host cannot start transmission of a packet until the virtual connection to the destination host in the same subnetwork is established.

Further, in the case wherein it is not possible to establish a shortcut path (virtual connection) to a destination host which belongs to a specific subnetwork, and a shortcut path (virtual connection) can be established from a source host to (a representative host of) the specific subnetwork, it is desirable to be able to utilize the shortcut path (virtual connection) to (the representative host of) the specific subnetwork, as a common shortcut path (virtual connection) to all the hosts in the specific subnetwork.

2.2 In addition to the above problems, it is necessary to determine whether or not first and second communication apparatuses, connected to a layer-3 (network-layer) communication network, can communicate with each other through only a layer-2 (data-link-layer) communication path, i.e., without passing through a router which routes a packet based on an destination (IP) address contained in the packet.

In various networks used in companies and campuses, one or more layer-2 communication networks such as FDDI, Ethernet, and ATM, are used. In addition, a plurality of such layer-2 communication networks of the same type or of different types, may be connected to each other through layer 2 connection devices such as bridges, to form a layer-2 communication network within which two arbitrary communication apparatuses connected thereto can communicate with each other by using a layer-2 communication path only. In this specification, all of these layer-2 communication networks including a single layer-2 communication network such as FDDI, Ethernet, and ATM, and any layer-2 communication network which is formed by connecting a plurality of layer-2 communication networks with one or more layer 2 connection devices, are denoted as layer-2-connected communication networks.

It is possible to logically define a layer-3 communication network on at least one of the above layer-2-connected communication network, and such a configuration of a layer-3 communication network logically defined over at least one layer-2-connected communication network is prevailingly used. Such a layer-3 communication network is usually divided into a plurality of subnetworks which are logically defined. As mentioned in the above section 2.1, these subnetworks may correspond to layer-2 communication networks on which the layer-3 communication network is logically formed. Further, the division into a plurality of subnetworks may be performed within a single layer-2-connected communication network for the purposes of security, network management policy, reduction of traffic, and use of existing configurations.

As explained in the above section 2.1, in the above layer-3 communication network, it is desirable for two communication apparatuses belonging to different subnetworks to communicate therebetween by using a layer-2 communication path only (shortcut path). The reachability in the data link layer (which is denoted as layer 2 reachability or L2 reachability in this specification) is a necessary condition for realizing the communication through the shortcut path. Therefore, it is required to investigate and determine the layer 2 reachability for communication between any two communication apparatuses belonging to different subnetworks.

However, conventionally, no way is provided for determining the layer 2 reachability in the layer-3 communication networks configured as above.

SUMMARY OF THE INVENTION

A first object of the present invention is to provide a process and an apparatus for storing, in a first communication apparatus, data-link-layer path information indicating a communication path in a data link layer from the first communication apparatus to one of at least one second communication apparatus, where the first and at least one second communication apparatuses are each connected to a network which is logically divided into a plurality of subnetworks based on network-layer addresses, in which the processing amount and the processing time in searching tables for routing are reduced.

A second object of the present invention is to provide a process and an apparatus for searching, at a first communication apparatus, for one of at least one piece of data-link-layer path information indicating a communication path in a data link layer from the first communication apparatus to one of at least one second communication apparatus, based on a network-layer address of the one of the at least one second communication apparatus, where the first communication apparatus and the at least one second communication apparatuses are each connected to a network which is logically divided into a plurality of subnetworks based on network-layer addresses, in which the processing amount and the processing time in searching tables for routing are reduced.

A third object of the present invention is to provide a process for searching, at a first communication apparatus, for one of at least one piece of data-link-layer path information indicating a communication path in a data link layer from the first communication apparatus to one of at least one second communication apparatus, based on a network-layer address of the one of the at least one second communication apparatus, where the first communication apparatus and the at least one second communication apparatuses are each connected to a network which is logically divided into a plurality of subnetworks based on network-layer addresses, in which a search for a data-link-layer path takes precedence over a search for a network-layer path passing through routers.

A fourth object of the present invention is to provide a process for determining a route for transmitting a message from a first communication apparatus to a second communication apparatus, where the first and second communication apparatuses are each connected to a network which is logically divided into a plurality of subnetworks based on network-layer addresses, and the plurality of subnetworks are connected through a plurality of routing apparatuses, in which a search for a data-link-layer path takes precedence over a search for a network-layer path passing through routers.

A fifth object of the present invention is to provide a process and an apparatus for searching, at a first communication apparatus, for one of at least one piece of data-link-layer path information indicating a communication path in a data link layer from the first communication apparatus to one of at least one second communication apparatus, based on a network-layer address of the one of the at least one second communication apparatus, where the first communication apparatus and the at least one second communication apparatuses are each connected to a network which is logically divided into a plurality of subnetworks based on network-layer addresses, in which a shortcut path (virtual connection) to a specific subnetwork can be utilized as a common shortcut path (virtual connection) to all the hosts in the specific subnetwork.

A sixth object of the present invention is to provide a communication apparatus which is capable of communicating with at least one other communication apparatus when the communication apparatus and the at least one other communication apparatus are connected to a network which is logically divided into a plurality of subnetworks based on network-layer addresses, so that a source host can start transmission of a packet before a virtual connection to a destination host in the same subnetwork as the source host is established.

A seventh object of the present invention is to provide a process and an apparatus for determining layer-2 (data-link-layer) reachability between first and second communication apparatuses, where each of the first and second communication apparatuses are connected to a layer-3 (network-layer) communication network comprised of at least one router and a plurality of subnetworks which are logically defined over at least one layer-2-connected communication network.

An eighth object of the present invention is to provide an apparatus, for use with each of at least one router provided in a layer-3 communication network comprised of a plurality of subnetworks which are logically defined over at least one layer-2-connected communication network, and for determining layer-2 reachability between first and second communication apparatuses each connected to the layer-3 communication network, where a layer-3 communication path passing a portion or all of the at least one router can be determined by the portion or all of the at least one router based on a layer-3 address of the second communication apparatus.

(1) According to a first aspect of the present invention, there is provided a process for storing, in a first communication apparatus, data-link-layer path information indicating a communication path in a data link layer from the first communication apparatus to one of at least one second communication apparatus, where the first and at least one second communication apparatuses are each connected to a network which is logically divided into a plurality of subnetworks based on network-layer addresses. The process contains the steps of (a) obtaining the data-link-layer path information based on a network-layer address of the one of the at least one second communication apparatus; (b) storing the data-link-layer path information in an entry of a first table; and (c) storing, in a second table, pointer information pointing to the entry in the first table, where the second table is provided for being looked up first, when a message is to be transmitted from the first communication apparatus.

(1—1) In the process according to the first aspect of the present invention, the above first communication apparatus may contain a routing table for storing routing information indicating at least one communication path to at least one routing apparatus, corresponding to at least one network-layer address of the at least one second communication apparatus, where a message to be sent to each of the at least one second communication apparatus based on the network-layer address of the said each of the at least one second communication apparatus, is to be first transferred to one of the at least one routing apparatus corresponding to the network-layer address of the said each of the at least one second communication apparatus. The above first communication apparatus may further contain a routing cache for storing, in addition to the storing in the routing table, contents of a portion of the routing table, and the second table is provided in the routing cache.

(1-2) In the process according to the first aspect of the present invention, the above first communication apparatus may contain the routing table as described in the above (1—1), and the second table is provided as a portion of said routing table.

(2) According to a second aspect of the present invention, there is provided a product for use with a first communication apparatus which is capable of communicating with at least one second communication apparatus when the first communication apparatus and the at least one second communication apparatus are connected to a network which is logically divided into a plurality of subnetworks based on network-layer addresses. The product, when used with the first communication apparatus, is able to output control information which directs the first communication apparatus to execute the above process according to the first aspect of the present invention.

(3) According to a third aspect of the present invention, there is provided a process for storing, in a first communication apparatus, data-link-layer path information indicating a communication path in a data link layer from the first communication apparatus to one of at least one representative communication apparatus of one of a plurality of subnetworks, where the first communication apparatus is connected to a network which is logically divided, based on network-layer addresses, into the plurality of subnetworks; the process contains the steps of (a) obtaining the data-link-layer path information based on a network-layer address of one of at least one second communication apparatus, where the one of the at least one second communication apparatus belongs to the one of the plurality of subnetworks; (b) storing the data-link-layer path information in an entry of a first table; and (c) storing, in a second table, pointer information pointing to the entry in the first table, corresponding to the network-layer address of the one of the at least one second communication apparatus, where the second table is provided for being looked up first, when a message is to be transmitted from the first communication apparatus.

(3-1) In the above process according to the third aspect of the present invention, in step (a), subnet mask information indicating a subnet mask may further be obtained, where the subnet mask indicates which portion of the network-layer address of the one of the at least one second communication apparatus indicates the one of the plurality of subnetworks to which the one of the at least one second communication apparatus belongs. The process may further contain the sub-step of storing the subnet mask information in the second table.

(3-2) In the above process according to the third aspect of the present invention, in step (a), subnet mask information indicating a subnet mask may further be obtained, where the subnet mask indicates which portion of the network-layer address of the one of the at least one second communication apparatus indicates the one of the plurality of subnetworks to which the one of the at least one second communication apparatus belongs. The process may further contain the sub-step of storing the subnet mask information in the first table.

(4) According to a fourth aspect of the present invention, there is provided a product for use with a first communication apparatus which is capable of communicating with at least one second communication apparatus when the first communication apparatus and the at least one second communication apparatus are connected to a network which is logically divided into a plurality of subnetworks based on network-layer addresses. The product, when used with the first communication apparatus, is able to output control information which directs the first communication apparatus to execute the above process according to the third aspect of the present invention. In addition, either of the above features (3-1) and (3-2) may be adopted in the process.

(5) According to a fifth aspect of the present invention, there is provided a communication apparatus which is capable of communicating with at least one other communication apparatus when the communication apparatus and the at least one other communication apparatus are connected to a network which is logically divided into a plurality of subnetworks based on network-layer addresses. The communication apparatus contains a first table having at least one entry each for storing one of at least one piece of data-link-layer path information, each of the at least one piece of data-link-layer path information indicating a communication path in a data link layer to one of the at least one other communication apparatus; and a second table for storing at least one piece of pointer information each pointing to one of the at least one entry of the first table, and each of the at least one piece of pointer information corresponding to a network-layer address of one of the at least one other communication apparatus.

(6) According to a sixth aspect of the present invention, there is provided a communication apparatus which is capable of communicating with at least one other communication apparatus when the communication apparatus and the at least one other communication apparatus are connected to a network which is logically divided into a plurality of subnetworks based on network-layer addresses, the communication apparatus comprising: a first table having at least one entry each for storing one of at least one piece of data-link-layer path information, each of the at least one piece of data-link-layer path information indicating a communication path in a data link layer from the communication apparatus to one of at least one representative communication apparatus of one of the plurality of subnetworks; and a second table for storing at least one piece of pointer information each pointing to one of the at least one entry of the first table, and each of the at least one piece of pointer information corresponding to a network-layer address of one of the at least one other communication apparatus.

(6-1) In the above communication apparatus according to the sixth aspect of the present invention, the second table may further store at least one piece of subnet mask information each piece indicating a subnet mask, where the subnet mask indicates which portion of the network-layer address of each of the at least one other communication apparatus corresponds to one of the plurality of subnetworks which contains the said each of the at least one other communication apparatus.

(6-2) In the above communication apparatus according to the sixth aspect of the present invention, the first table may further store at least one subnet mask information each piece indicating a subnet mask, where the subnet mask indicates which portion of the network-layer address of each of the at least one other communication apparatus corresponds to one of the plurality of subnetworks which contains the said each of the at least one other communication apparatus.

(7) According to a seventh aspect of the present invention, there is provided a process for searching, at a first communication apparatus, for one of at least one piece of data-link-layer path information indicating a communication path in a data link layer from the first communication apparatus to one of at least one second communication apparatus, based on a network-layer address of the one of the at least one second communication apparatus, where the first communication apparatus and the at least one second communication apparatuses are each connected to a network which is logically divided into a plurality of subnetworks based on network-layer addresses. The first communication apparatus contains a first table having at least one entry storing the at least one piece of data-link-layer path information each piece indicating a communication path in the data link layer from the first communication apparatus to one of the at least one second communication apparatus, and a second table storing at least one piece of pointer information each pointing to one of the at least one entry of the first table, where each of the at least one entry of the first table stores one of the at least one piece of data-link-layer path information. The above process contains the steps of (a) searching the second table based on the network-layer address of the one of the at least one second communication apparatus, to obtain one of the at least one piece of pointer information corresponding to the network-layer address of the one of the at least one second communication apparatus; and (b) obtaining one of the at least one piece of data-link-layer path information stored in one of the at least one entry which is pointed to by the one of the at least one piece of pointer information obtained in step (a).

(8) According to an eighth aspect of the present invention, there is provided a product for use with a first communication apparatus which is capable of communicating with at least one second communication apparatus when the first communication apparatus and the at least one second communication apparatus are connected to a network which is logically divided into a plurality of subnetworks based on network-layer addresses. The product, when used with the first communication apparatus, is able to output control information which directs the first communication apparatus to execute the above process according to the seventh aspect of the present invention.

(9) According to a ninth aspect of the present invention, there is provided a process for searching, at a first communication apparatus, for one of at least one piece of data-link-layer path information indicating a communication path in a data link layer from the first communication apparatus to one of at least one representative communication apparatus of one of a plurality of subnetworks, based on a network-layer address of one of at least one second communication apparatus, where the first communication apparatus and the at least one second communication apparatuses are each connected to a network which is logically divided, based on network-layer addresses, into the plurality of subnetworks, and the one of the at least one second communication apparatus belongs to the one of the plurality of subnetworks. The first communication apparatus contains a first table having at least one entry and storing the at least one piece of data-link-layer path information each piece indicating a communication path in the data link layer from the first communication apparatus to one of the at least one representative communication apparatus, and a second table having at least one entry each having an address, storing one of at least one piece of pointer information each pointing to one of the at least one entry of the first table, corresponding to a network-layer address of one of the at least one second communication apparatus, and further storing one of at least one piece of subnet mask information corresponding to the network-layer address of the one of the at least one second communication apparatus. The above process contains the steps of (a) obtaining one of the at least one piece of subnet mask information from one of the at least one entry of the second table; (b) comparing a first subnetwork address portion of the address of the one of the at least one entry of the second table with a second subnetwork address portion of said network-layer address of the one of the at least one second communication apparatus by using the one of the at least one piece of subnet mask information obtained in step (a), to determine whether or not the first subnetwork address portion coincides with the second subnetwork address portion; and (c) repeating steps (a) and (b) to obtain one of the at least one entry of the second table, where the first subnetwork address portion of the one of the at least one entry of the second table determined in step (b) coincides with the second subnetwork address portion; (d) obtaining one of the at least one piece of pointer information stored in the one of the at least one entry obtained in step (c); and (e) obtaining one of the at least one piece of data-link-layer path information stored in one of the at least one entry of the first table which entry is pointed to by the one of the at least one piece of pointer information obtained in step (d).

(10) According to a tenth aspect of the present invention, there is provided a product for use with a first communication apparatus which is capable of communicating with at least one second communication apparatus when the first communication apparatus and the at least one second communication apparatus are connected to a network which is logically divided into a plurality of subnetworks based on network-layer addresses. The product, when used with the first communication apparatus, is able to output control information which directs the first communication apparatus to execute the above process according to the ninth aspect of the present invention.

(11) According to an eleventh aspect of the present invention, there is provided a process for searching, at a first communication apparatus, for one of at least one piece of data-link-layer path information indicating a communication path in a data link layer from the first communication apparatus to one of at least one representative communication apparatus of one of plurality of subnetworks, based on a network-layer address of one of at least one second communication apparatus, where the first communication apparatus and the at least one second communication apparatuses are each connected to a network which is logically divided, based on network-layer addresses, into the plurality of subnetworks, and the one of at least one second communication apparatus belongs to the one of plurality of subnetworks. The first communication apparatus contains a first table having at least one entry and storing the at least one piece of data-link-layer path information each piece indicating a communication path in the data link layer from the first communication apparatus to one of the at least one representative communication apparatus, and further storing one of at least one piece of subnet mask information corresponding to the one of the at least one representative communication apparatus, and a second table having at least one entry each having an address, storing one of at least one piece of pointer information each pointing to one of the at least one entry of the first table, corresponding to a network-layer address of one of the at least one second communication apparatus. The above process contains the steps of (a) obtaining one of the at least one piece of pointer information from one of the at least one entry of the second table; (b) obtaining one of the at least one piece of subnet mask information from one of the at least one entry of the first table, where the one of the at least one entry of the first table is pointed to by the one of the at least one piece of pointer information obtained in step (a); (c) comparing a first subnetwork address portion of the address of the one of the at least one entry of the second table with a second subnetwork address portion of said network-layer address of the one of the at least one second communication apparatus by using the one of the at least one piece of subnet mask information obtained in step (b), to determine whether or not the first subnetwork address portion coincides with the second subnetwork address portion; and (d) repeating steps (a) to (c) to determine one of the at least one entry of the second table, where the first subnetwork address portion of the one of the at least one entry of the second table determined in step (c) coincides with the second subnetwork address portion; and (e) obtaining one of the at least one piece of data-link-layer path information stored in one of the at least one entry of the first table which entry is pointed to by the one of the at least one piece of pointer information which is obtained in step (d) and stored in the one of the at least one entry of the second table determined in step (d).

(12) According to an twelfth aspect of the present invention, there is provided a product for use with a first communication apparatus which is capable of communicating with at least one second communication apparatus when the first communication apparatus and the at least one second communication apparatus are connected to a network which is logically divided into a plurality of subnetworks based on network-layer addresses. The product, when used with the first communication apparatus, is able to output control information which directs the first communication apparatus to execute the above process according to the eleventh aspect of the present invention.

(13) According to a thirteenth aspect of the present invention, there is provided a process for determining a route for transmitting a message from a first communication apparatus to a second communication apparatus, where the first and second communication apparatuses are each connected to a network which is logically divided into a plurality of subnetworks based on network-layer addresses, and the plurality of subnetworks are connected through a plurality of routing apparatuses. The first communication apparatus contains a first table having at least one entry each being able to store one of at least one piece of data-link-layer path information, each of the at least one piece of data-link-layer path information indicating a communication path in a data link layer to one of the at least one second communication apparatus, a second table being able to store at least one piece of pointer information each pointing to one of the at least one entry of the first table, and each of the at least one piece of pointer information corresponding to a network-layer address of one of the at least one second communication apparatus, and a third table for storing at least one piece of network-layer path information so that one of the at least one piece of network-layer path information can be searched for based on at least one network-layer address of the at least one second communication apparatus, for use in transmission through at least one of the plurality of routing apparatuses to the at least one second communication apparatus. The above process contains the steps of (a) searching the second table, based on the network-layer address of the one of the at least one second communication apparatus, for one of the at least one piece of pointer information corresponding to the network-layer address of the one of the at least one second communication apparatus; (b) trying to obtain one of the at least one piece of data-link-layer path information stored in one of the at least one entry which is pointed to by the one of the at least one piece of pointer information obtained from the second table, when the one of the at least one piece of pointer information is obtained in step (a); and (c) searching the third table based on the network-layer address of the one of the at least one second communication apparatus, to obtain one of the at least one piece of network-layer path information corresponding to the network-layer address of the one of the at least one second communication apparatus, when no piece of pointer information is obtained corresponding to the network-layer address of the one of the at least one second communication apparatus, in the step (a), or no piece of data-link-layer path information corresponding to the one of the at least one piece of pointer information is obtained in step (b).

(14) According to a fourteenth aspect of the present invention, there is provided a product for use with a first communication apparatus which is capable of communicating with at least one second communication apparatus when the first communication apparatus and the at least one second communication apparatus are connected to a network which is logically divided into a plurality of subnetworks based on network-layer addresses. The product, when used with the first communication apparatus, is able to output control information which directs the first communication apparatus to execute the above process according to the thirteenth aspect of the present invention.

(15) According to a fifteenth aspect of the present invention, there is provided a process for determining a route for transmitting a message from a first communication apparatus to a second communication apparatus, where the first and second communication apparatuses are each connected to a network which is logically divided into a plurality of subnetworks based on network-layer addresses, and the plurality of subnetworks are connected through a plurality of routing apparatuses. The first communication apparatus contains a first table having at least one entry each being able to store one of at least one piece of data-link-layer path information, each of the at least one piece of data-link-layer path information indicating a communication path in a data link layer to one of the at least one second communication apparatus, a second table being able to store at least one piece of pointer information each pointing to one of the at least one entry of the first table, and each of the at least one piece of pointer information corresponding to a network-layer address of one of the at least one second communication apparatus, and a third table for storing at least one piece of network-layer path information so that one of the at least one piece of network-layer path information can be searched for based on at least one network-layer address of the at least one second communication apparatus, for use in transmission through at least one of the plurality of routing apparatuses to the at least one second communication apparatus. The above second table is further able to store at least a portion of the above at least one piece of network-layer path information stored in said third table. The above process contains the steps of (a) searching the second table for an entry corresponding to the network-layer address of the above one of the at least one second communication apparatus, to determine whether or not the above entry exists in the second table; (b) determining whether or not the above entry of the second table contains one of the above at least one piece of pointer information corresponding to the network-layer address of the above one of the at least one second communication apparatus, when it is determined in step (a) that the above entry exists in the second table; (c) trying to obtain one of the above at least one piece of data-link-layer path information stored in one of the above at least one entry which is pointed to by the above one of the at least one piece of pointer information obtained from the second table, when it is determined in step (b) that the one of the at least one piece of pointer information is stored in the above entry of the second table; (d) trying to obtain, from the entry of the second table, one of the above at least one piece of network-layer path information corresponding to the network-layer address of the above one of the at least one second communication apparatus, when it is determined in step (b) that the one of said at least one piece of pointer information is not stored in the entry of the second table; and (e) searching the third table based on the network-layer address of the one of the at least one second communication apparatus, to obtain one of the at least one piece of network-layer path information corresponding to the network-layer address of the one of the at least one second communication apparatus, when the above one of the at least one piece of data-link-layer path information is obtained in neither of steps (c) and (d).

(16) According to a sixteenth aspect of the present invention, there is provided a product for use with a first communication apparatus which is capable of communicating with at least one second communication apparatus when the first communication apparatus and the at least one second communication apparatus are connected to a network which is logically divided into a plurality of subnetworks based on network-layer addresses. The product, when used with the first communication apparatus, is able to output control information which directs the first communication apparatus to execute the above process according to the fifteenth aspect of the present invention.

(17) According to a seventeenth aspect of the present invention, there is provided a process for determining a route for transmitting a message from a first communication apparatus to one of at least one representative communication apparatus of one of a plurality of subnetworks, where the first communication apparatus is connected to a network which is logically divided, based on network-layer addresses, into the plurality of subnetworks, and the plurality of subnetworks are connected through a plurality of routing apparatuses. The first communication apparatus contains a first table having at least one entry each being able to store one of at least one piece of data-link-layer path information, each of the at least one piece of data-link-layer path information indicating a communication path in a data link layer to one of the at least one representative communication apparatus, a second table having at least one entry, each entry having an address, and the second table being able to store at least one piece of pointer information each pointing to one of the at least one entry of the first table, and each of the at least one piece of pointer information corresponding to a network-layer address of one of at least one second communication apparatus, and being further able to store one of at least one piece of subnet mask information corresponding to the network-layer address of the one of the at least one second communication apparatus, where the one of the at least one second communication apparatus belongs to one of the plurality of subnetworks, and a third table for storing at least one piece of network-layer path information so that one of the at least one piece of network-layer path information can be searched for based on at least one network-layer address of the at least one second communication apparatus, for use in transmission through at least one of the plurality of routing apparatuses to the at least one representative communication apparatus. The above process contains the steps of (a) trying to obtain one of the at least one piece of subnet mask information from one of the at least one entry of the second table; (b) comparing, when the one of the at least one piece of subnet mask information is obtained in step (a), a first subnetwork address portion of the address of the one of the at least one entry of the second table with a second subnetwork address portion of said network-layer address of the one of the at least one second communication apparatus by using the one of the at least one piece of subnet mask information obtained in step (a), to determine whether or not the first subnetwork address portion coincides with the second subnetwork address portion; (c) repeating steps (a) and (b) to obtain one of the at least one entry of the second table, where the first subnetwork address portion of the one of the at least one entry of the second table determined in step (b) coincides with the second subnetwork address portion; (d) determining, when the one of the at least one entry of the second table is obtained in step (c), whether or not the one of the at least one entry of the second table obtained in step (c) contains one of the at least one piece of pointer information; (e) trying to obtain, when it is determined in step (d) that the one of the at least one entry of the second table obtained in step contains one of the at least one piece of pointer information, one of the at least one piece of data-link-layer path information stored in one of the at least one entry of the first table which entry is pointed to by the one of the at least one piece of pointer information stored in the one of the at least one entry; and (f) searching the third table based on the network-layer address of the one of the at least one second communication apparatus, to obtain one of the at least one piece of network-layer path information corresponding to the network-layer address of the one of the at least one second communication apparatus, when no piece of subnet mask information is obtained in step (a), or no entry of the second table is obtained in step (c), or no piece of pointer information is stored in the one of the at least one entry of the second table obtained in step (c), or no piece of data-link-layer path information is obtained in step (e).

(18) According to a eighteenth aspect of the present invention, there is provided a product for use with a first communication apparatus which is capable of communicating with at least one second communication apparatus when the first communication apparatus and the at least one second communication apparatus are connected to a network which is logically divided into a plurality of subnetworks based on network-layer addresses. The product, when used with the first communication apparatus, is able to output control information which directs the communication apparatus to execute the above process according to the seventeenth aspect of the present invention.

(19) According to a nineteenth aspect of the present invention, there is provided a process for determining a route for transmitting a message from a first communication apparatus to one of at least one representative communication apparatus of one of a plurality of subnetworks, where the first communication apparatus is connected to a network which is logically divided, based on network-layer addresses, into the plurality of subnetworks, and the plurality of subnetworks are connected through a plurality of routing apparatuses. The first communication apparatus contains a first table having at least one entry each being able to store one of at least one piece of data-link-layer path information, each of the at least one piece of data-link-layer path information indicating a communication path in a data link layer to one of the at least one representative communication apparatus, a second table having at least one entry, each entry having an address, and the second table being able to store at least one piece of pointer information each pointing to one of the at least one entry of the first table, and each of the at least one piece of pointer information corresponding to a network-layer address of one of at least one second communication apparatus, and being further able to store one of at least one piece of subnet mask information corresponding to the network-layer address of the one of the at least one second communication apparatus, where the one of the at least one second communication apparatus belongs to one of the plurality of subnetworks, and a third table for storing at least one piece of network-layer path information so that one of the at least one piece of network-layer path information can be searched for based on at least one network-layer address of the at least one second communication apparatus, for use in transmission through at least one of the plurality of routing apparatuses to the at least one representative communication apparatus. The above second table is further able to store at least a portion of the above at least one piece of network-layer path information stored in the third table. The above process contains the steps of (a) trying to obtain one of the at least one piece of subnet mask information from one of the at least one entry of the second table; (b) comparing, when the one of the at least one piece of subnet mask information is obtained in step (a), a first subnetwork address portion of the address of the one of the at least one entry of the second table with a second subnetwork address portion of the network-layer address of the one of the at least one second communication apparatus by using the one of the at least one piece of subnet mask information obtained in step (a), to determine whether or not the first subnetwork address portion coincides with the second subnetwork address portion; (c) repeating steps (a) and (b) to obtain one of the at least one entry of the second table, where the first subnetwork address portion of the one of the at least one entry of the second table determined in step (b) coincides with the second subnetwork address portion; (d) determining, when the one of the at least one entry of the second table is obtained in step (c), whether or not the one of the at least one entry of the second table obtained in step (c) contains one of the at least one piece of pointer information; (e) trying to obtain, when it is determined in step (d) that the one of the at least one entry of the second table obtained in step contains one of the at least one piece of pointer information, one of the at least one piece of data-link-layer path information stored in one of the at least one entry of the first table which entry is pointed to by the one of the at least one piece of pointer information stored in the one of the at least one entry; (f) trying to obtain, from the entry of the second table, one of the at least one piece of network-layer path information corresponding to the network-layer address of the one of the at least one second communication apparatus, when it is determined in step (d) that the one of the at least one piece of pointer information is not stored in the entry of the second table; and (g) searching the third table based on the network-layer address of the one of the at least one second communication apparatus, to obtain one of the at least one piece of network-layer path information corresponding to the network-layer address of the one of the at least one second communication apparatus, when no piece of subnet mask information is obtained in step (a), or no entry of the second table is obtained in step (c), or the one of the at least one piece of network-layer path information is obtained in neither of steps (e) and (f).

(20) According to a twentieth aspect of the present invention, there is provided a product for use with a first communication apparatus which is capable of communicating with at least one second communication apparatus when the first communication apparatus and the at least one second communication apparatus are connected to a network which is logically divided into a plurality of subnetworks based on network-layer addresses. The product, when used with the first communication apparatus, is able to output control information which directs the communication apparatus to execute the above process according to the nineteenth aspect of the present invention.

(21) According to a twenty-first aspect of the present invention, there is provided a process for determining a route for transmitting a message from a first communication apparatus to one of at least one representative communication apparatus of one of a plurality of subnetworks, where the first communication apparatus is connected to a network which is logically divided, based on network-layer addresses, into the plurality of subnetworks, and the plurality of subnetworks are connected through a plurality of routing apparatuses. The first communication apparatus contains a first table having at least one entry each being able to store one of at least one piece of data-link-layer path information, each of the at least one piece of data-link-layer path information indicating a communication path in a data link layer to one of the at least one representative communication apparatus, and being further able to store one of at least one piece of subnet mask information corresponding to the one of the at least one representative communication apparatus, a second table having at least one entry, each entry having an address, and the second table being able to store at least one piece of pointer information each pointing to one of the at least one entry of the first table, and each of the at least one piece of pointer information corresponding to a network-layer address of one of at least one second communication apparatus, where the one of the at least one second communication apparatus belongs to one of the plurality of subnetworks, and a third table for storing at least one piece of network-layer path information so that one of the at least one piece of network-layer path information can be searched for based on at least one network-layer address of the at least one second communication apparatus, for use in transmission through at least one of the plurality of routing apparatuses to the at least one representative communication apparatus. The above process contains the steps of (a) trying to obtain one of the at least one piece of pointer information from one of the at least one entry of the second table; (b) trying to obtain, when the one of the at least one entry of the second table obtained in step (a) contains one of the at least one piece of pointer information, one of the at least one piece of subnet mask information from one of the at least one entry of the first table, where the one of the at least one entry of the first table is pointed to by the one of the at least one piece of pointer information obtained in step (a); (c) comparing, when the one of the at least one piece of subnet mask information is obtained in step (b), a first subnetwork address portion of the address of the one of the at least one entry of the second table with a second subnetwork address portion of said network-layer address of the one of the at least one second communication apparatus by using the one of the at least one piece of subnet mask information obtained in step (b), to determine whether or not the first subnetwork address portion coincides with the second subnetwork address portion; and (d) repeating steps (a) to (c) to obtain one of the at least one entry of the second table, where the first subnetwork address portion of the one of the at least one entry of the second table determined in step (c) coincides with the second subnetwork address portion; (e) trying to obtain, when the one of the at least one entry of the second table is obtained in step (d), one of the at least one piece of data-link-layer path information stored in one of the at least one entry of the first table which entry is pointed to by the one of the at least one piece of pointer information stored in the one of the at least one entry of the second table obtained in step (d); and (f) searching the third table based on the network-layer address of the one of the at least one second communication apparatus, to obtain one of the at least one piece of network-layer path information corresponding to the network-layer address of the one of the at least one second communication apparatus, when no piece of pointer information is stored in the at least one entry of the second table, or no piece of subnet mask information is obtained in step (b) through the repeating operation in step (d), or no entry of the second table is obtained in step (d), or no piece of data-link-layer path information is obtained in step (e).

(22) According to an twenty-second aspect of the present invention, there is provided a product for use with a first communication apparatus which is capable of communicating with at least one second communication apparatus when the first communication apparatus and the at least one second communication apparatus are connected to a network which is logically divided into a plurality of subnetworks based on network-layer addresses. The product, when used with the first communication apparatus, is able to output control information which directs the communication apparatus to execute the above process according to the twenty-first aspect of the present invention.

(23) According to a twenty-third aspect of the present invention, there is provided a communication apparatus which is capable of communicating with at least one other communication apparatus when the communication apparatus and the at least one other communication apparatus are connected to a network which is logically divided into a plurality of subnetworks based on network-layer addresses. The communication apparatus contains a routing table for storing routing information indicating at least one communication path to at least one routing apparatus, corresponding to at least one network-layer address of the at least one other communication apparatus, where a message to be sent to each of the at least one other communication apparatus based on the network-layer address of the said each of the at least one other communication apparatus, is to be first transferred to one of the at least one routing apparatus corresponding to the network-layer address of the said each of the at least one other communication apparatus; and a data-link-layer path table for storing at least one piece of data-link-layer path information, each of the at least one piece of data-link-layer path information indicating a communication path in a data link layer to one of the at least one other communication apparatus. The data-link-layer path table has, as one of at least one entry thereof, a default entry for storing a piece of data-link-layer path information which indicates a communication path in the data link layer enabling a communication to every one of the at least one other communication apparatus.

(24) According to the twenty-fourth aspect of the present invention, there is provided a process for determining layer-2 reachability between first and second communication apparatuses each connected to a layer-3 communication network comprised of at least one router and a plurality of subnetworks logically defined over at least one layer-2-connected communication network. The process contains the steps of: (a) determining a layer-3 communication path from the first communication apparatus to the second communication apparatus through a portion or all of the at least one router, based on a layer-3 address of the second communication apparatus, where a first router on the layer-3 communication path is connected to the first communication apparatus through a first interface and a first one of the plurality of subnetworks on the layer-3 communication path, and a second router on the layer-3 communication path is connected to the second communication apparatus through a second interface and a second one of the plurality of subnetworks on the layer-3 communication path; (b) identifying a first one of the at least one layer-2-connected communication network to which the first interface is connected; (c) identifying a second one of the at least one layer-2-connected communication network to which the second interface is connected; and (d) determining whether or not the first and second ones of the at least one layer-2-connected communication network are identical, to thereby determine whether or not the first and second communication apparatuses can communicate with each other by using a layer-2 communication path only.

(24-1) In the above process according to the twenty-fourth aspect of the present invention, the layer-3 communication network may contain at least one storage for storing at least one piece of interface-network correspondence information indicating one of the at least one layer-2-connected communication network to which each of the first and second interfaces is connected. The operations in steps (b) and (c) may be performed based on the at least one piece of interface-network correspondence information.

(24-2) In the above process according to the twenty-fourth aspect of the present invention, the layer-3 communication network may contain a decision device which performs the operation of step (d). The process may further contain the sub-steps of, (e) transmitting a result of the operation of step (b), from the first router to the decision device, and (f) transmitting a result of the operation of step (c), from the second router to the decision device.

(24-3) In the above process according to the twenty-fourth aspect of the present invention, the second router may contain a decision device which performs the operation of step (d). The process may further contain the sub-steps of (e) transmitting a result of the operation of step (b) from the first router to the second router and (f) transmitting a result of the operation of step (d) from the second router to the first router.

(24-4) In the above process according to the twenty-fourth aspect of the present invention, the first router may contain a decision device which performs the operation of step (d). The process may further contain the sub-step of (e) transmitting a result of the operation of step (c) from the second router to the first router.

(25) According to the twenty-fifth aspect of the present invention, there is provided an apparatus for determining layer-2 reachability between first and second communication apparatuses each connected to a layer-3 communication network comprised of at least one router and a plurality of subnetworks logically defined over at least one layer-2-connected communication network, and a layer-3 communication path passing a portion or all of the at least one router can be determined by the portion or all of the at least one router based on a layer-3 address of the second communication apparatus. The apparatus contains a first identifying unit for identifying a first one of the at least one layer-2-connected communication network to which a first interface of a first router on the layer-3 communication path is connected, where the first router is connected to the first communication apparatus through the first interface and a first one of the plurality of subnetworks on the layer-3 communication path; a second identifying unit for identifying a second one of the at least one layer-2-connected communication network to which a second interface of a second router on the layer-3 communication path is connected, where the second router is connected to the second communication apparatus through the second interface and a second one of the plurality of subnetworks on the layer-3 communication path; a determining unit for determining whether or not the first and second ones of the at least one layer-2-connected communication network are identical, to thereby determine whether or not the first and second communication apparatuses can communicate with each other by using a layer-2 communication path only.

(25-1) In the above apparatus according to the twenty-fifth aspect of the present invention, one of the layer-3 communication network and the apparatus may contain at least one interface-network correspondence information storing unit for storing at least one piece of interface-network correspondence information indicating the first and second ones of the at least one layer-2-connected communication network corresponding to the first and second interfaces, respectively. The operation of the determining unit may be performed based on the at least one piece of interface-network correspondence information.

(25-2) In the above apparatus according to (25-1), one of the layer-3 communication network and the apparatus may contain an interface-network correspondence setting unit for setting the at least one piece of interface-network correspondence information in the at least one interface-network correspondence information storing unit.

(26) According to the twenty-sixth aspect of the present invention, there is provided a product for use with an apparatus for determining layer-2 reachability between first and second communication apparatuses each connected to a layer-3 communication network comprised of at least one router and a plurality of subnetworks logically defined over at least one layer-2-connected communication network, and a layer-3 communication path passing a portion or all of the at least one router can be determined by the portion or all of the at least one router based on a layer-3 address of the second communication apparatus. The product, when used with the apparatus, is able to output control information which directs the apparatus to realize the units defined in the twenty-fifth aspect of the present invention.

(27) According to the twenty-seventh aspect of the present invention, there is provided an apparatus for determining layer-2 reachability between first and second communication apparatuses each connected to a layer-3 communication network comprised of at least one router and a plurality of subnetworks logically defined over at least one layer-2-connected communication network, and a layer-3 communication path passing a portion or all of the at least one router can be determined by the portion or all of the at least one router based on a layer-3 address of the second communication apparatus. The apparatus contains a first interface identifying unit for identifying a first interface of a first router on the layer-3 communication path, where the first router is connected to the first communication apparatus through the first interface and a first one of the plurality of subnetworks on the layer-3 communication path; a second interface identifying unit for identifying a second interface of a second router on the layer-3 communication path, where the second router is connected to the second communication apparatus through the second interface and a second one of the plurality of subnetworks on the layer-3 communication path; a first network identifying unit for identifying a first one of the at least one layer-2-connected communication network to which the first interface is connected; a second network identifying unit for identifying a second one of the at least one layer-2-connected communication network to which the second interface is connected; a determining unit for determining whether or not the first and second ones of the at least one layer-2-connected communication network are identical, to thereby determine whether or not the first and second communication apparatuses can communicate with each other by using a layer-2 communication path only.

(27-1) In the above apparatus according to the twenty-seventh aspect of the present invention, one of the layer-3 communication network and the apparatus may contain at least one interface-network correspondence information storing unit for storing at least one piece of interface-network correspondence information indicating the first and second ones of the at least one layer-2-connected communication network corresponding to the first and second interfaces, respectively. The operations of the first and second network identifying units may be performed based on the at least one piece of interface-network correspondence information.

(27-2) In the above apparatus according to (27-1), one of the layer-3 communication network and the apparatus may contain an interface-network correspondence setting unit for setting the at least one piece of interface-network correspondence information in the at least one interface-network correspondence information storing unit.

(28) According to the twenty-eighth aspect of the present invention, there is provided a product for use with an apparatus for determining layer-2 reachability between first and second communication apparatuses each connected to a layer-3 communication network comprised of at least one router and a plurality of subnetworks logically defined over at least one layer-2-connected communication network, and a layer-3 communication path passing a portion or all of the at least one router can be determined by the portion or all of the at least one router based on a layer-3 address of the second communication apparatus. The product, when used with the apparatus, is able to output control information which directs the apparatus to realize the units defined in the twenty-seventh aspect of the present invention.

(29) According to the twenty-ninth aspect of the present invention, there is provided a process for determining layer-2 reachability between first and second communication apparatuses each connected to a layer-3 communication network comprised of at least one router and a plurality of subnetworks logically defined over at least one layer-2-connected communication network. The process contains the steps of: (a) transmitting a first message containing a layer-3 address of the second communication apparatus, from the first communication apparatus to a first router among the at least one router, where the first communication apparatus and the first router are connected to a first one of the plurality of subnetworks; (b) receiving, at the first router, the first message through a first interface; (c) identifying a first one of the at least one layer-2-connected communication network to which the first interface is connected; (d) transmitting a second message containing the layer-3 address of the second communication apparatus and network information indicating the first one of the at least one layer-2-connected communication network, from the first router to a second router among the at least one router, on a layer-3 communication path passing a portion or all of the at least one router and being determined by the portion or all of the at least one router based on the layer-3 address of the second communication apparatus, where the second router is connected to the second communication apparatus through a second interface of the second router and a second one of the plurality of subnetworks on the layer-3 communication path; (e) receiving the second message at the second router; (f) identifying a second one of the at least one layer-2-connected communication network to which the second interface is connected; and (g) determining whether or not the first and second ones of the at least one layer-2-connected communication network are identical, to thereby determine whether or not the first and second communication apparatuses can communicate with each other by using a layer-2 communication path only.

(29-1) In the above process according to the twenty-ninth aspect of the present invention, the first router may contain a storage for storing a first piece of interface-network correspondence information indicating the first one of the at least one layer-2-connected communication network to which the first interface is connected. The second router may contain a storage for storing a second piece of interface-network correspondence information indicating the second one layer-2-connected communication network to which the second interface is connected. The operations in steps (c) and (f) may be performed based on the first and second pieces of interface-network correspondence information, respectively.

(30) According to the thirtieth aspect of the present invention, there is provided an apparatus, for use with each of at least one router provided in a layer-3 communication network comprised of a plurality of subnetworks logically defined over at least one layer-2-connected communication network, and for determining layer-2 reachability between first and second communication apparatuses each connected to the layer-3 communication network, where a layer-3 communication path passing a portion or all of the at least one router can be determined by the portion or all of the at least one router based on a layer-3 address of the second communication apparatus. The apparatus contains a network identifying unit, a transmitting unit, a receiving unit, and a determining unit. The network identifying unit identifies a first one of the at least one layer-2-connected communication network to which a first interface of the said each of the at least one router is connected, in the first case wherein the said each of the at least one router is connected to the first communication apparatus through the first interface of the router and a first one of the plurality of subnetworks, and the said each of the at least one router is a first router on the layer-3 communication path, and the first interface is on the layer-3 communication path. The network identifying unit identifies a second one of the at least one layer-2-connected communication network to which a second interface of the said each of the at least one router is connected, in the second case wherein the said each of the at least one router is connected to the second communication apparatus through the second interface of the router and a second one of the plurality of subnetworks, and the said each of the at least one router is a second router on the layer-3 communication path, and the second interface is on the layer-3 communication path. In the above first case, the transmitting unit transmits network information indicating the first one of the at least one layer-2-connected communication network, from the first router to the second router. In the second case, the receiving unit receives the network information transmitted from the first router. In the second case, the determining unit determines whether or not the first and second ones of the at least one layer-2-connected communication network are identical, to thereby determine whether or not the first and second communication apparatuses can communicate with each other by using a layer-2 communication path only.

(30-1) In the above apparatus according to the thirtieth aspect of the present invention, one of the said each of the at least one router and the apparatus may contain at least one interface-network correspondence information storing unit for storing at least one piece of interface-network correspondence information indicating one of the at least one layer-2-connected communication network corresponding to each of at least one interface which the said each of the at least one router comprises. The operations of the network identifying units may be performed based on the at least one piece of interface-network correspondence information.

(30-2) In the above apparatus according to (30-1), one of the said each of the at least one router and the apparatus may contain an interface-network correspondence setting unit for setting the at least one piece of interface-network correspondence information in the at least one interface-network correspondence information storing unit.

(31) According to the thirty-first aspect of the present invention, there is provided a product for use with an apparatus, for use with each of at least one router provided in a layer-3 communication network comprised of a plurality of subnetworks logically defined over at least one layer-2-connected communication network, and for determining layer-2 reachability between first and second communication apparatuses each connected to the layer-3 communication network, where a layer-3 communication path passing a portion or all of the at least one router can be determined by the portion or all of the at least one router based on a layer-3 address of the second communication apparatus. The product, when used with the apparatus, is able to output control information which directs the apparatus to realize the units defined in the thirtieth aspect of the present invention.

(32) According to the thirty-second aspect of the present invention, there is provided a process for determining layer-2 reachability between first and second communication apparatuses each connected to a layer-3 communication network comprised of at least one router and a plurality of subnetworks logically defined over at least one layer-2-connected communication network. The process contains the steps of: (a) transmitting a first message containing a layer-3 address of the second communication apparatus, from the first communication apparatus to a first router among the at least one router, where the first communication apparatus and the first router are connected to a first one of the plurality of subnetworks; (b) receiving, at the first router, the first message through a first interface; (c) identifying a first one of the at least one layer-2-connected communication network to which the first interface is connected; (d) transmitting a second message containing the layer-3 address of the second communication apparatus, from the first router to a second router among the at least one router, on a layer-3 communication path passing a portion or all of the at least one router and being determined by the portion or all of the at least one router based on the layer-3 address of the second communication apparatus, where the second router is connected to the second communication apparatus through a second interface of the second router and a second one of the plurality of subnetworks on the layer-3 communication path; (e) receiving, at the second router, the second message transmitted from the first router through the layer-3 communication path; (f) identifying a second one of the at least one layer-2-connected communication network to which the second interface is connected; (g) transmitting a third message containing the second one of the at least one layer-2-connected communication network, from the second router to the first router through the layer-3 communication path; (h) receiving, at the first router, the third message transmitted from the second router through the layer-3 communication path; and (i) determining whether or not the first and second ones of the at least one layer-2-connected communication network are identical, to thereby determine whether or not the first and second communication apparatuses can communicate with each other by using a layer-2 communication path only.

(32-1) In the above process according to the thirty-second aspect of the present invention, the first router may contain a storage for storing a first piece of interface-network correspondence information indicating the first one of the at least one layer-2-connected communication network to which the first interface is connected. The second router may contain a storage for storing a second piece of interface-network correspondence information indicating the second one layer-2-connected communication network to which the second interface is connected. The operations in steps (c) and (f) may be performed based on the first and second pieces of interface-network correspondence information, respectively.

(33) According to the thirty-third aspect of the present invention, there is provided an apparatus, for use with each of at least one router provided in a layer-3 communication network comprised of a plurality of subnetworks logically defined over at least one layer-2-connected communication network, and for determining layer-2 reachability between first and second communication apparatuses each connected to the layer-3 communication network, where a layer-3 communication path passing a portion or all of the at least one router can be determined by the portion or all of the at least one router based on a layer-3 address of the second communication apparatus. The apparatus contains a network identifying unit, a transmitting unit, a receiving unit, and a determining unit. The network identifying unit identifies a first one of the at least one layer-2-connected communication network to which a first interface is connected, in the first case wherein the said each of the at least one router is connected to the first communication apparatus through the first interface of the router and a first one of the plurality of subnetworks, and the said each of the at least one router is a first router on the layer-3 communication path, and the first interface is on the layer-3 communication path. The network identifying unit identifies a second one of the at least one layer-2-connected communication network to which a second interface is connected, in the second case wherein the said each of the at least one router is connected to the second communication apparatus through the second interface of the router and a second one of the plurality of subnetworks, the said each of the at least one router is a second router on the layer-3 communication path, and the second interface is on the layer-3 communication path. In the second case, the transmitting unit transmits network information indicating the second one of the at least one layer-2-connected communication network, from the second router to the first router. In the first case, the receiving unit receives the network information transmitted from the second router. In the first case, the determining unit determines whether or not the first and second ones of the at least one layer-2- connected communication network are identical, to thereby determine whether or not the first and second communication apparatuses can communicate with each other by using a layer-2 communication path only.

(33-1) In the above apparatus according to the thirty-third aspect of the present invention, one of the said each of the at least one router and the apparatus may contain at least one interface-network correspondence information storing unit for storing at least one piece of interface-network correspondence information indicating one of the at least one layer-2-connected communication network corresponding to each of at least one interface which the said each of the at least one router comprises. The operations of the network identifying units may be performed based on the at least one piece of interface-network correspondence information.

(33-2) In the above apparatus according to (33-1), one of the said each of the at least one router and the apparatus may contain an interface-network correspondence setting unit for setting the at least one piece of interface-network correspondence information in the at least one interface-network correspondence information storing unit.

(34) According to the thirty-fourth aspect of the present invention, there is provided a product for use with an apparatus, for use with each of at least one router provided in a layer-3 communication network comprised of a plurality of subnetworks logically defined over at least one layer-2-connected communication network, and for determining layer-2 reachability between first and second communication apparatuses each connected to the layer-3 communication network, where a layer-3 communication path passing a portion or all of the at least one router can be determined by the portion or all of the at least one router based on a layer-3 address of the second communication apparatus. The product, when used with the apparatus, is able to output control information which directs the apparatus to realize the units defined in the thirty-third aspect of the present invention.

(35) According to the thirty-fifth aspect of the present invention, there is provided a process for determining, during transfer of a message, layer-2 reachability between first and second communication apparatuses each connected to a layer-3 communication network comprised of at least one router and a plurality of subnetworks logically defined over at least one layer-2-connected communication network, where the message contains a layer-3 address of the second communication apparatus, the transfer of the message is performed on a layer-3 communication path passing through a portion or all of the at least one router from the first communication apparatus to the second communication apparatus, and the layer-3 communication path is determined based on the layer-3 address of the second communication apparatus. The process contains the steps of (a) identifying, at each of the portion or all of the at least one router, a first one of the at least one layer-2-connected communication network to which a first interface of the said each of the portion or all of the at least one router is connected, and a second one of the at least one layer-2-connected communication network to which a second interface of the said each of the portion or all of the at least one router is connected, where the message is received through the first interface, and the second interface is determined to be an output interface for the message, based on the layer-3 address of the second communication apparatus; (b) comparing, at the said each of the portion or all of the at least one router, the first and second ones of the at least one layer-2-connected communication network, to determine whether or not first and second ones of the at least one layer-2-connected communication network are identical; (c) determining that the first and second communication apparatuses cannot communicate with each other by using a layer-2 communication path only, and stopping the transfer of the message, when the first and second ones of the at least one layer-2-connected communication network are determined, in step (b), not to be identical; and (d) transferring the message to a next router on the layer-3 communication path, when the first and second ones of the at least one layer-2-connected communication network are determined, in step (b), to be identical, and the said each of the portion or all of the at least one router is not a last router on the layer-3 communication path; and (e) determining that the first and second communication apparatuses can communicate with each other by using a layer-2 communication path only, when the first and second ones of the at least one layer-2-connected communication network are determined, in step (b), to be identical, and the said each of the portion or all of the at least one router is the last router on the layer-3 communication path.

(35-1) In the above process according to the thirty-fifth aspect of the present invention, each of the at least one router may contain at least one interface-network correspondence information storing unit for storing at least one piece of interface-network correspondence information indicating one of the at least one layer-2-connected communication network corresponding to each of at least one interface which the said each of the at least one router may contain. The operation of step (a) is performed based on the at least one piece of interface-network correspondence information.

(35-2) In the above process according to the thirty-fifth aspect of the present invention, the said each of the at least one router may contain an interface-network correspondence setting unit for setting the at least one piece of interface-network correspondence information in the at least one interface-network correspondence information storing unit.

(36) According to the thirty-sixth aspect of the present invention, there is provided an apparatus, for use with each of at least one router provided in a layer-3 communication network comprised of a plurality of subnetworks logically defined over at least one layer-2-connected communication network, and for determining, during transfer of a message, layer-2 reachability between first and second communication apparatuses each connected to the layer-3 communication network, where the message contains a layer-3 address of the second communication apparatus, the transfer of the message is performed on a layer-3 communication path passing through a portion or all of the at least one router from the first communication apparatus to the second communication apparatus, and the layer-3 communication path is determined based on the layer-3 address of the second communication apparatus. The apparatus contains a network identifying unit for identifying a first one of the at least one layer-2-connected communication network to which a first interface of the said each of the at least one router is connected, and a second one of the at least one layer-2-connected communication network to which a second interface of the said each of the at least one router is connected, in a case wherein the said each of at least one router receives the message through the first interface thereof, and the said each of the at least one router determines the second interface to be an output interface for the message, based on the layer-3 address of the second communication apparatus; a comparing unit for comparing said first and second ones of said at least one layer-2-connected communication network, to determine whether or not first and second ones of said at least one layer-2-connected communication network are identical; a first determining unit for determining that said first and second communication apparatuses cannot communicate with each other by using a layer-2 communication path only, and stopping the transfer of the message, when said first and second ones of said at least one layer-2-connected communication network are determined, by said comparing unit, not to be identical; a transferring unit for transferring said message to a next router on the layer-3 communication path, when said first and second ones of said at least one layer-2-connected communication network are determined, by said comparing unit, to be identical, and said each of said portion or all of said at least one router is not a last router on the layer-3 communication path; and a second determining unit for determining that said first and second communication apparatuses can communicate with each other by using a layer-2 communication path only, when said first and second ones of said at least one layer-2-connected communication network are determined, by said comparing unit, to be identical, and said each of said portion or all of said at least one router is the last router on the layer-3 communication path.

(36-1) In the above process according to the thirty-sixth aspect of the present invention, each of the at least one router may contain at least one interface-network correspondence information storing unit for storing at least one piece of interface-network correspondence information indicating one of the at least one layer-2-connected communication network corresponding to each of at least one interface which the said each of the at least one router comprises. The operation of the network identifying unit is performed based on the at least one piece of interface-network correspondence information.

(36-2) In the above process according to (36-1), the said each of the at least one router may contain an interface-network correspondence setting unit for setting the at least one piece of interface-network correspondence information in the at least one interface-network correspondence information storing unit.

(37) According to the thirty-seventh aspect of the present invention, there is provided a product for use with an apparatus, for use with each of at least one router provided in a layer-3 communication network comprised of a plurality of subnetworks logically defined over at least one layer-2-connected communication network, and for determining, during transfer of a message, layer-2 reachability between first and second communication apparatuses each connected to the layer-3 communication network, where the message contains a layer-3 address of the second communication apparatus, the transfer of the message is performed on a layer-3 communication path passing through a portion or all of the at least one router from the first communication apparatus to the second communication apparatus, and the layer-3 communication path is determined based on the layer-3 address of the second communication apparatus. The product, when used with the apparatus, is able to output control information which directs the apparatus to realize the units defined in the thirty-sixth aspect of the present invention.

BRIEF DESCRIPTION OF THE DRAWINGS

In the drawings:

FIG. 3B is a diagram illustrating the basic sequence of the process according to the ninth aspect of the present invention;

FIG. 13 is a diagram illustrating an example of contents of a routing table;

FIG. 14 is a diagram illustrating an example of contents of a route cache;

FIG. 15 is a diagram illustrating an example of contents of an NH cache;

FIG. 27 is a diagram illustrating an example construction of the apparatus in the fifth embodiment of the present invention;

FIG. 28A is a diagram illustrating example contents of the interface-network correspondence information in the router R1 in the configuration of FIG. 26;

FIG. 28B is a diagram illustrating example contents of the interface-network correspondence information in the router R2 in the configuration of FIG. 26;

FIG. 28C is a diagram illustrating example contents of the interface-network correspondence information in the router R3 in the configuration of FIG. 26;

FIG. 29 is a diagram illustrating example contents of a message transferred between the first and second communication apparatuses in the process according to the twenty-ninth or thirty-fifth aspect of present invention, using the apparatus according to the thirtieth, thirty-third, or thirty-sixth aspect of the present invention;

FIG. 30A is a diagram illustrating example contents of a message transferred from the router R1 to the router R3, when the process according to the twenty-ninth aspect of the present invention is executed on the configuration of FIG. 26, or when the apparatus according to the thirtieth aspect of the present invention is used in the configuration of FIG. 26;

FIG. 30B is a diagram illustrating example contents of a message transferred from the router R3 to the router R1, when the process according to the twenty-ninth aspect of the present invention is executed on the configuration of FIG. 26, or when the apparatus according to the thirtieth aspect of the present invention is used in the configuration of FIG. 26;

FIG. 31A is a diagram illustrating example contents of a message transferred from the router R1 to the router R3, when the process according to the thirty-second aspect of the present invention is executed on the configuration of FIG. 26, or when the apparatus according to the thirty-third aspect of the present invention is used in the configuration of FIG. 26;

FIG. 31B is a diagram illustrating example contents of a message transferred from the router R3 to the router R1, when the process according to the thirty-second aspect of the present invention is executed on the configuration of FIG. 26, or when the apparatus according to the thirty-third aspect of the present invention is used in the configuration of FIG. 26;

FIG. 31C is a diagram illustrating example contents of a message transferred from the router R1 to the host H1, when the process according to the thirty-second aspect of the present invention is executed on the configuration of FIG. 26, or when the apparatus according to the thirty-third aspect of the present invention is used in the configuration of FIG. 26;

FIG. 33A is a diagram illustrating example contents of the interface-network correspondence information in the router R1' in the configuration of FIG. 32;

FIG. 33B is a diagram illustrating example contents of the interface-network correspondence information in the router R2' in the configuration of FIG. 32;

FIG. 33C is a diagram illustrating example contents of the interface-network correspondence information in the router R3' in the configuration of FIG. 32;

FIG. 34A is a diagram illustrating example contents of the interface-network correspondence information in the router R4' in the configuration of FIG. 32;

FIG. 34B is a diagram illustrating example contents of the interface-network correspondence information in the router R5' in the configuration of FIG. 32;

FIG. 35A is a diagram illustrating example contents of a message transferred from the router R1' to the router R5', when the process according to the twenty-ninth aspect of the present invention is executed on the configuration of FIG. 32, or when the apparatus according to the thirtieth aspect of the present invention is used in the configuration of FIG. 32;

FIG. 35B is a diagram illustrating example contents of a message transferred from the router R5' to the router R1', when the process according to the twenty-ninth aspect of the present invention is executed on the configuration of FIG. 32, or when the apparatus according to the thirtieth aspect of the present invention is used in the configuration of FIG. 32;

FIG. 36A is a diagram illustrating example contents of a message transferred from the router R1' to the router R5', when the process according to the thirty-second aspect of the present invention is executed on the configuration of FIG. 32, or when the apparatus according to the thirty-third aspect of the present invention is used in the configuration of FIG. 32;

FIG. 36B is a diagram illustrating example contents of a message transferred from the router R5' to the router R1', when the process according to the thirty-second aspect of the present invention is executed on the configuration of FIG. 32, or when the apparatus according to the thirty-third aspect of the present invention is used in the configuration of FIG. 32;

FIG. 36C is a diagram illustrating example contents of a message transferred from the router R1' to the host H1, when the process according to the thirty-second aspect of the present invention is executed on the configuration of FIG. 32, or when the apparatus according to the thirty-third aspect of the present invention is used in the configuration of FIG. 32;

FIG. 37 is a diagram illustrating the third example configuration of the network;

FIG. 38A is a diagram illustrating example contents of the interface-network correspondence information in the router R1" in the configuration of FIG. 37;

FIG. 38B is a diagram illustrating example contents of the interface-network correspondence information in the router R2" in the configuration of FIG. 37;

FIG. 38C is a diagram illustrating example contents of the interface-network correspondence information in the router R3" in the configuration of FIG. 37;

FIG. 39A is a diagram illustrating example contents of the interface-network correspondence information in the router R4" in the configuration of FIG. 37;

FIG. 39B is a diagram illustrating example contents of the interface-network correspondence information in the router R5" in the configuration of FIG. 37;

FIG. 39C is a diagram illustrating example contents of the interface-network correspondence information in the router R6" in the configuration of FIG. 37;

FIG. 40A is a diagram illustrating example contents of a message transferred from the router R1" to the router R6", when the process according to the twenty-ninth aspect of the present invention is executed on the configuration of FIG. 37, or when the apparatus according to the thirtieth aspect of the present invention is used in the configuration of FIG. 37;

FIG. 40B is a diagram illustrating example contents of a message transferred from the router R6" to the router R1", when the process according to the twenty-ninth aspect of the present invention is executed on the configuration of FIG. 37, or when the apparatus according to the thirtieth aspect of the present invention is used in the configuration of FIG. 37;

FIG. 41A is a diagram illustrating example contents of a message transferred from the router R1" to the router R6", when the process according to the thirty-second aspect of the present invention is executed on the configuration of FIG. 37, or when the apparatus according to the thirty-third aspect of the present invention is used in the configuration of FIG. 37;

FIG. 41B is a diagram illustrating example contents of a message transferred from the router R6" to the router R1", when the process according to the thirty-second aspect of the present invention is executed on the configuration of FIG. 37, or when the apparatus according to the thirty-third aspect of the present invention is used in the configuration of FIG. 37;

FIG. 41C is a diagram illustrating example contents of a message transferred from the router R1" to the host H1, when the process according to the thirty-second aspect of the present invention is executed on the configuration of FIG. 37, or when the apparatus according to the thirty-third aspect of the present invention is used in the configuration of FIG. 37;

FIG. 44A is a diagram illustrating an example content of a message transferred from the host H1 to the router R1, R1', or R1", when the process according to the thirty-fifth aspect of the present invention is executed on the configurations of FIGS. 26, 32, and 37, or when the apparatus according to the thirty-sixth aspect of the present invention is used in the configurations of FIGS. 26, 32, and 37;

FIG. 44B is a diagram illustrating example contents of a message transferred from the router R3 to the router R1, when the process according to the thirty-fifth aspect of the present invention is executed on the configuration of FIG. 26, or when the apparatus according to the thirty-sixth aspect of the present invention is used in the configuration of FIG. 26; and FIGS. 45 and 46 are diagrams illustrating two examples of a message transferred from the router R2' or R3" to the router R1' or R1", when the process according to the thirty-fifth aspect of the present invention is executed on the configuration of FIG. 32 or 37, or when the apparatus according to the thirty-sixth aspect of the present invention is used in the configuration of FIG. 32 or 37.

DESCRIPTION OF THE PREFERRED EMBODIMENTS

OPERATIONS OR CONSTRUCTIONS OF FIRST TO FOURTH ASPECTS OF INVENTION (FIG. 1)

The first to fourth aspects of the present invention relate to forming tables in a communication apparatus for use in routing to accelerate routing processing.

Figure 1:
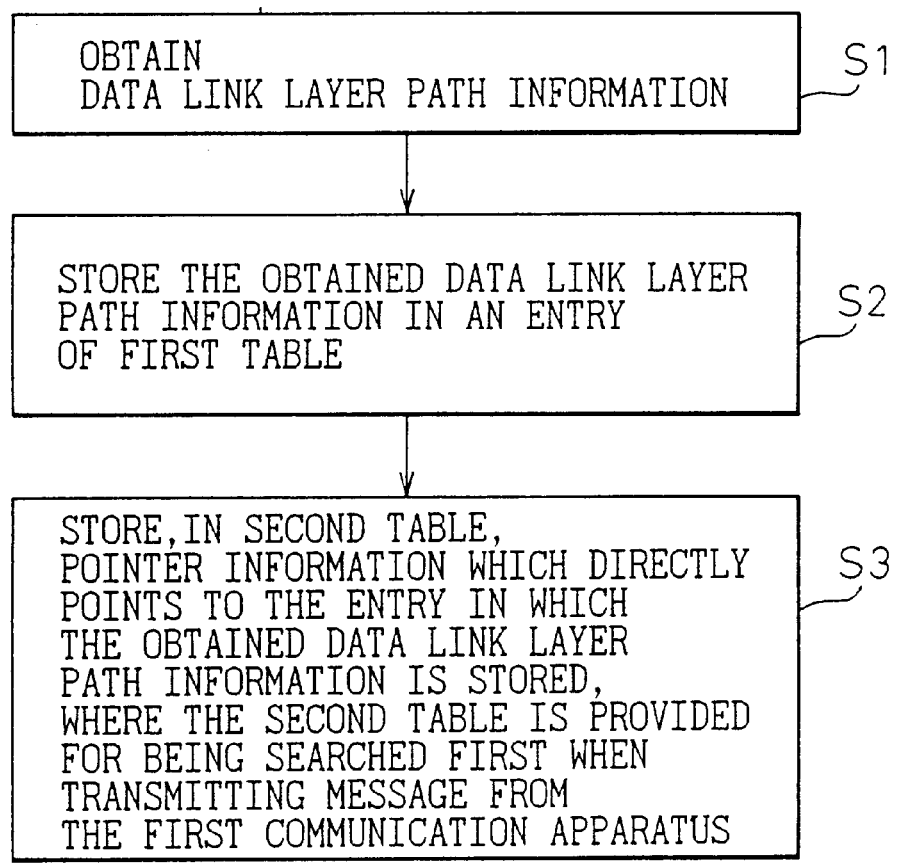
FIG. 1 is a diagram illustrating the basic sequence of the processes according to the first and third aspects of the present invention.

FIG. 1 illustrates the basic sequence of the process according to the first aspect of the present invention. The steps S1, S2, and S3, indicated in FIG. 1, respectively correspond to the steps (a), (b), and (c), described in the "SUMMARY OF THE INVENTION", paragraph (1).

The communication apparatus in the first aspect of the present invention is, for example, a station which can be accessed based on an address assigned thereto, such as the aforementioned hosts and routers.

As a result of an execution of the process according to the first aspect of the present invention, the construction of the communication apparatus according to the fifth aspect of the present invention, as described in the "SUMMARY OF THE INVENTION", paragraph (5), is produced in the first communication apparatus in the first aspect of the present invention. As explained later in this specification, the searching process according to the seventh aspect of the present invention can be executed in the communication apparatus according to the fifth aspect of the present invention. In this respect, the process according to the first aspect of the present invention is useful.

As a first additional feature, in the above process according to the first aspect of the present invention, the first communication apparatus may contain a routing table which stores routing information indicating at least one communication path to at least one routing apparatus, corresponding to at least one network-layer address of the at least one second communication apparatus, where a message to be sent to each of the at least one second communication apparatus based on the network-layer address of the said each of the at least one second communication apparatus, is to be first transferred to one of the at least one routing apparatus corresponding to the network-layer address of the said each of the at least one second communication apparatus. The first communication apparatus may also contain a route cache which stores, in addition to the storage in the routing table, contents of a portion of the routing table. The second table may be provided in the route cache. Namely, in this case, the second table is provided in the route cache. Therefore, the use of the route cache further accelerates the routing processing.

Otherwise, as a second additional feature, in the above process according to the first aspect of the present invention, the first communication apparatus may contain the above routing table, and the second table may be provided as a portion of the routing table, instead of being provided in the route cache.

The product according to the second aspect of the present invention, described in the "SUMMARY OF THE INVENTION", paragraph (2), may be a storage medium such as a ROM, a CD-ROM, a CD-R, a DVD-ROM, a DVD-RAM, a DVD-R, and a floppy disc, or a programmed hardware logic circuit such as a custom LSI which, when used with a communication apparatus, outputs control signals and data for directing the communication apparatus to execute the process according to the first aspect of the present invention, respectively. In addition, either of the above additional features in the first aspect of the present invention, may be adopted in the process.

The sequence of FIG. 1 also corresponds to the process according to the third aspect of the present invention, described in the "SUMMARY OF THE INVENTION", paragraph (3), which is a process for storing, in a first communication apparatus, data-link-layer path information indicating a communication path in the data link layer from the first communication apparatus to one of at least one representative communication apparatus of one of a plurality of subnetworks (instead of the communication path to one of the at least one second communication apparatus as in the first aspect of the present invention). The data-link-layer path information obtained in the step (a) (corresponding to the step S1 in FIG. 1) in the process according to the third aspect of the present invention, is information on a communication path in a data link layer from the first communication apparatus to one of at least one representative communication apparatus of one of the plurality of subnetworks. This communication path is utilized in the case wherein it is not possible to establish a direct communication path from a source host to a destination host, and it is possible to establish a direct communication path from the source host to a representative host which belongs to the same subnetwork as the destination host belongs to.

As a result of an execution of the process according to the third aspect of the present invention, the construction of the communication apparatus according to the sixth aspect of the present invention, as described in the "SUMMARY OF THE INVENTION", paragraph (6), is produced in the first communication apparatus in the third aspect of the present invention.

The first additional feature to the third aspect of the present invention is described in the "SUMMARY OF THE INVENTION", paragraph (3-1). As a result of an execution of the sub-step in the first additional feature, the subnet mask information is stored in the second table. Namely, as a result of an execution of the process according to the third aspect of the present invention with the above first additional feature (3-1), the construction of the communication apparatus as described in the "SUMMARY OF THE INVENTION", paragraph (6-1), is produced in the first communication apparatus in the third aspect of the present invention. As explained later in this specification, the searching process according to the ninth aspect of the present invention can be executed in the communication apparatus as described in the "SUMMARY OF THE INVENTION", paragraph (6-1). In this respect, the process according to the third aspect of the present invention with the above first additional feature as described in the "SUMMARY OF THE INVENTION", paragraph (3-1) is useful.

The second additional feature to the third aspect of the present invention is described in the "SUMMARY OF THE INVENTION", paragraph (3-2). As a result of an execution of the sub-step in the second additional feature, the subnet mask information is stored in the first table. Namely, as a result of an execution of the process according to the third aspect of the present invention with the above second additional feature (3-2), the construction of the communication apparatus as described in the "SUMMARY OF THE INVENTION", paragraph (6-2), is produced in the first communication apparatus in the third aspect of the present invention. As explained later in this specification, the searching process according to the eleventh aspect of the present invention can be executed in the communication apparatus as described in the "SUMMARY OF THE INVENTION", paragraph (6-2). In this respect, the process according to the third aspect of the present invention with the above second additional feature as described in the "SUMMARY OF THE INVENTION", paragraph (3-2) is useful.

The product according to the fourth aspect of the present invention, described in the "SUMMARY OF THE INVENTION", paragraph (4), may be a storage medium such as a ROM, a CD-ROM, a CD-R, a DVD-ROM, a DVD-RAM, a DVD-R, and a floppy disc, or a programmed hardware logic circuit such as a custom LSI which, when used with a communication apparatus, outputs control signals and data for directing the communication apparatus to execute the process according to the third aspect of the present invention, respectively. In addition, either of the above additional features (3-1) and (3-2) in the third aspect of the present invention, may be adopted in the process.

OPERATIONS OR CONSTRUCTIONS OF FIFTH AND SIXTH ASPECTS OF INVENTION (FIG. 2)

The fifth and sixth aspects of the present invention relate to configurations of tables in a communication apparatus for use in routing processing, which are presented to accelerate the routing processing.

Figure 2:
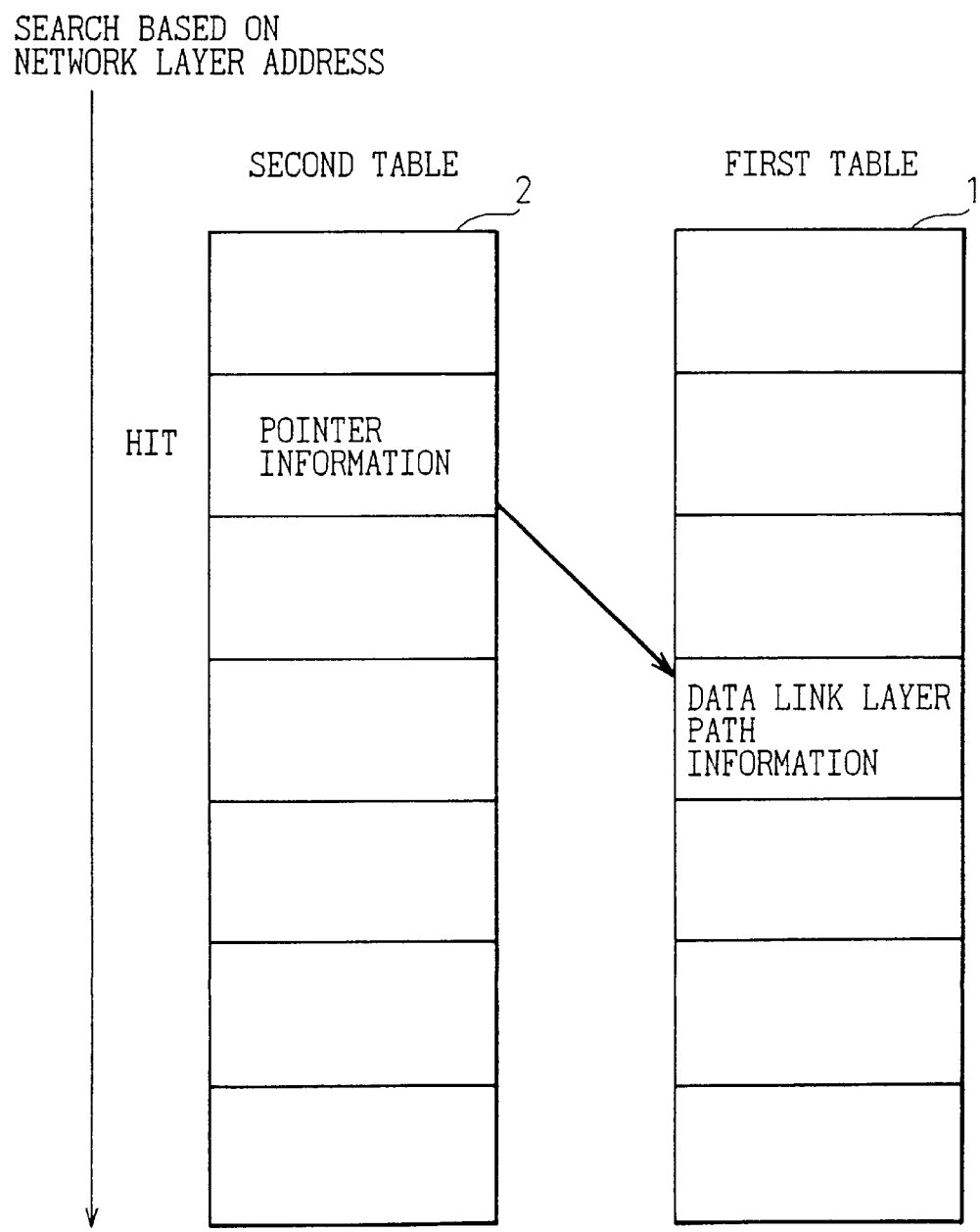
FIG. 2 is a diagram illustrating the basic construction of the communication apparatuses according to the fifth and sixth aspects of the present invention.

FIG. 2 illustrates the basic construction of the communication apparatus according to the fifth aspect of the present invention, which corresponds to the construction described in the "SUMMARY OF THE INVENTION", paragraph (5). In FIG. 2, reference numeral 1 denotes the first table, and 2 denotes the second table. The construction of the communication apparatus according to the fifth aspect of the present invention is realized by performing the process according to the first aspect of the present invention. As mentioned above, on the construction of the communication apparatus according to the fifth aspect of the present invention, a quick search by the process according to the seventh aspect of the present invention (as described in the "SUMMARY OF THE INVENTION", paragraph (7)) can be performed. The additional features (1—1) and (1-2) can also be adopted to the construction of the fifth aspect of the present invention.

The construction of FIG. 2 can also correspond to the construction of the communication apparatus according to the sixth aspect of the present invention, as described in the "SUMMARY OF THE INVENTION", paragraph (6). In the communication apparatus, the data-link-layer path information stored in the first table indicates a communication path in the data link layer from the first communication apparatus to one of at least one representative communication apparatus of one of the plurality of subnetworks (instead of the communication path to one of the at least one second communication apparatus as in the first aspect of the present invention). This communication path is utilized in the case wherein it is not possible to establish a direct communication path from a source host to a destination host, and it is possible to establish a direct communication path from the source host to a representative host which belongs to the same subnetwork as the destination host belongs to. The construction of the communication apparatus, according to the sixth aspect of the present invention, is obtained as a result of the execution of the process according to the third aspect of the present invention.

The first additional feature to the sixth aspect of the present invention is described in the "SUMMARY OF THE INVENTION", paragraph (6-1). According to the first additional feature (6-1), the subnet mask information is stored in the second table. As mentioned above, the searching process according to the ninth aspect of the present invention can be executed in the communication apparatus as described in the "SUMMARY OF THE INVENTION", paragraph (6-1).

The second additional feature to the sixth aspect of the present invention is described in the "SUMMARY OF THE INVENTION", paragraph (6-2). According to the second additional feature (6-2), the subnet mask information is stored in the second table. As mentioned above, the searching process according to the eleventh aspect of the present invention can be executed in the communication apparatus as described in the "SUMMARY OF THE INVENTION", paragraph (6-2).

OPERATIONS AND CONSTRUCTIONS OF SEVENTH TO TWELFTH ASPECTS OF INVENTION (FIGS. 2, 3A, 3B, AND 3C)

The seventh to twelfth aspects of the present invention relate to route search operations by using the tables according to the fifth and sixth aspects of the present invention, and realize accelerated routing processing.

Figure 3A:
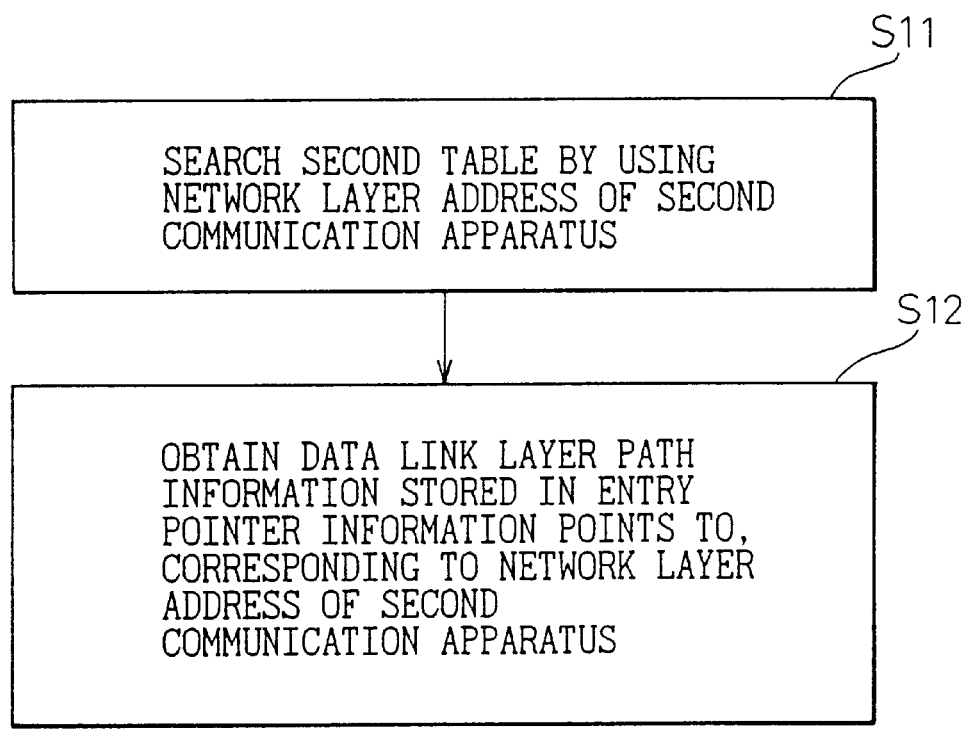
FIG. 3A is a diagram illustrating the basic sequence of the process according to the seventh aspect of the present invention.

FIG. 3A illustrates the basic sequence of the process according to the seventh aspect of the present invention. The steps S11 and S12, indicated in FIG. 3A, respectively correspond to the steps (a) and (b), described in the "SUMMARY OF THE INVENTION", paragraph (7). The process according to the seventh aspect of the present invention is an essential portion of the routing processing, and can be performed speedily by benefiting from the above construction of the fifth aspect of the present invention which can be constructed by the process of the first aspect of the present invention. The additional features (1—1) and (1-2) can also be adopted to the process of the seventh aspect of the present invention.

In the process according to the seventh aspect of the present invention, when the second table is first searched, according to the sequence of FIG. 3A, for transmission of a message from the first communication apparatus to the second communication apparatus, the pointer information which points to the entry in the first table, is obtained from the second table, and the data-link-layer path information, obtained in step S11, on the data-link-layer path to the second communication apparatus, is stored in this entry. Therefore, the content of (the data-link-layer path information stored in) this entry of the first table can be immediately obtained based on the pointer information. Thus, the speed of the routing processing is increased.

The product according to the eighth aspect of the present invention, described in the "SUMMARY OF THE INVENTION", paragraph (8), may be a storage medium such as a ROM, a CD-ROM, a CD-R, a DVD-ROM, a DVD-RAM, a DVD-R, and a floppy disc, or a programmed hardware logic circuit such as a custom LSI which, when used with a communication apparatus, outputs control signals and data for directing the communication apparatus to execute the process according to the seventh aspect of the present invention. In addition, either of the above additional features (1—1) and (1-2), may also be adopted in the process.

FIG. 3B illustrates the basic sequence of the process according to the ninth aspect of the present invention. The steps S21 to S25, indicated in FIG. 3B, respectively correspond to the steps (a) to (e), described in the "SUMMARY OF THE INVENTION", paragraph (9). The process according to the ninth aspect of the present invention is an essential portion of the routing processing, and can be performed speedily by benefiting from the above construction of the sixth aspect of the present invention with its additional feature (6-1).

Figure 3C:
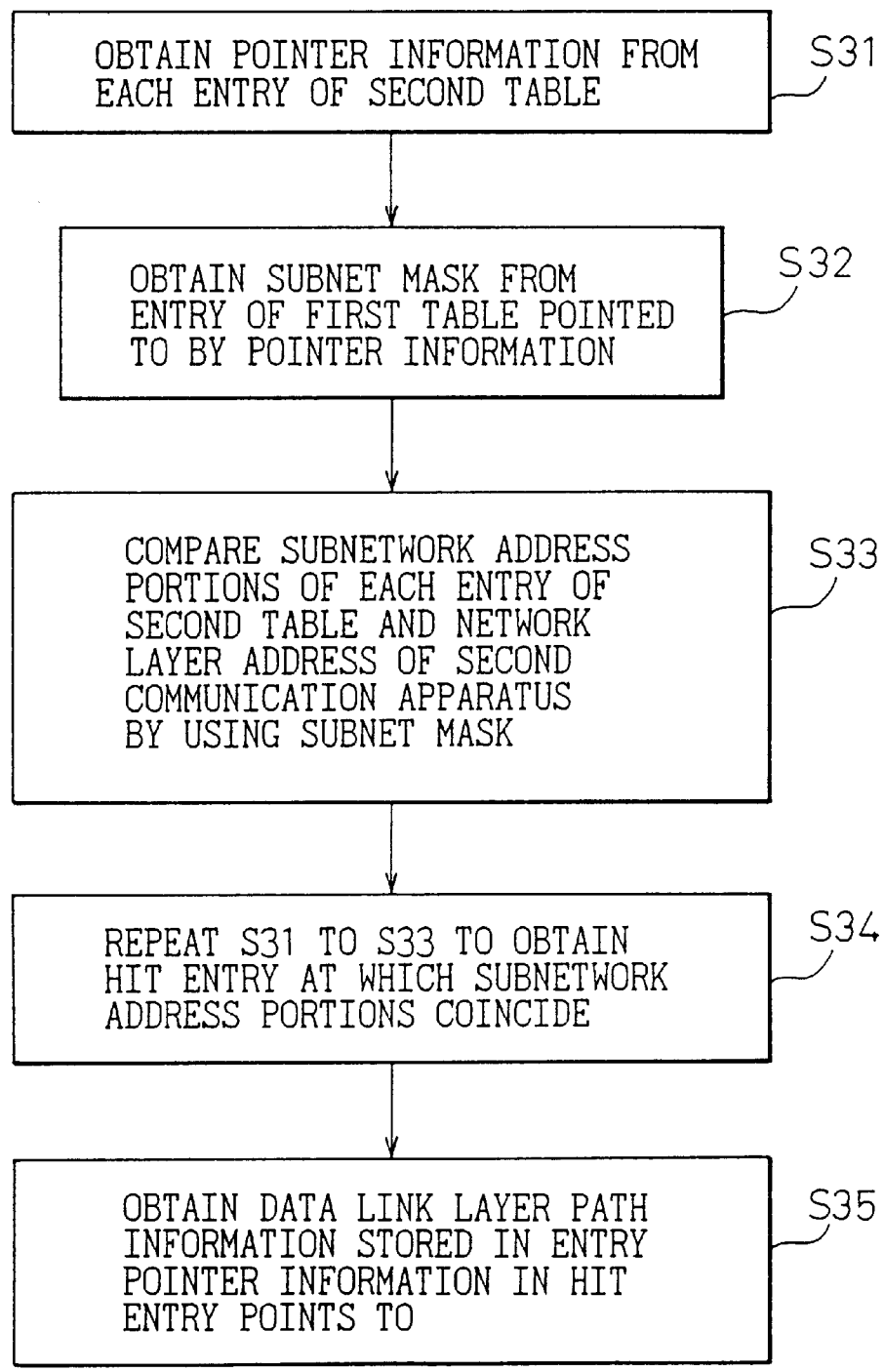
FIG. 3C is a diagram illustrating the basic sequence of the process according to the eleventh aspect of the present invention.

FIG. 3C illustrates the basic sequence of the process according to the eleventh aspect of the present invention. The steps S31 to S35, indicated in FIG. 3C, respectively correspond to the steps (a) to (e), described in the "SUMMARY OF THE INVENTION", paragraph (11). The process according to the eleventh aspect of the present invention is an essential portion of the routing processing, and can be performed speedily by benefiting from the above construction of the sixth aspect of the present invention with its additional feature (6-2).

In particular, according to the features described in the paragraphs (9) and (11), the subnetwork portion of the network-layer address indicated by the subnet mask can be deemed as a network-layer address to a subnetwork, and also as a common network-layer address to all the hosts in the subnetwork since network-layer addresses of all these hosts in the subnetwork are identical, in the portion indicated by the subnet mask. For example, if there is an entry, in the second table, for an network-layer address of a host (for example, the egress router NHS3 in FIG. 16) in the above subnetwork, the network-layer addresses of all the other hosts (for example, the hosts HOST3 and HOST4 in FIG. 16) in the same subnetwork, after a (bit AND) calculation with the subnet mask, hits the entry. Therefore, when there is an entry of the second table for a host (corresponding to the network-layer address of the host) in this subnetwork, and the data-link-layer path information, i.e., information on a shortcut path to the end of the subnetwork, is held in the first table, the shortcut path can be used as a common shortcut path to all the hosts in the subnetwork.

Each of the products according to the tenth and twelfth aspects of the present invention, described in the "SUMMARY OF THE INVENTION", paragraphs (10) and (12), may be a storage medium such as a ROM, a CD-ROM, a CD-R, a DVD-ROM, a DVD-RAM, a DVD-R, and a floppy disc, or a programmed hardware logic circuit such as a custom LSI which, when used with a communication apparatus, outputs control signals and data for directing the communication apparatus to execute a corresponding one of the processes according to the ninth and eleventh aspects of the present invention.

OPERATIONS OF THIRTEENTH TO TWENTY-SECOND ASPECTS OF INVENTION (FIGS. 2, 3A, 3B, AND 3C)

The thirteenth to twenty-second aspects of the present invention relate to route search operations in a communication apparatus in which priority is given to the use of a shortcut path over the use of a path through routers.

As described in the "SUMMARY OF THE INVENTION", paragraphs (13) and (15), each of the thirteenth and fifteenth aspects of the present invention provides a process for determining a route for transmitting a message from a first communication apparatus to a second communication apparatus. In the process, first, an attempt to obtain the data-link-layer path information on a shortcut path from the first communication apparatus to the second communication apparatus, is made in accordance with the first aspect of the present invention. When it is possible to obtain the data-link-layer path information, the process of the thirteenth aspect of the present invention is completed since transmission of a packet can be performed by using the data-link-layer path information. However, when it is not possible to obtain the data-link-layer path information, the network-layer information is obtained for transmission through routers to the (destination) second communication apparatus. According to the thirteenth aspect of the present invention, the network-layer information is obtained simply by searching the third table (which is realized by the routing table in the embodiments as explained later). On the other hand, according to the fifteenth aspect of the present invention, first, an attempt is made to obtain the network-layer information from the second table since the second table may store the network-layer information. When the network-layer information is not obtained from the second table, the network-layer information is obtained by searching the third table.

Namely, in the process according to the thirteenth and fifteenth aspects of the present invention, priority is given to the use of a shortcut path over the use of a path through routers. In addition, the aforementioned additional features (1—1) and (1-2) can also be adopted to the processes of the thirteenth and fifteenth aspects of the present invention.

As described in the "SUMMARY OF THE INVENTION", paragraphs (17) and (19), each of the seventeenth and nineteenth aspects of the present invention also provides a process for determining a route for transmitting a message from a first communication apparatus to a representative communication apparatus of one of a plurality of subnetworks. In the process, first, an attempt to obtain the data-link-layer path information on a shortcut path from the first communication apparatus to the representative communication apparatus is made in accordance with the third aspect of the present invention with the additional feature (3-1). When it is possible to obtain the data-link-layer path information, the process of the third aspect of the present invention with the additional feature (3-1) is completed since transmission of a packet can be performed by using the data-link-layer path information. However, when it is not possible to obtain the data-link-layer path information, the network-layer information is obtained for transmission through routers to the representative communication apparatus. According to the seventeenth aspect of the present invention, the network-layer information is obtained simply by searching the third table (which is realized by the routing table in the embodiments as explained later). On the other hand, according to the nineteenth aspect of the present invention, first, an attempt is made to obtain the network-layer information from the second table since the second table may store the network-layer information. When the network-layer information is not obtained from the second table, the network-layer information is obtained by searching the third table.

Namely, in the processes according to the seventeenth and nineteenth aspects of the present invention, priority is also given to the use of a shortcut path over the use of a path through routers.

As described in the "SUMMARY OF THE INVENTION", paragraph (21), the twenty-first aspect of the present invention also provides a process for determining a route for transmitting a message from a first communication apparatus to a representative communication apparatus of one of a plurality of subnetworks. In the process, first, an attempt to obtain the data-link-layer path information on a shortcut path from the first communication apparatus to the representative communication apparatus, is made in accordance with the third aspect of the present invention with the additional feature (3-2). When it is possible to obtain the data-link-layer path information, the process of the third aspect of the present invention with the additional feature (3-2) is completed since transmission of a packet can be performed by using the data-link-layer path information. However, when it is not possible to obtain the data-link-layer path information, the network-layer information is obtained for transmission through routers to the representative communication apparatus. Namely, in the process according to the seventeenth aspect of the present invention, priority is also given to the use of a shortcut path over the use of a path through routers.

Each of the products according to the fourteenth, sixteenth, eighteenth, twentieth, and twenty-second aspects of the present invention, described in the "SUMMARY OF THE INVENTION", paragraphs (14), (16), (18), (20), and (22), may be a storage medium such as a ROM, a CD-ROM, a CD-R, a DVD-ROM, a DVD-RAM, a DVD-R, and a floppy disc, or a programmed hardware logic circuit such as a custom LSI which, when used with a communication apparatus, outputs control signals and data for directing the communication apparatus to execute a corresponding one of the processes according to the thirteenth, fifteenth, seventeenth, nineteenth, and twenty-first aspects of the present invention.

OPERATIONS AND CONSTRUCTION OF TWENTY-THIRD ASPECT OF INVENTION (FIG. 4)

The twenty-third aspect of the present invention relates to a configuration of tables for use in routing, wherein a special provision is made for use in transmission within a subnetwork.

Figure 4:
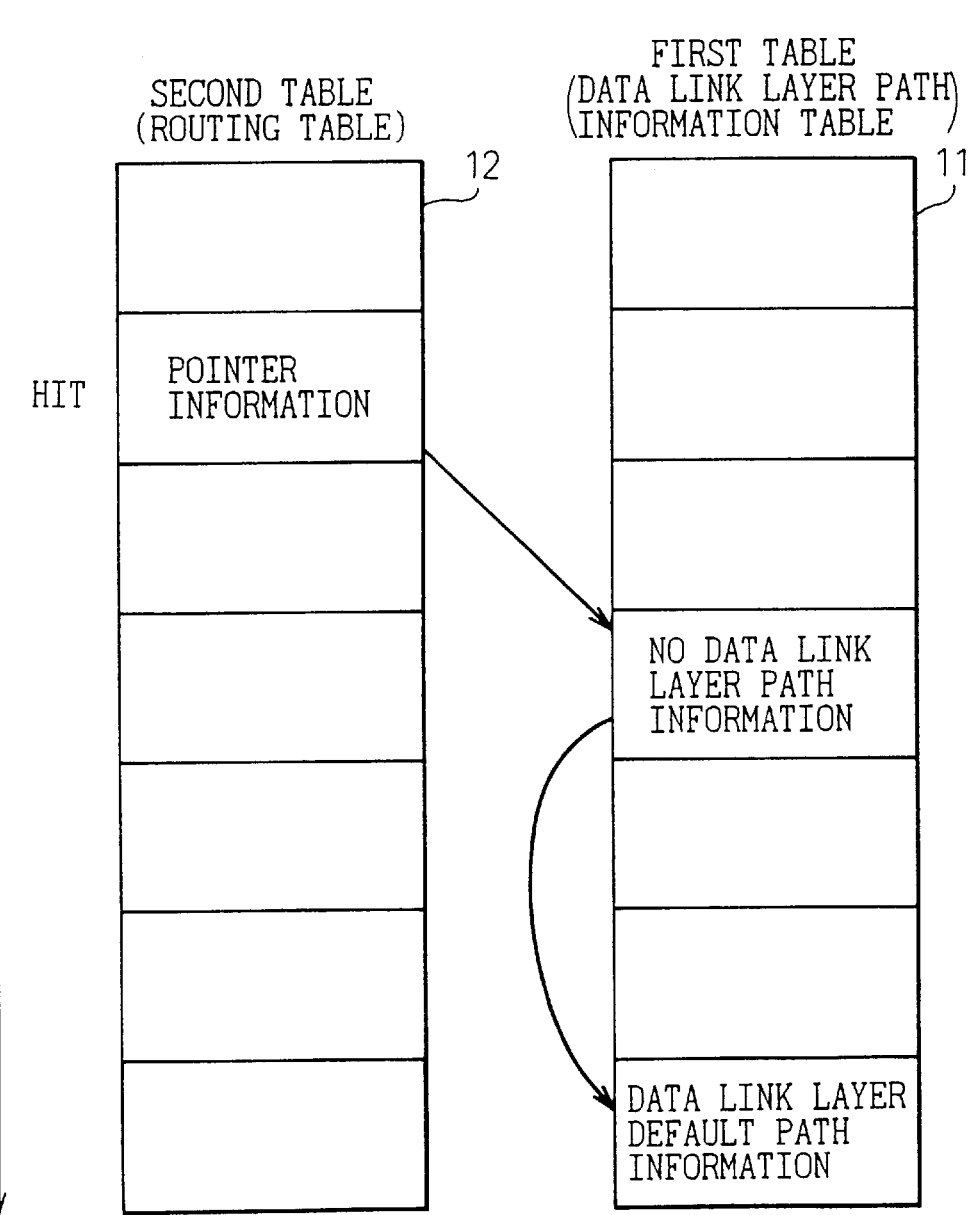
FIG. 4 is a diagram illustrating the basic construction of the communication apparatus according to the twenty-third aspect of the present invention.

FIG. 4 illustrates the basic construction of the communication apparatus according to the twenty-third aspect of the present invention, which corresponds to the construction described in the "SUMMARY OF THE INVENTION", paragraph (23). According to the construction of the communication apparatus according to the twenty-third aspect of the present invention, even if no information on a data-link-layer path to the destination host is available when the source host initiates routing for transmission of a packet, a source host can start transmission of a packet before a virtual connection to a destination host is established, by using the default data-link-layer path information stored in the entry of the first table. Therefore, the routing processing is not delayed due to the lack of the data-link-layer path information at the beginning of the transmission. As the default data-link-layer path, a path which is established (in advance) from the first communication apparatus to a router (representative host) located in (or at an end of) a specific subnetwork, can be used as a common path from all the hosts in the subnetwork to the router.

Hereinafter, explanations are provided for embodiments in which the NHRP procedure is used. However, it will be understood that the technical concepts disclosed with those embodiments can be applied to any other type of network.

FIRST EMBODIMENT OF INVENTION (FIG. 5)

Figure 5:
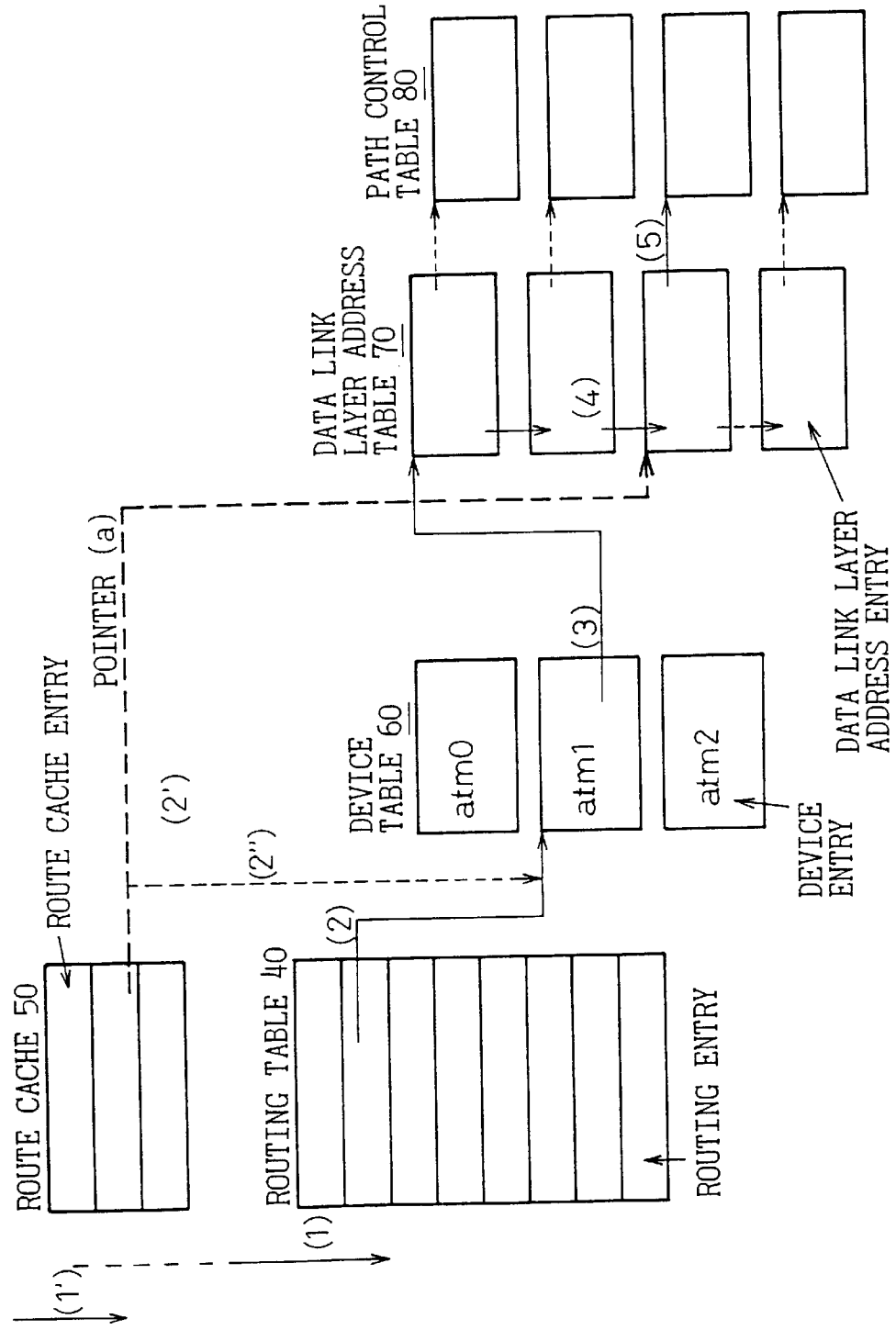
FIG. 5 is a diagram illustrating an example configuration of the tables in the first embodiment of the present invention.

FIG. 5 illustrates an example configuration of the tables in the first embodiment of the present invention. The configuration of FIG. 5 is an example configuration of tables for use in routing processing and provided in a communication apparatus. The configuration of FIG. 5 can be constructed by executing the process according to the first aspect of the present invention. In FIG. 5, reference numeral 40 denotes a routing table, 50 denotes a route cache, 60 denotes a device table, 70 denotes a plurality of data-link-layer path information tables (or data-link-layer address tables), and 80 denotes a plurality of path control tables. A plurality of entries of the device table 60 are provided corresponding to a plurality of interface names (device names), respectively, the plurality of data-link-layer path information tables 70 are provided corresponding to the plurality of interface names (device names), respectively, and the plurality of entries of the path control table 80 are respectively linked to a plurality of entries of each of the plurality of data-link-layer path information tables 70.

As explained later for a concrete example with reference to FIG. 13, typically, the routing table 40 has entries corresponding to network addresses (IP addresses of subnetworks), and stores a gateway address and an interface name corresponding to each network address. The gateway address is an IP address of a gateway router which is located between a subnetwork, which a source host containing the constructions of FIG. 5 belongs to, and other subnetworks. A transmission of a packet based on a network-layer address (IP address) is performed through the gateway router. The routing table 40 may also store a subnet mask, which indicates which portion of a network-layer address indicates a network address, as indicated, as an example, by the C-style hexadecimal notation in FIG. 13.

As also explained later for a concrete example with reference to FIG. 14, generally, the route cache 50 stores a portion of the routing table 40, where entries in the portion are relatively frequently searched for. In addition, as a characteristic feature of the present invention, the route cache 50 stores a shortcut pointer (the aforementioned "pointer information") in each entry, as indicated as an example in FIG. 14. Further, the route cache 50 may store a subnet mask, as also indicated as an example in FIG. 14. The subnet mask stored in each entry of the route cache 50 is the aforementioned subnet mask information used in the search process according to the ninth aspect of the present invention. The entries of the route cache 50 are provided for being searched first when a source host starts an operation for obtaining information on routing.

Each entry of the device table 60, provided corresponding to each interface name, stores details of the interface, and a pointer pointing to at least one of the plurality of data-link-layer path information tables 70 which stores data-link-layer path information to at least one other host to which the source host can send a packet through the interface.

Each of the data-link-layer path information tables 70 is denoted as "NH cache", and each entry thereof is denoted as "NH entry" in this specification. As explained later for a concrete example for an ATM network with reference to FIG. 15, typically, each of the plurality of data-link-layer path information tables 70 has an entry corresponding to an IP address of a destination host, and each entry stores a data-link-layer address (for example, an ATM address). In the example of FIG. 15, each NH entry further contains a subnet mask, a pointer to a VC (virtual connection) structure, and a flag indicating a default entry (according to the twenty-third aspect of the present invention). The VC structure in the example of FIG. 15 is an example of contents of each entry of the path control table 80, where the "structure" is a term defined in the programming language C. The subnet mask stored in each NH entry is the aforementioned subnet mask information used in the search process according to the eleventh aspect of the present invention.

Each entry of the path control table 80 contains information on the data-link-layer path. For example, in the case of the ATM network, the above VC structure contains a VPI, a VCI, a traffic class, a pointer to a function which performs the transmission of a packet, where the "function" is also a term defined in the programming language C.

In the communication apparatus containing the table configuration of FIG. 5, the transmission is performed in accordance with the following sequence.

Initially, the route cache 50 contains no information. Therefore, the routing table 40 is searched (as indicated by (1) in FIG. 5) by using a network-layer address of a destination host as a search key, where the network-layer address of the destination host is held in the source host, together with a packet to be transmitted. In the search of the routing table 40, a hit may occur as a coincidence of the network-layer address of the destination host with a (network-layer) address of an entry of the routing table 40, in the entire network-layer address, or in a network address portion of the network-layer address of the destination host. A name of an interface (device) through which the packet is to be sent out, and an IP address of a gateway router to which the packet is to be transferred first, are obtained through the search of the routing table 40. In addition, routing information which has been once searched for in the routing table 40 is stored separately in the route cache 50 (as explained above) for a predetermined time.

Therefore, in practice, the search of the route cache 50 is performed before the above search of the routing table 40 (as indicated with (1') in FIG. 5), and the search of the routing table 40 is performed only when a hit does not occur in the search of the route cache 50. Thereby, the time required to search for routing information for a frequently-accessed destination host is substantially reduced. Hereinafter, the above search of both the routing table 40 and the route cache 50 is denoted as route search.

Figure 6:
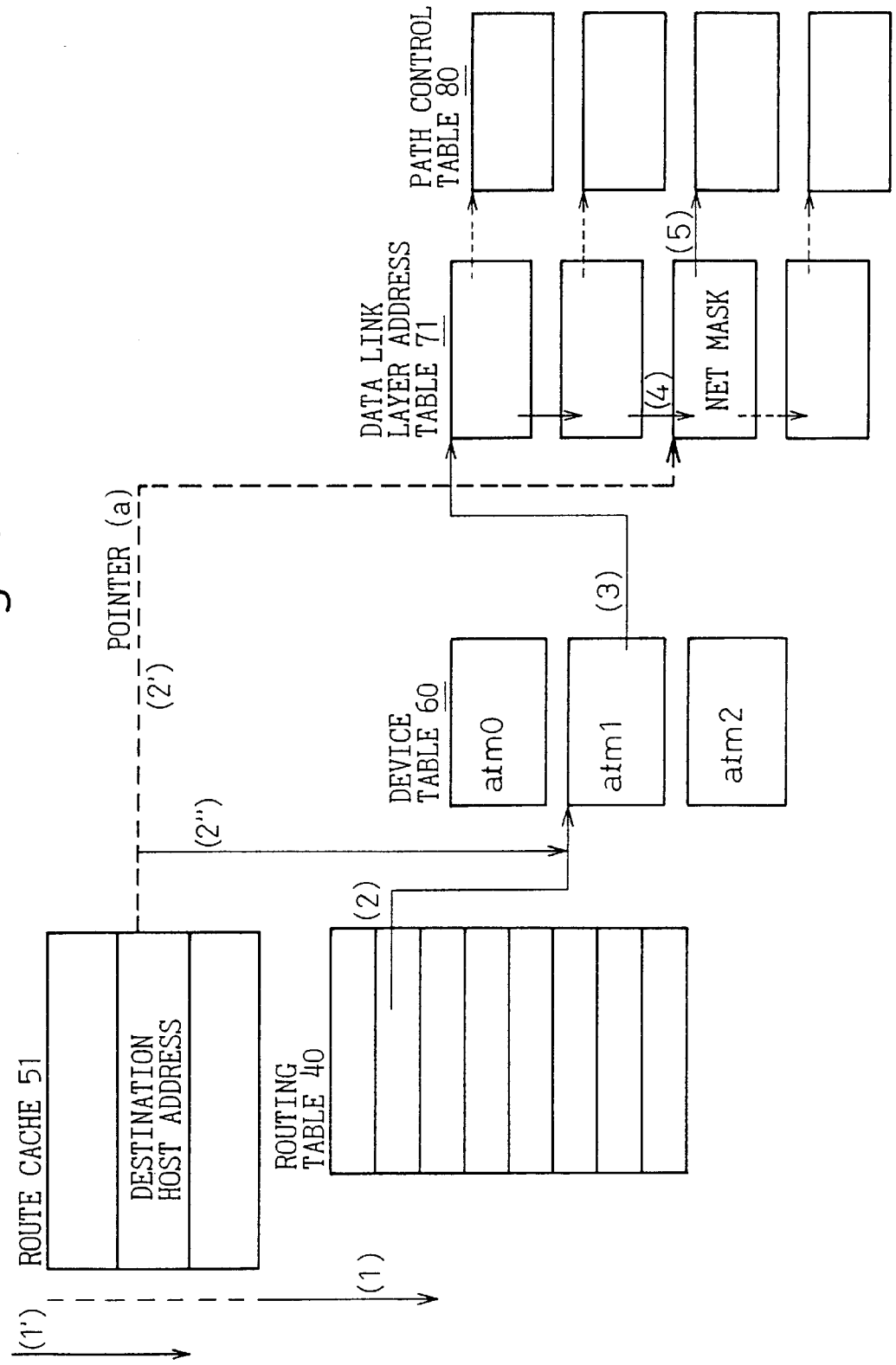
FIG. 6 is a diagram illustrating an example configuration of the tables in the second embodiment of the present invention.

After the interface name (device name) is obtained through the route search, the device table 60 corresponding to the obtained interface name is referred to (as also indicated by (2) in FIG. 6), for information pointing to (as indicated by (3) in FIG. 5) one of the plurality of data-link-layer path information tables 70 corresponding to the obtained interface name (device name). Then, entries of the above one of the data-link-layer path information tables is searched by using the network-layer address of the destination host as a search key (as indicated by (4) in FIG. 5). When a hit occurs at one of the plurality of entries of the data-link-layer path information table with the network-layer address of the destination host, information on the data-link-layer path (for example, VPI and VCI in an ATM network) are obtained (as indicated by (5) in FIG. 5) from one of the plurality of entries of the corresponding path control table which entry is linked to the entry of the hit in the data-link-layer path information table. Thus, the packet can be transmitted from the source host to the destination host by using the obtained information on the data-link-layer path.

When no entry corresponding to the network-layer address of the destination host is found in the data-link-layer path information table 70, the source host inquires of an address resolution server (such as the aforementioned ATMARP server) data-link-layer path information for a shortcut path to the destination host. While waiting for a response to the inquiry from the address resolution server, data-link-layer path information to a gateway router is obtained based on a network-layer address of the gateway router through a route search, and transmission through the routers is performed until the data-link-layer path information for the shortcut path to the destination host is obtained from the address resolution server.

When the source host receives the response to the above inquiry, an additional entry is added to the corresponding data-link-layer path information table for storing the data-link-layer path information received with the response, and a new shortcut path is established based on the received data-link-layer path information. Then, information on the established shortcut path (for example, information on the established virtual connection, such as VPI and VCI in an ATM network) is written in the corresponding entry of the path control table 80, and information for referring to the linked entry of the path control table 80 is written in the above added entry of the data-link-layer path information table. In addition, according to the first aspect of the present invention, pointer information (as indicated by (a) in FIG. 5) is written in an entry, of the route cache 50, corresponding to the network-layer address of the destination host, where the pointer information points to the location (address) of the above added entry of the data-link-layer path information table, for enabling direct reference to the entry of the data-link-layer path information table, in which entry the above received data-link-layer path information is written. Thus, the configuration of the tables in the communication apparatus according to the fifth aspect of the present invention is realized.

When transmitting a packet from a source host which contains tables configured as above, the source host can perform the process according to the thirteenth or fifteenth aspect of the present invention. Namely, the source host first searches the route cache 50 (as indicated by (1') in FIG. 5). When a hit occurs at an entry of the route cache 50, it is determined whether or not the entry of the hit contains the pointer information (a) for referring to the corresponding entry of the data-link-layer path information table 70. When the pointer information (a) is contained therein, the data-link-layer path information is obtained from the entry of the data-link-layer path information table which is pointed to (as indicated by (2') in FIG. 5) by the above pointer information (a), and the entry of the path control table 80 linked to the pointed-to entry of the data-link-layer path information table 70. Thus, the packet can be transmitted to the destination host by using the obtained data-link-layer path information. Namely, the search of the routing table 40, and the search of the data-link-layer path information table 70 can be eliminated. Therefore the time for the routing processing is reduced, and the packet transmission performance is improved.

When the above entry of the hit in the route cache 50 does not contain the pointer information (a), it is recognized that no data-link-layer path information for a shortcut path is available. Therefore, operations for obtaining data-link-layer path information to a gateway router are performed. Namely, the interface name (device name) is first obtained from the entry of the hit in the route cache 50, according to the fifteenth aspect of the present invention. Then, a device entry, of the device table 60, corresponding to the obtained interface (device) name (as indicated by (2") in FIG. 5), is looked up to obtain information for referring to the corresponding data-link-layer path information table 70. Next, the data-link-layer path information table 70 is searched for data-link-layer path information to the gateway router by using the network-layer (IP) address of the gateway router as a search key, and then the packet is transmitted to the gateway router by using the data-link-layer path information obtained from an entry of the data-link-layer path information table and the entry of the path control table 80 linked to the entry of the data-link-layer path information table 70.

When a hit does not occur at any entry of the route cache 50, the data-link-layer path information to the gateway router is obtained by searching the routing table 40, as described first.

Conventionally, a table construction comprised of a routing table, a route cache, a device table, a plurality of data-link-layer path information tables, and a path control table, is used in the Linux system, where Linux is a well-known UNIX compatible operating system. However, the Linux system does not use the technique of storing, in an entry of the route cache corresponding to a network-layer address of a destination host, pointer information referring to an entry of data-link-layer path information table in which entry information on an established shortcut path is stored, as in the present invention.

SECOND EMBODIMENT OF INVENTION
(FIG. 6)

FIG. 6 illustrates an example configuration of the tables in the second embodiment of the present invention. The configuration of FIG. 6 is realized by performing the process according to the third aspect of the present invention, together with the feature described in the "SUMMARY OF THE INVENTION", paragraph (3-2). In addition, the configuration of FIG. 6 is also an example configuration of the communication apparatus according to the sixth aspect of the present invention, together with the feature described in the "SUMMARY OF THE INVENTION", paragraph (6-2). In FIG. 6, reference numeral 40 denotes a routing table, 51 denotes a route cache, 60 denotes a device table, 71 denotes a plurality of data-link-layer path information tables (or data-link-layer address tables), and 80 denotes a plurality of path control tables. The contents of the respective tables in the construction of FIG. 6 are the same as those in FIG. 5, except for the contents specially explained below.

In the communication apparatus containing the table configuration of FIG. 6, the transmission of a packet is performed in accordance with the following sequence.

The route search operations including the search (as also indicated by (1') in FIG. 6) of the route cache 51 by using the network-layer address of the destination host, and the search (as also indicated by (1) in FIG. 6) of the routing table 40 by using the network-layer address of the destination host in the case of no hit in the route cache, are the same as the search operations in the configuration of FIG. 5.

After the interface name (device name) is obtained through the route search, the device table 60 corresponding to the obtained interface name is referred to (as also indicated by (2) in FIG. 6), for the location (as also indicated by (3) in FIG. 6) of one of the plurality of data-link-layer path information tables 71 corresponding to the obtained interface name (device name). Then, the located data-link-layer path information table is searched by using the network-layer address of the destination host as a search key (as also indicated by (4) in FIG. 6). When a hit occurs at one of the plurality of entries of the data-link-layer path information table with the network-layer address of the destination host, information on the data-link-layer path (for example, VPI and VCI in an ATM network) are obtained (as also indicated by (5) in FIG. 5) from one of the plurality of entries of the corresponding path control table which entry is linked to the entry of the data-link-layer path information table. Thus, the packet can be transmitted to the destination host by using the obtained information on the data-link-layer path.

When no entry corresponding to the network-layer address of the destination host is found in the data-link-layer path information table 71, the source host inquires of an address resolution server (such as the aforementioned ATMARP server) data-link-layer path information for a shortcut path to the destination host. While waiting for a response to the inquiry from the address resolution server, data-link-layer path information to a gateway router is obtained based on a network-layer address of the gateway router through a route search, and transmission through the routers is performed until the data-link-layer path information for the shortcut path to the destination host is obtained from the address resolution server.

When it is possible to establish a shortcut path to the destination host, the address resolution server returns a response to the above inquiry, containing the data-link-layer path information on the shortcut path to the destination host. However, when it is not possible to establish a shortcut path to the destination host, and it is possible to establish a shortcut path only to a representative host (for example, the egress server NHS3 in FIG. 16) of a subnetwork containing the destination host, the address resolution server can return a response containing the data-link-layer path information on the shortcut path to the representative host, together with a subnet mask indicating the subnetwork address (the subnet portion of the network-layer address of the destination host).

When the source host receives the response to the above inquiry, an additional entry is added to the corresponding data-link-layer path information table for storing the data-link-layer path information received with the response, and a new shortcut path is established based on the received data-link-layer path information. Then, information on the established shortcut path (for example, information on the established virtual connection, such as VPI and VCI in an ATM network) is written in the corresponding entry of the path control table 80, and information for referring (such as a pointer) to the linked entry of the path control table 80 is written in the above added entry of the data-link-layer path information table 71.

Figure 7:
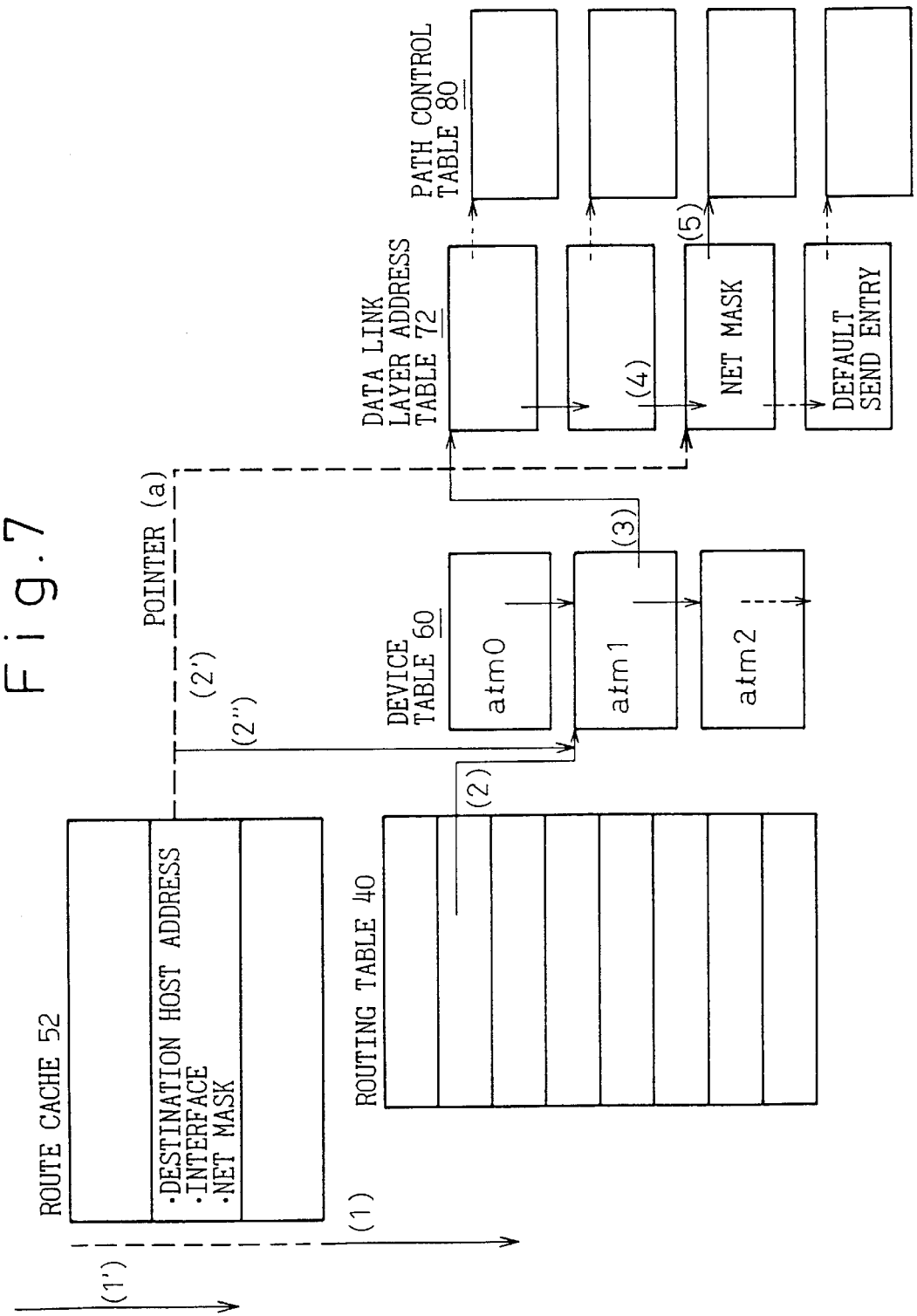
FIG. 7 is a diagram illustrating an example configuration of the tables in the third embodiment of the present invention.
Figure 8:
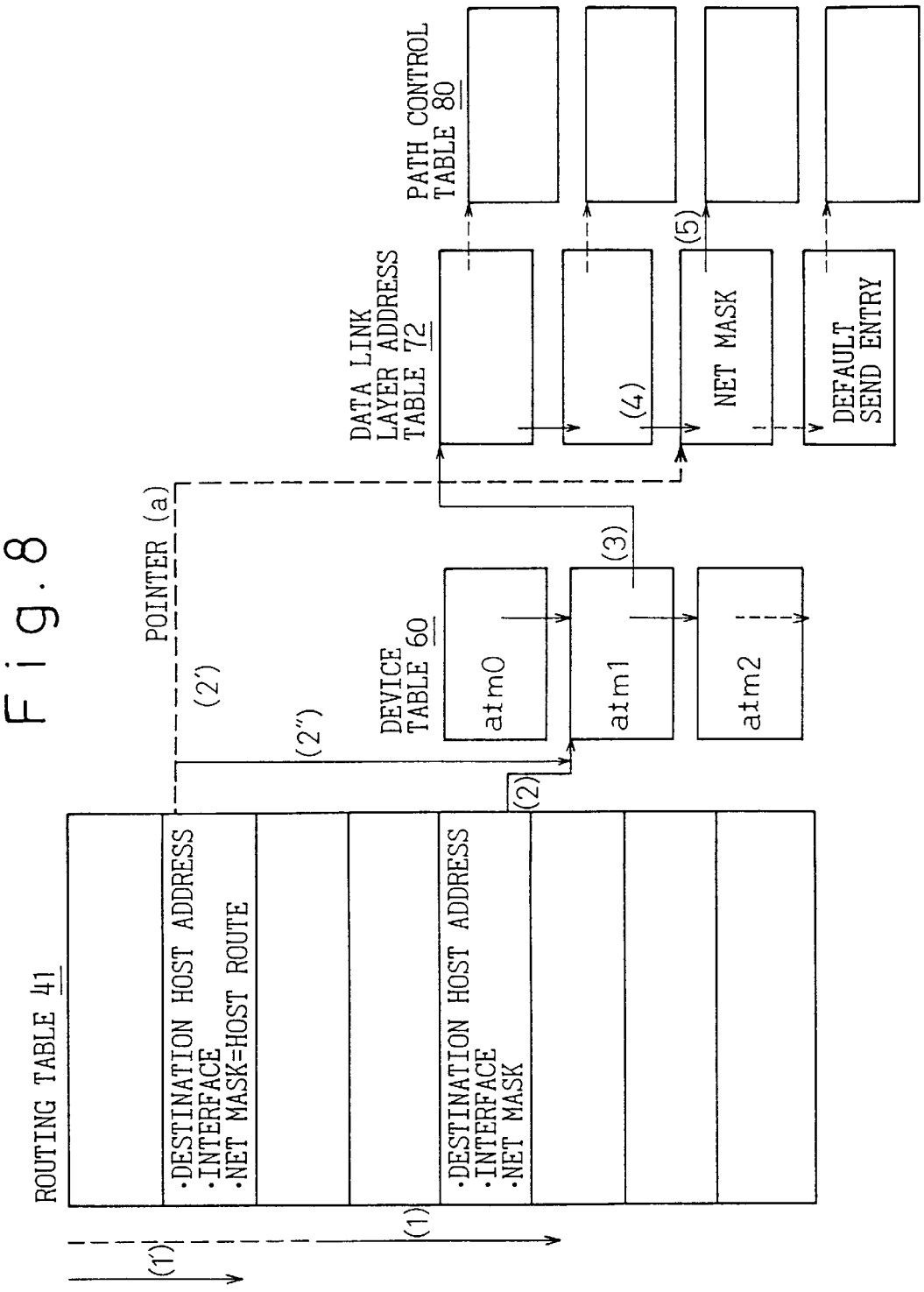
FIG. 8 is a diagram illustrating an example configuration of the tables in the fourth embodiment of the present invention.

Then, according to the third aspect of the present invention, pointer information (as also indicated by (a) in FIG. 6) is written in an entry, of the route cache 51, corresponding to the network-layer address of the destination host, where the pointer information points to the location (address) of the above added entry of the data-link-layer path information table, for enabling direct reference to this entry of the data-link-layer path information table, in which the above received data-link-layer path information is written. In addition, the subnet mask contained in the response from the address resolution server is written in the entry of the data-link-layer path information table 71, according to the third aspect of the present invention with the aforementioned additional feature (3-2). Thus, the configuration of the tables in the communication apparatus according to the sixth aspect of the present invention with the aforementioned additional feature (6-2) is realized. If the subnet mask is written in the above entry of the route cache 51, the configuration of the tables in the communication apparatus according to the sixth aspect of the present invention with the aforementioned additional feature (6-1) is realized, as indicated in FIGS. 7 and 8.

When the destination host is a host in a subnetwork, to which host a shortcut path cannot be established, and a shortcut path from the source host to a representative host of the subnetwork can be established, the source host can perform the process according to the nineteenth or twenty-first aspect of the present invention. Namely, the search operation is performed as follows.

The source host first searches the route cache 51 (as also indicated by (1') in FIG. 6) by comparing the subnetwork address portions of the network-layer address of the destination host and the network-layer address of each entry of the route cache 51 by using the subnet mask. In the case wherein the subnet mask is stored in the data-link-layer path information table 71 (corresponding to the above additional feature (6-2)), the search operation according to the twenty-first aspect of the present invention is performed. Namely, the source host reads the pointer information from each entry, and accesses an entry of the data-link-layer path information table 71 which is pointed to (as indicated by (2') in FIG. 6) by the pointer information to obtain the subnet mask. Then, the subnet mask is used for obtaining the subnetwork address portions of the network-layer address of the entry of the route cache 51 and the network-layer address of the destination host.

When a hit occurs (i.e., the above subnetwork address portions coincide) at an entry of the route cache 51, the data-link-layer path information stored in the corresponding entry of the data-link-layer path information table and an entry of the path control table linked (as indicated by (5) in FIG. 6) thereto, are used for transmission of a packet to the representative host. In practice, the IP address of the destination host and the subnet mask are contained in the packet, and the packet is transmitted through the shortcut path by using the information obtained from the data-link-layer path information table. When the representative host receives the packet through the shortcut path, the representative host can then transfer the packet to the destination host based on the IP address of the destination host contained in the received packet.

When a hit does not occur (i.e., the above subnetwork address portions do not coincide) at any entry of the route cache 51, the data-link-layer path information to the gateway router is obtained by searching the routing table 40, according to the twenty-first aspect of the present invention.

In the case wherein the subnet mask is stored in the route cache 51 (corresponding to the above additional feature (6-1)), the search operation according to the nineteenth aspect of the present invention is performed. Namely, the source host reads the subnet mask from each entry, and then the subnet mask is used for obtaining the subnetwork address portions of the network-layer address of the entry of the route cache 51 and the network-layer address of the destination host. When a hit occurs (i.e., the above subnetwork address portions coincide) at an entry of the route cache 51, it is determined whether or not the pointer information is stored in the entry of the hit. When the pointer information is stored in the entry of the hit, an entry of the data-link-layer path information table pointed to (as indicated by (2') in FIG. 6) by the pointer information is accessed to obtain data-link-layer path information on the shortcut path to the representative host, and then the packet is transmitted to the representative host in the same manner as above.

When no pointer information is stored in the entry of the hit, data-link-layer path information for transmitting the packet to the gateway router is obtained in accordance with the nineteenth aspect of the present invention, for transmitting the packet through the routers to the destination host. Namely, the device table 60 corresponding to an interface name stored in the entry of the hit in the route cache 51 is accessed (as indicated by (2") in FIG. 6), and entries of the data-link-layer path information table which is pointed to (as indicated by (3) in FIG. 6) by the aforementioned pointer stored in the above entry of the device table 60 is searched (as indicated by (4) in FIG. 6), and an entry of the path control table 80 linked (as indicated by (5) in FIG. 6) to the entry of the data-link-layer path information table is then accessed for obtaining the data-link-layer path information. Thus, the packet is transferred to the gateway router by using the data-link-layer path information.

When a hit does not occur at any entry of the route cache 51, the data-link-layer path information to the gateway router is obtained by searching the routing table 40, according to the nineteenth aspect of the present invention.

THIRD EMBODIMENT OF INVENTION (FIG. 7)

FIG. 7 illustrates an example configuration of the tables in the third embodiment of the present invention. The construction of FIG. 7 contains the features of the communication apparatuses according to the ninth and twenty-third aspects of the present invention. In FIG. 7, reference numeral 40 denotes a routing table, 52 denotes a route cache, 60 denotes a device table, 72 denotes a plurality of datalink-layer path information tables (or data-link-layer address tables), and 80 denotes a plurality of path control tables. The contents of the respective tables in the construction of FIG. 7 are the same as those in FIG. 6, except for the contents specially explained below.

The communication apparatus (source host) containing the table configuration of FIG. 7, is constructed to receive a command to produce a default send entry in each (or at least one) of the plurality of data-link-layer path information tables 72. In this embodiment, the default send entry contains data-link-layer path information to any router (for example, the gateway router) in the same subnetwork as the source host. As explained before, the conventional routing table does not provide path information for a destination host in the same subnetwork as the source host. According to the provision of the default send entry, even if no information on a data-link-layer path to the destination host or a data-link-layer path to the gateway router is available when the source host initiates routing for transmission of a packet, the source host can start transmission of a packet before a virtual connection to a destination host is established, by using the default data-link-layer path information stored in the default send entry of the data-link-layer path information table. Therefore, the routing processing is not delayed due to the lack of the data-link-layer path information at the beginning of the transmission.

FOURTH EMBODIMENT OF INVENTION (FIG. 8)

FIG. 8 is a diagram illustrating an example configuration of the tables in the fourth embodiment of the present invention. In FIG. 8, reference numeral 41 denotes a routing table, 60 denotes a device table, 72 denotes a plurality of data-link-layer path information tables (or data-link-layer address tables), and 80 denotes a plurality of path control tables. In the construction of FIG. 8, no route cache is provided. Instead, the function of the route cache is realized in a host-route portion of the routing table 41. Namely, the routing table 41 is comprised of the host-route portion and a net-route portion. In both the operations of storing information and searching for information, the host-route portion is used as the route cache 52 in the construction of FIG. 6, and the net-route portion is used as the routing table 40 in FIG. 6. As explained before for the routing table 40 in FIG. 5, entries in the net-route portion of the routing table 41 correspond to network addresses, respectively, and as explained before for the route caches 50 and 51 in FIGS. 5 and 6, entries in the host-route portion of the routing table 41 correspond to IP addresses of hosts and routers, respectively. The host-route portion of the routing table 41 in the construction of FIG. 8 realizes the aforementioned second additional feature to the first and fifth aspects of the present invention, as explained before with reference to FIG. 1.

EXAMPLE CONFIGURATIONS (FIGS. 8 TO 16)

Figure 9:
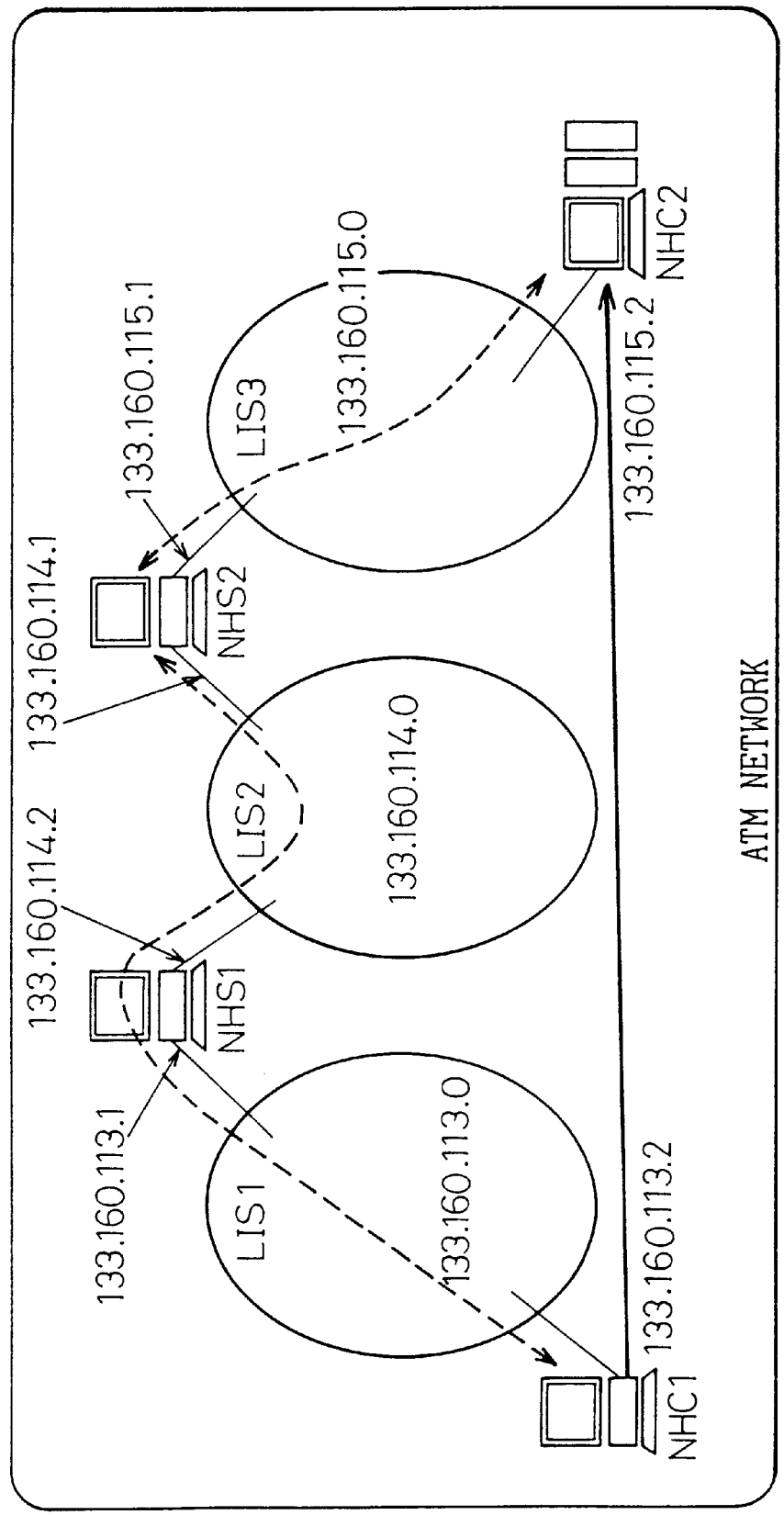
FIG. 9 is a diagram illustrating an example configuration of the network.

FIG. 9 illustrates an example configuration of the network. In the example of FIG. 9, three subnetworks, LIS1, LIS2, and LIS3, are logically defined on an ATM network, a next hop client NHC1 is connected to the subnetwork LIS1, a next hop client NHC2 is connected to the subnetwork LIS3, a next hop server NHS1 is connected to both the subnetworks LIS1 and LIS2, and a next hop server NHS2 is connected to both the subnetworks LIS2 and LIS3. The IP addresses of the subnetworks, LIS1, LIS2, and LIS3, the next hop servers NHS1 and NHS2, and the next hop clients NHC1 and NHC2, are as indicated in FIG. 9.

In the configuration of FIG. 9, before the next hop client NHC1 obtains the data-link-layer address of the next hop client NHC2, or before a virtual connection for a shortcut path (as indicated by a straight arrow in FIG. 9) from the next hop client NHC1 to the next hop client NHC2 is established, communication between the next hop clients NHC1 and NHC2 is performed through the subnetwork LIS1, the next hop server NHS1, the subnetwork LIS2, the next hop server NHS2, and the subnetwork LIS3. When the next hop client NHC1 does not have and wishes to have the data-link-layer address of the next hop client NHC2, the aforementioned NHRP request is transferred from the next hop client NHC1 to the next hop server NHS2 through the next hop server NHS1 along the path as indicated with a dashed line in FIG. 9, and the aforementioned NHRP response is returned back through the same path to the next hop client NHC1. When the next hop client NHC1 receives the data-link-layer address of the next hop client NHC2, the next hop client NHC1 establishes a shortcut virtual connection from the next hop client NHC1 to the next hop server NHS2.

Figure 10:
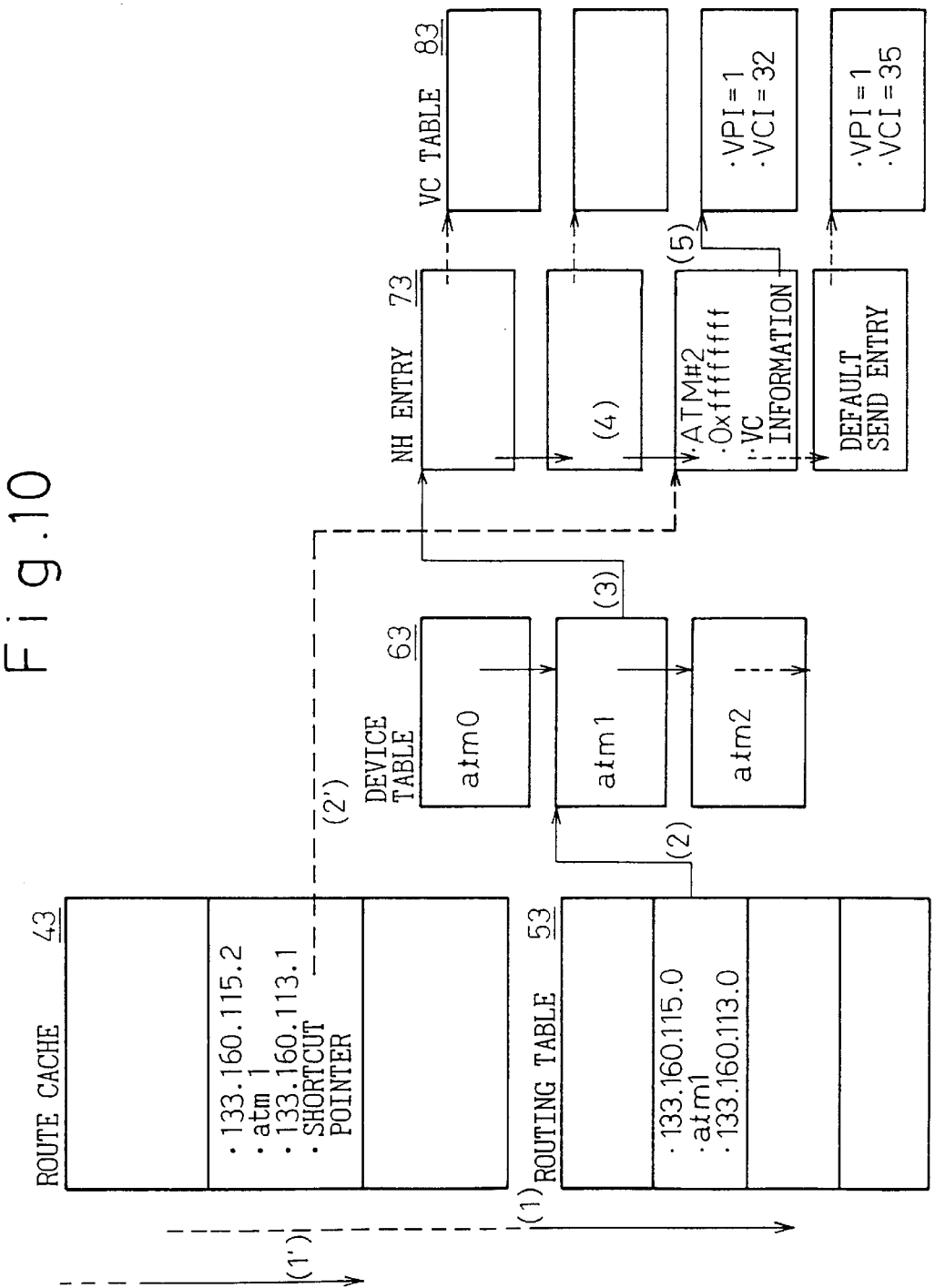
FIG. 10 is a diagram illustrating an example configuration of the tables for routing processing in the source host NHC1.
Figure 11:
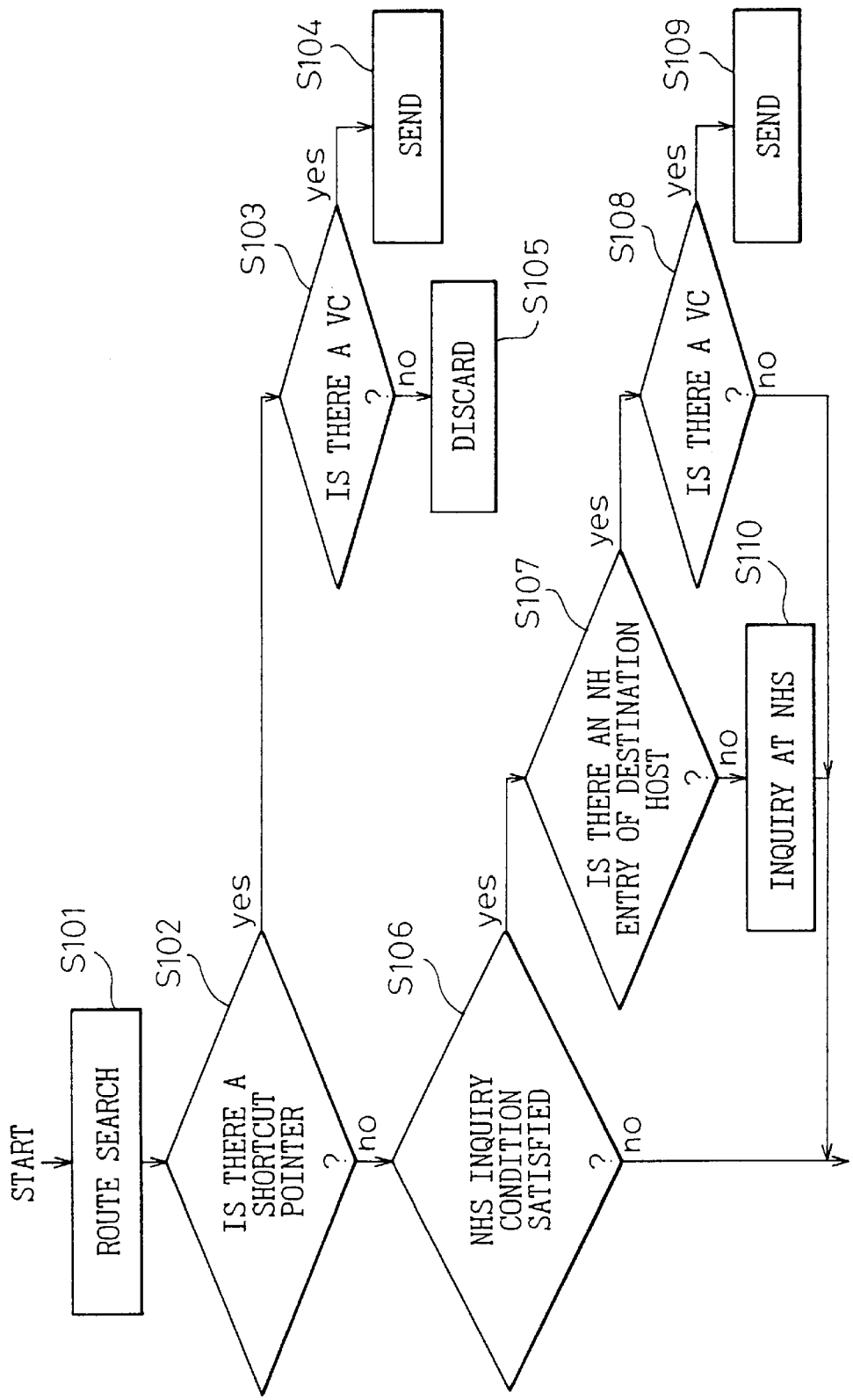
FIGS. 11 and 12 are diagram illustrating an example sequence of the routing processing in the source host NHC1.
Figure 12:
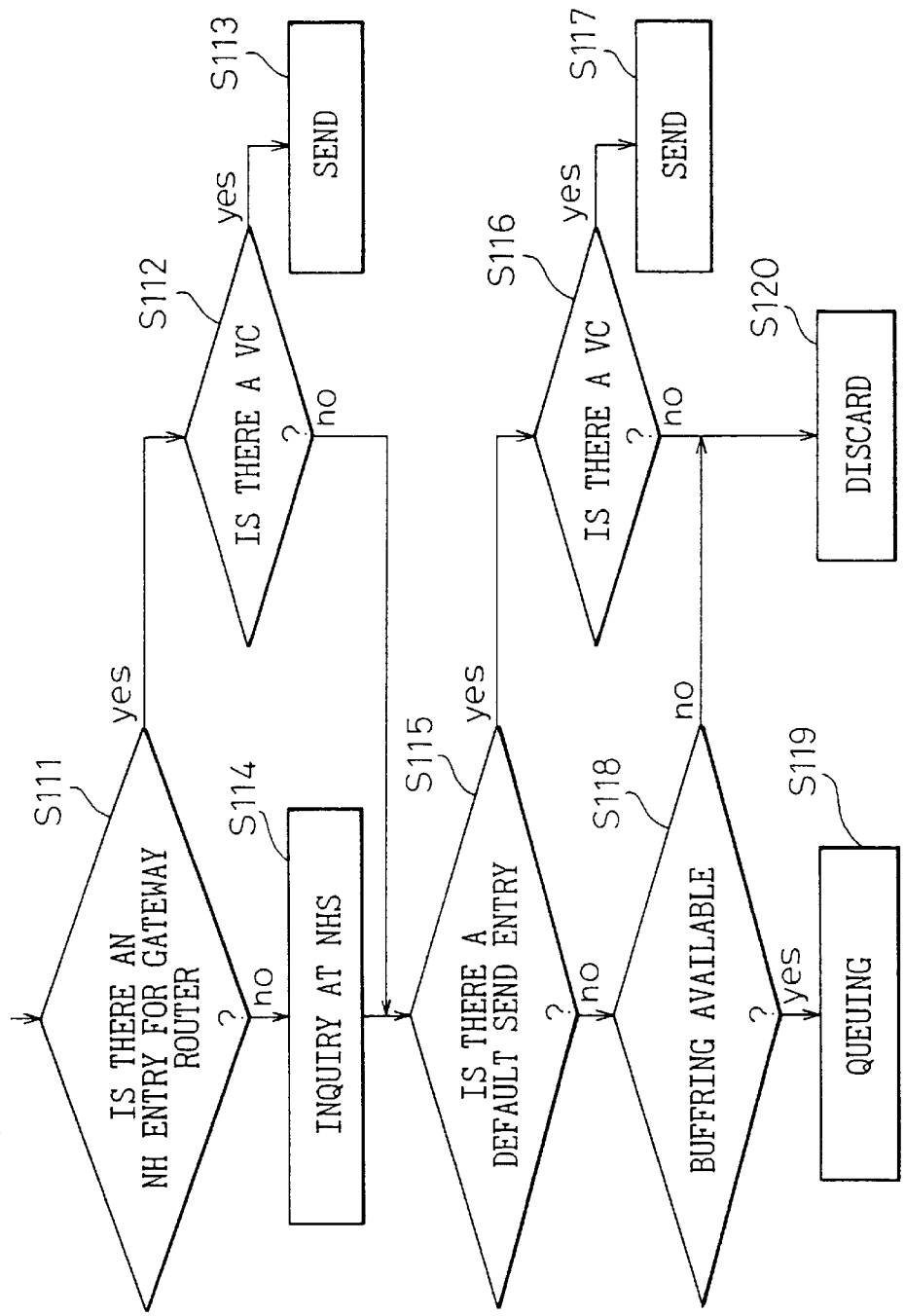

FIG. 10 illustrates an example configuration of the tables for routing processing in the source host NHC1 in FIG. 9, and FIGS. 11 and 12 illustrate an example sequence of the routing processing in the source host NHC1. In FIG. 10, reference numeral 43 denotes a route cache, 53 denotes a routing table, 63 denotes a device table, 73 denotes a plurality of NH caches (data-link-layer path information tables) comprised of NH entries, and 83 denotes a VC table.

FIG. 13 illustrates an example of contents of the routing table 53, FIG. 14 illustrates an example of contents of the route cache 43, and FIG. 15 illustrates an example of contents of one of the NH caches.

As indicated in FIG. 13, each entry (denoted as routing entry) of the routing table 53 contains a destination network address, a subnet mask, a transmission interface, and a gateway address. As in the construction of FIG. 8, a host-route entry may be provided in the routing table. In the host-route entry, an IP address of a host or router is contained instead of the network address. In the host-route entry, all bits of the subnet mask are "1", while in the net-route entry, some of the bits of the subnet mask is not "1".

When the route cache 43 contains no information in the initial state, or when a hit does not occur, with an IP address of a destination host, in the route cache 43, the routing table 53 are searched.

When searching the routing table 53, a network address portion of the IP address of the destination host is compared with the network address in each entry of the routing table 53. That is, a bit-by-bit calculation of the following equation is performed. In this equation, && indicates a bit AND operation.

(IP address of a destination host) && (subnet mask)==(network address)

When a hit occurs in the above search operation of the routing table 53, the contents of the routing entry of the hit are stored in an entry of the route cache 43. When storing the contents of the routing entry of the hit in the route cache 43, the IP address of the destination host is stored for the destination network address. Namely, the entry of the route cache is produced as a host-route entry.

As explained before with reference to FIG. 5, each entry of the device table 63 is provided corresponding to the interface name stored in the routing entry of the hit. The device table 63 in this example may be provided as a list structure of interface structures, where the "structure" is also a term defined in the programming language C. Each routing entry may further contain a pointer to one of the interface structures corresponding to the interface name stored in the routing entry of the hit so that the search operation of the device table 63 from its top address can be dispensed with. The interface structure contains a definite name of the interface, the value of the maximum transfer unit (MTU), flags indicating status of the interface, and the aforementioned pointer to (the top address of) the NH cache 73 which contains the data-link-layer path information for hosts reachable from the source host.

As explained before, the NH cache (data-link-layer path information table) 73 stores an ATM address for each IP address of a destination host. One entry is added to the NH cache 73 when information on a new data-link-layer path to a destination host is obtained based on the NHRP protocol. The NH cache 73 has a list structure comprised of a plurality of NH entries, and each NH entry contains an IP address of a destination host, a subnet mask, an ATM address, a pointer to the aforementioned VC structure, and a default entry flag. When the default entry flag is "1" (as indicated in FIG. 15), the NH entry is the aforementioned default (send) entry. Therefore, the NH entry in which the default entry flag is "1", should contain data-link-layer path information which enables the transmission of a packet to the destination host before an NHRP response to an NHRP request (for data-link-layer path information to a destination host or to a gateway router) is returned to the source host. The VC table 83 (which corresponds to the path control table 80 in FIGS. 5 to 8) is comprised of the VC structures, and each VC structure contains information on a virtual connection established from the source host and the destination host, as explained before with reference to FIG. 5.

When the top address of the NH cache 73 is obtained from the interface structure (as indicated by (3) in FIG. 10), the entries of the NH cache 73 is searched from the top address (as indicated by (4) in FIG. 10). When an NH entry storing a destination host address which coincides with the IP address of the destination host, is found, a pointer to one of the VC structures stored in the NH entry is read, and the VC structure is referred to (as indicated by (5) in FIG. 10), for transmission of a packet to the destination host by using the information on a virtual connection contained in the VC structure.

When no NH entry corresponding to the destination host is available, an NHRP request for the ATM address of the destination host is prepared and transferred to the next hop server. When the next hop server receives the NHRP request, the next hop server produces an NHRP response as a response to the NHRP request, to send the same to the above next hop client, where the NHRP response contains the ATM address of the destination host. When the ATM address of the destination host is obtained from the next hop server, a new NH entry is produced, and a virtual connection is established corresponding to the ATM address. When a new NH entry is produced, a shortcut pointer (as indicated in FIG. 14) pointing to the NH entry (as indicated by (2') in FIG. 10) is stored in the entry, of the route cache 43, corresponding to the IP address of the destination host. Each entry of the route cache 43 is provided as a route cache structure (which is denoted as "rtable" structure in this specification).

As explained before, the routing table does not provide the IP address of the gateway router, and indicates an IP address of its own interface or a destination host, instead of the gateway address, since the conventional routing protocol does not cover the communication within the same LIS. However, in such a situation, if no NH entry provides data-link-layer path information to the destination host in the same LIS as the source host, the source host cannot start transmission of a packet until the source host receives a response to an NHRP request, from the next hop server. Therefore, an NH entry is provided as the default send entry, according to the twenty-third aspect of the present invention. It is desirable that the default send entry provides information on a data-link-layer path to a router which has established virtual connections to almost all of the hosts in the subnetwork. Therefore, in this example, information on a data-link-layer path to the next hop server is provided by the default send entry. In the NHRP system, generally, every next hop client should have established a virtual connection to the next hop server in the same LIS since all the next hop clients have to register their IP addresses and data link layer addresses in the next hop server. Thus, when the next hop server receives a packet from a next hop client through a data-link-layer path provided by the default entry, the next hop server should be able to transfer the packet to the destination host.

The routing processing is performed when the operating system (OS) receives, from an application, a request for transmission of a packet for data transmission, relay of an IP packet, or the like. The operations of the construction of FIG. 10, when the operating system (OS) receives a request for transmission of a packet, is explained below with reference to FIGS. 11 and 12.

When the operating system (OS) receives a request for transmission of a packet to a destination host, a route search is performed (in step S101 in FIG. 11). Namely, the route cache is first searched. When a hit occurs at an entry (rtable structure) of the route cache 43, the shortcut pointer in the entry is referred to. When the shortcut pointer pointing to an NH entry is in the entry (step S102), it is determined (in step S103) whether or not a virtual connection is available. When a virtual connection is available, the packet is transmitted to the destination host through the virtual connection (in step S104).

When it is determined (in step S102) that no shortcut pointer exists in the above entry of the route cache, the operating system (OS) recognizes that no NH entry is provided for the destination host, and initiates operations for transmitting an NHRP request to a next hop server. In the operations, it is determined (in step S106) whether or not conditions for the NHRP request is satisfied. When no is determined in step S106, the operation goes to step 111 in FIG. 12. When yes is determined in step S106, it is determined (in step S107) whether or not an NH entry for the destination host exists. When yes is determined in step S107, it is determined (in step S108) whether or not a virtual connection is available. When no is determined in step S106, the operation goes to step 111 in FIG. 12. When yes is determined in step S108, the packet is transmitted through the virtual connection in step S109. When no is determined in step S107, an NHRP request is sent to the next hop server in step S110. Then, the operation goes to step S111 in FIG. 12.

Since it takes time until an NHRP response to the above NHRP request is returned to the operating system (OS) from the next hop server, the operations of transmitting the packet to the gateway router for the transmission through routers to the destination host, is initiated from the step S112 in FIG. 12. In step S111, it is determined whether or not an NH entry for the gateway router exists. When yes is determined in step S111, it is determined (in step S112) whether or not a virtual connection is available. When yes is determined in step S112, the packet is transmitted to the gateway router through the virtual connection. When no is determined in step S112, the operation goes to step S115. When no is determined in step S111, a second NHRP request for the ATM address of the gateway router is sent to the next hop server (in step S114). Then, the operation goes to step S115.

Since it also takes time until an NHRP response to the above second NHRP request for the ATM address of the gateway router is returned to the operating system (OS) from the next hop server, it is determined (in step S115) whether or not the default send entry is provided in the NH cache 73. When yes is determined in step S115, it is determined (in step S116) whether or not a virtual connection is available. When yes is determined in step S116, the packet is sent to a router (which may be the next hop server) for which the default send entry provides data-link-layer path information. When no is determined in step S115, it is determined (in step S118) whether or not data in the packet can be stored in a buffer memory. When yes is determined in step S118, the data in the packet is stored in the buffer memory, and the data is queued for its turn in step S119. When no is determined in step S116, the packet is discarded in step S120.

Figure 16:
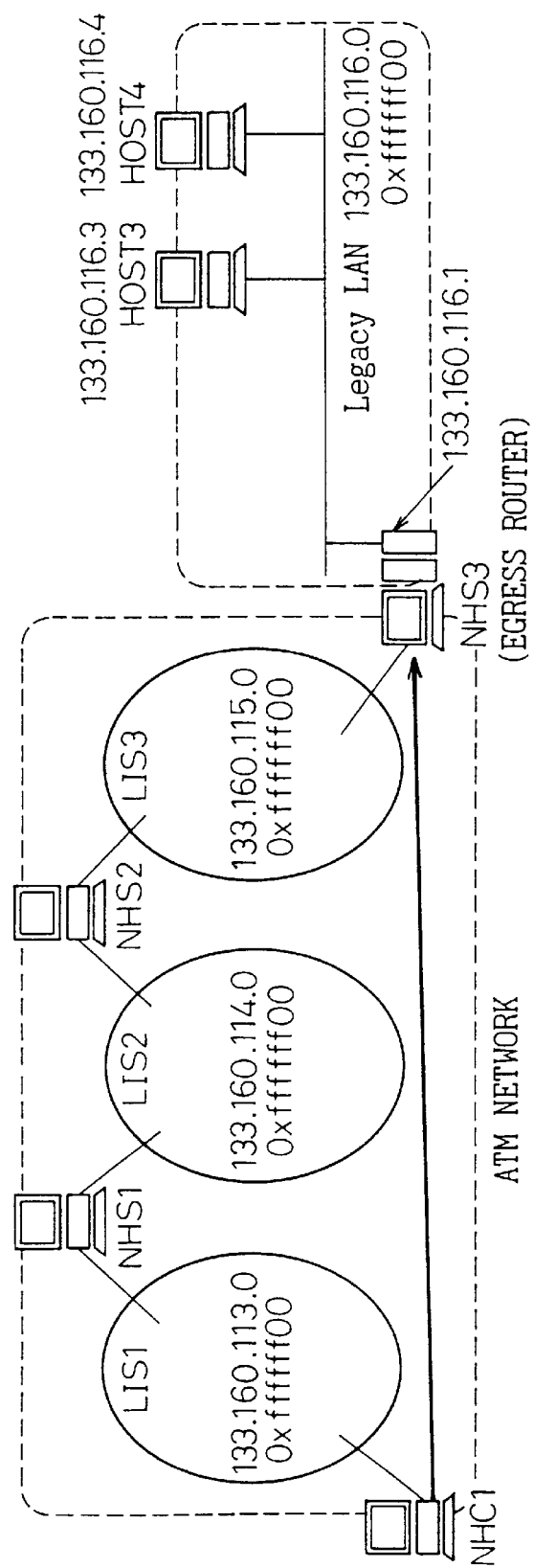
FIG. 16 is a diagram illustrating an example configuration of a network in which an egress router is provided.

FIG. 16 illustrates an example configuration of a network in which an egress router is provided. In the NHRP system, a router which relays a packet between an ATM network controlled under the NHRP protocol and a LAN, is called as egress router or ingress router. The denotation "egress router" is used when the router relays a packet from the ATM network to the LAN, and the denotation "ingress router" is used when the router relays a packet from the LAN to the ATM network. However, since, in almost all cases, the communication is performed bidirectionally, the router is an "egress" and "ingress" router at the same time.

The configuration of FIG. 16 contains the ATM network as indicated in FIG. 9, and a LAN containing hosts HOST3 and HOST4. The ATM network and the LAN are connected through the next hop server NHS3 as an egress router. When the next hop client NHC1 initiates transmission of a packet to the host HOST3 in the LAN, first the next hop client NHC1 sends to the next hop server NHS1 an NHRP request for requesting a data-link-layer address of the host HOST3. The NHRP request is transferred through the next hop servers NHS1 and NHS2 to the next hop server (egress router) NHS3. When the next hop server NHS3 receives the NHRP request, the next hop server NHS3 determines that a shortcut path can be established between the next hop client NHC1 and the next hop server NHS3, and that the shortcut path can be commonly used for communication between the next hop client NHC1 and any one of hosts in the LAN. Therefore, the next hop server NHS3 prepares an NHRP response containing the IP address of the destination host HOST3, a subnet mask (as information indicating the number of "1" bits in the subnet mask) corresponding to the network address of the LAN, and the ATM address of the next hop server NHS3, and sends the NHRP response to the next hop client NHC1 tracing back through the path through which the NHRP request was transferred to the next hop server NHS3. When the next hop client NHC1 receives the NHRP response, the received information on the subnet mask and the ATM address are stored in an entry of the NH cache, for example, as indicated in the third entry of the NH cache of FIG. 15. Then, the route cache is searched for an entry having the IP address of the destination host and the aforementioned pointer information, pointing to the above NH entry, is written in the entry of the route cache. In addition, the subnet mask in the entry of the route cache is replaced with the above subnet mask received with the NHRP response.

Thereafter, when searching the route cache, the decision of a hit is made when a destination host address and a subnet mask stored in each entry of the route cache and an IP address of a destination host satisfies the following relationship, where $\oplus$ denotes a bit-by-bit exclusive OR operation, and && denotes a bit-by-bit AND operation.

(IP Address of Destination Host) $\oplus$ (Destination Host Address of Route Cache) && (Subnet Mask)==0

When a hit occurs at an entry, an NH entry which the pointer information stored in the entry of the route cache points to, is accessed, to obtain information on a virtual connection which can be used for transmitting a packet to the destination host.

Figure 17:
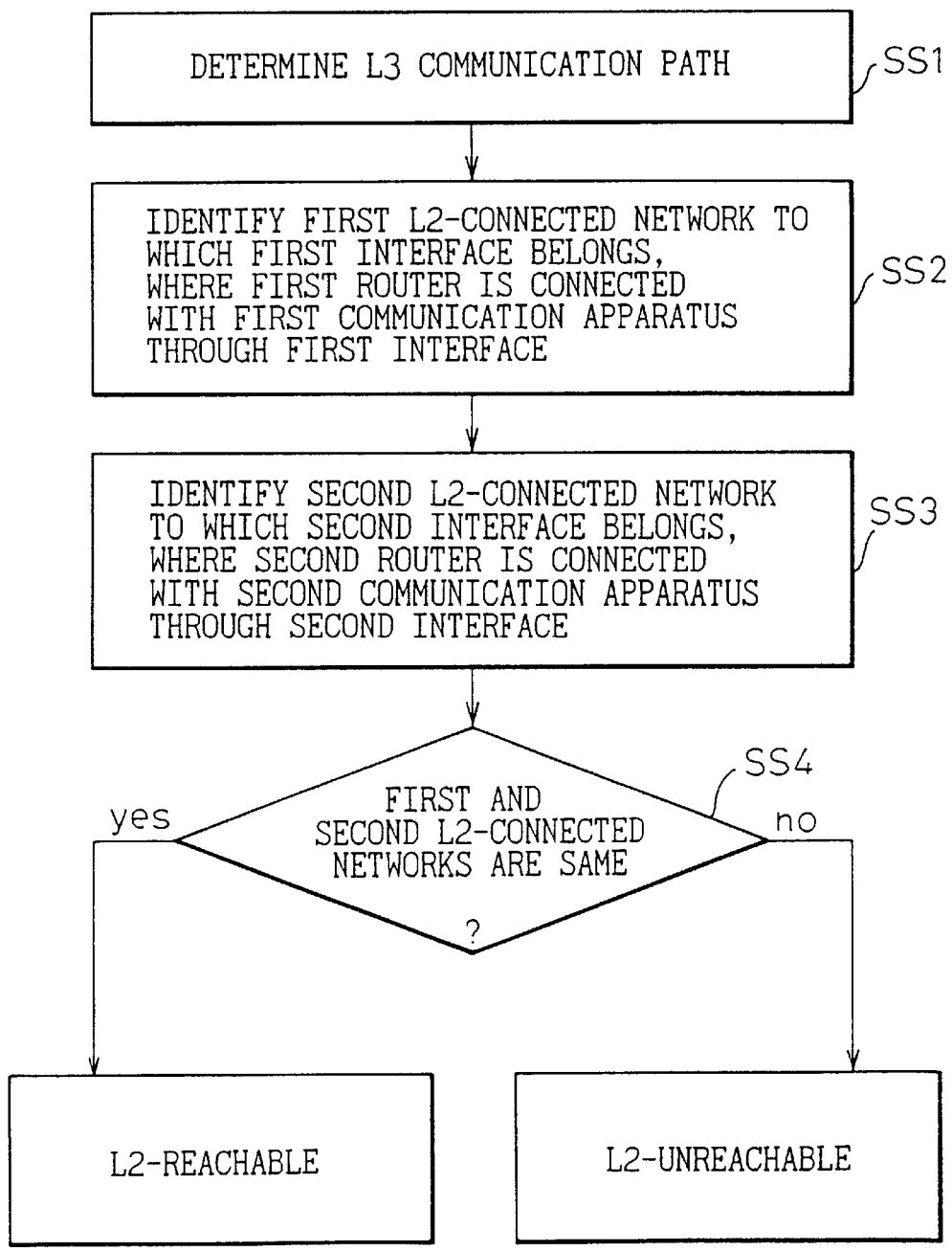
FIG. 17 is a diagram illustrating the basic sequence of the process according to the twenty-fourth aspect of the present invention.
Figure 18:
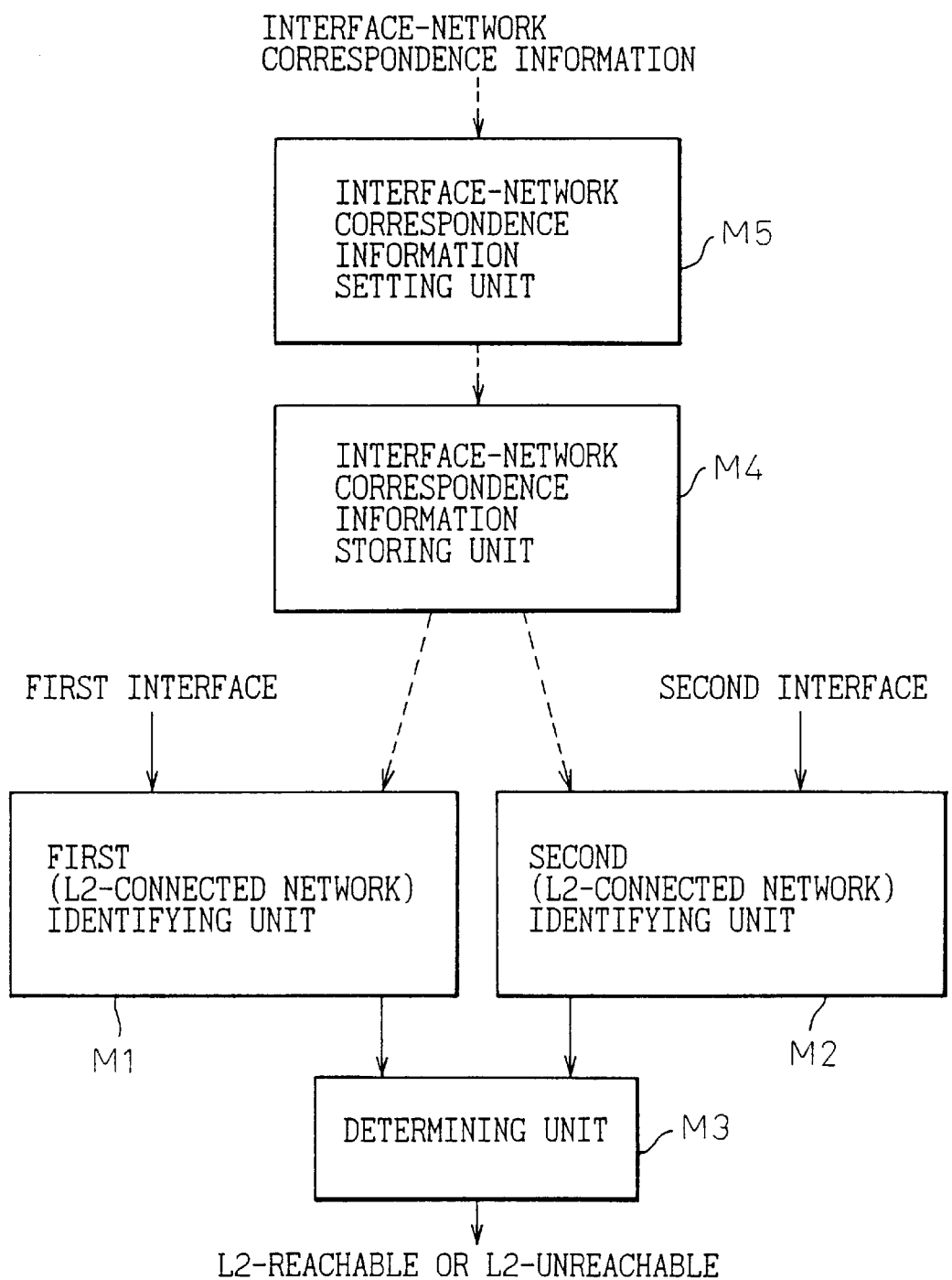
FIG. 18 is a diagram illustrating the basic construction of the apparatus according to the twenty-fifth aspect of the present invention.

OPERATIONS OR CONSTRUCTIONS OF TWENTY-FOURTH TO TWENTY-SIXTH ASPECTS OF INVENTION (FIGS. 17 AND 18)

As described in the "SUMMARY OF THE INVENTION", paragraphs (24) to (37), the processes, the apparatuses, and the products according to the twenty-fourth to thirty-seventh aspects of the present invention, are provided for determining layer-2 reachability between first and second communication apparatuses connected to a layer-3 communication network comprised of a plurality of subnetworks logically defined over at least one layer-2-connected communication network.

The twenty-fourth aspect of the present invention provides the most essential sequence among the twenty-fourth, twenty-ninth, and thirty-second aspects of the present invention, and the twenty-fifth aspect of the present invention provides the most essential apparatus construction among the twenty-fifth, twenty-seventh, thirtieth, thirty-third, and thirty-sixth aspects of the present invention FIG. 17 illustrates the basic sequence of the process according to the twenty-fourth aspect of the present invention. The steps SS1, SS2, SS3, and SS4, indicated in FIG. 17, respectively correspond to the steps (a), (b), (c), and (d), described in the "SUMMARY OF THE INVENTION", paragraph (24).

The first and second communication apparatuses in the twenty-fourth to thirty-seventh aspects of the present invention are, for example, a station which can be accessed based on an address assigned thereto, such as the aforementioned hosts and routers.

As described in the "SUMMARY OF THE INVENTION", paragraph (24), the layer-2 reachability is determined based on the coincidence between the layer-2 communication networks to which first and second interfaces of the first and second routers are connected, where the first interface is connected to the first communication apparatus through the first one of the plurality of subnetworks, and the second interface is connected to the second communication apparatus through the second one of the plurality of subnetworks. Since each of the plurality of subnetworks is contained (logically defined) in a certain layer-2-connected communication network, the layer-3 communication path passing through and being determined by the portion or all of the at least one router, passes through a first certain layer-2-connected communication network only, in the section between the first communication apparatus and the first router, and also passes through a second certain layer-2-connected communication network only, in the section between the second router and the second communication apparatus. Each router has a plurality of interfaces, and each of the plurality of interfaces is connected to a certain layer-2-connected communication network. When one of the plurality of interfaces of the first router is connected to the first communication apparatus through a first certain layer-2-connected communication network only, this interface and the first communication apparatus are connected to the same first layer-2-connected communication network, and when one of the plurality of interfaces of the second router is connected to the second communication apparatus through a second certain layer-2-connected communication network only, this interface and the first communication apparatus are connected to the same second layer-2-connected communication network. Therefore, the layer-2 reachability between the first and second communication apparatuses can be determined based on the layer-2 reachability between the above first and second interfaces of the first and second routers.

Since, generally, the number of the interfaces of all the routers in a layer-3 communication network is much less than the number of communication apparatuses (hosts) connected to the layer-3 communication network, the control of the operations of identifying layer-2-connected communication networks to which all the interfaces are connected, is much easier than the control of the operations of identifying layer-2-connected communication networks to which all the communication apparatuses are connected.

As described in the "SUMMARY OF THE INVENTION", paragraph (24-1), the above operations of identifying layer-2-connected communication networks can be facilitated by storing, in advance, anywhere in the layer-3 communication network, at least one piece of interface-network correspondence information indicating one of the at least one layer-2-connected communication network to which each of the first and second interfaces is connected. Preferably, the interface-network correspondence information for all the interfaces of all the routers may be stored in a storage provided in the layer-3 communication network, in advance of communication over the layer-3 communication network. The interface-network correspondence information for any one of the interfaces may be supplied by an operator to the storage, as a command for storing the interface-network correspondence information.

As described in the "SUMMARY OF THE INVENTION", paragraphs (24-2), (24-3), and (24-4), the operation of step (d) (SS4 in FIG. 17) may be performed by a decision device provided in the layer-3 communication network. The decision device may be located in either of the first and second routers. Preferably, the decision device may be provided in each of the routers in the layer-3 communication network, so that the decision device in one of the first and second routers can be used in the operation of step (d).

The apparatus according to the twenty-fifth aspect of the present invention, is provided for executing the above process according to the twenty-fourth aspect of the present invention.

FIG. 18 illustrates the basic construction of the apparatus according to the twenty-fifth aspect of the present invention. The elements M1, M2, and M3, indicated in FIG. 18, respectively correspond to the first identifying unit, the second identifying unit, and the determining unit, described in the "SUMMARY OF THE INVENTION", paragraph (25).

As an additional feature, the element M4 indicated in FIG. 18, which corresponds to the at least one interface-network correspondence information storing unit described in the "SUMMARY OF THE INVENTION", paragraph (25-1), may be provided. As a further additional feature, the element M5 indicated in FIG. 18, which corresponds to the at least one interface-network correspondence information setting unit described in the "SUMMARY OF THE INVENTION", paragraph (25-2), may be provided.

The respective elements M1 to M5 of the apparatus according to the twenty-fifth aspect of the present invention, may be located at a predetermined place in the layer-3 communication network, or may be located at distributed locations within the layer-3 communication network. The interface-network correspondence information setting unit (M5 in FIG. 18) may be a portable terminal which can be connected to the layer-3 communication network.

The product according to the twenty-sixth aspect of the present invention, described in the "SUMMARY OF THE INVENTION", paragraph (26), may be a storage medium such as a ROM, a CD-ROM, a CD-R, a DVD-ROM, a DVD-RAM, a DVD-R, and a floppy disc, or a programmed hardware logic circuit such as a custom LSI which, when used with an apparatus, outputs control signals and data for directing the apparatus to realize the functions of the respective units defined in the above apparatus according to the twenty-fifth aspect of the present invention. In addition, either of the above additional features (25-1) and (25-2) in the twenty-fifth aspect of the present invention may be adopted in the apparatus.

Figure 19:
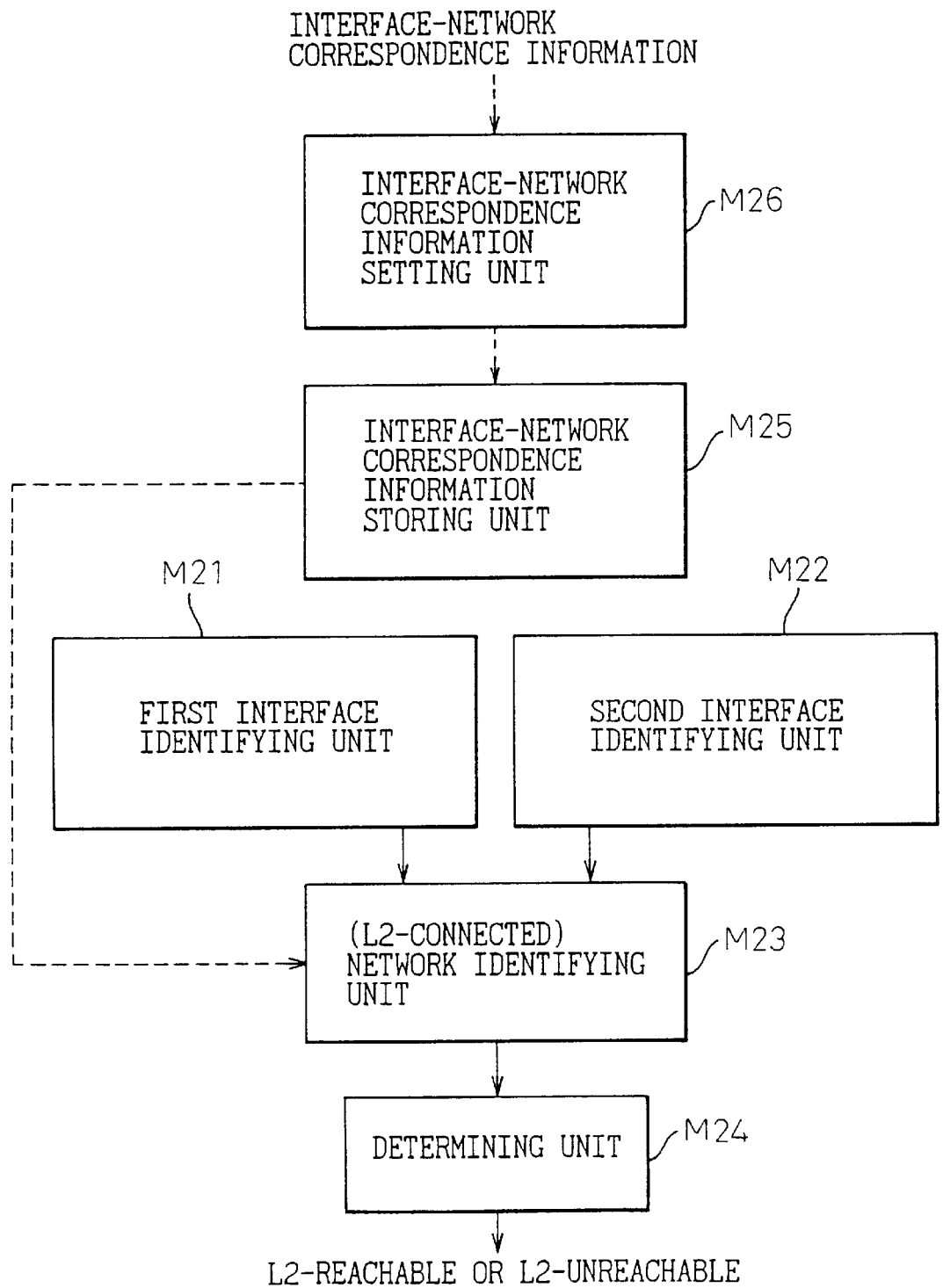
FIG. 19 is a diagram illustrating the basic construction of the apparatus according to the twenty-seventh aspect of the present invention.

OPERATIONS OR CONSTRUCTIONS OF TWENTY-SEVENTH AND TWENTY-EIGHTH ASPECTS OF INVENTION (FIG. 19)

FIG. 19 illustrates the basic construction of the apparatus according to the twenty-seventh aspect of the present invention. The elements M21 and M22, indicated in FIG. 19, respectively correspond to the first and second interface identifying units described in the "SUMMARY OF THE INVENTION", paragraph (27), and the element M23 corresponds to the first and second network identifying units, and the element M24 corresponds to the determining unit. Namely, the first and second network identifying units in the twenty-seventh aspect of the present invention may be unified to one unit as indicated as the element M23 in FIG. 19. In the twenty-seventh aspect of the present invention, the functions of the first and second identifying units in the twenty-fifth aspect of the present invention are decomposed into the functions of identifying the first and second interfaces, and the functions of identifying the layer-2-connected communication networks based on the first and second interfaces.

As an additional feature, the element M25 indicated in FIG. 19 (which corresponds to the element M4 in FIG. 18) may be provided, as described in the "SUMMARY OF THE INVENTION", paragraph (27-1). As a further additional feature, the element M26 indicated in FIG. 19 (which corresponds to the element M5 in FIG. 18) may be provided, as described in the "SUMMARY OF THE INVENTION", paragraph (27-2). The at least one piece of interface-network correspondence information stored in the element M25 may be used in the operations the first and second network identifying units (M23 in FIG. 19).

The respective elements M21 to M26 of the apparatus according to the twenty-seventh aspect of the present invention, may be located at a predetermined place in the layer-3 communication network, or may be located in a distributed manner within the layer-3 communication network. The interface-network correspondence information setting unit (M26 in FIG. 19) may be a portable terminal which can be connected to the layer-3 communication network.

The product according to the twenty-eighth aspect of the present invention, described in the "SUMMARY OF THE INVENTION", paragraph (28), may be a storage medium such as a ROM, a CD-ROM, a CD-R, a DVD-ROM, a DVD-RAM, a DVD-R, and a floppy disc, or a programmed hardware logic circuit such as a custom LSI which, when used with an apparatus, outputs control signals and data for directing the apparatus to realize the functions of the respective units defined in the above apparatus according to the twenty-seventh aspect of the present invention. In addition, either of the above additional features (27-1) and (27-2) in the twenty-seventh aspect of the present invention may be adopted in the apparatus.

Figure 20:
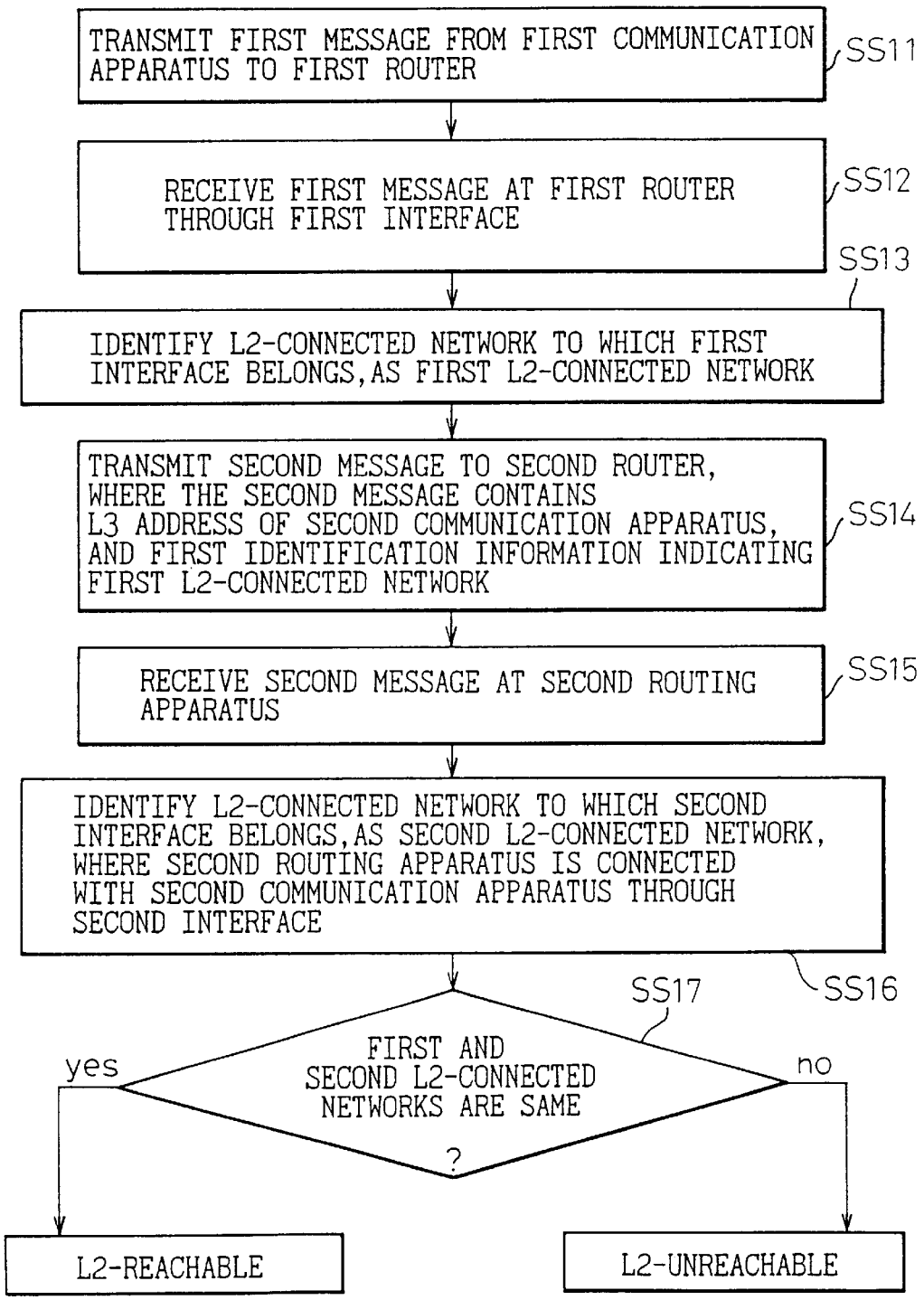
FIG. 20 is a diagram illustrating the basic sequence of the process according to the twenty-ninth aspect of the present invention.
Figure 21:
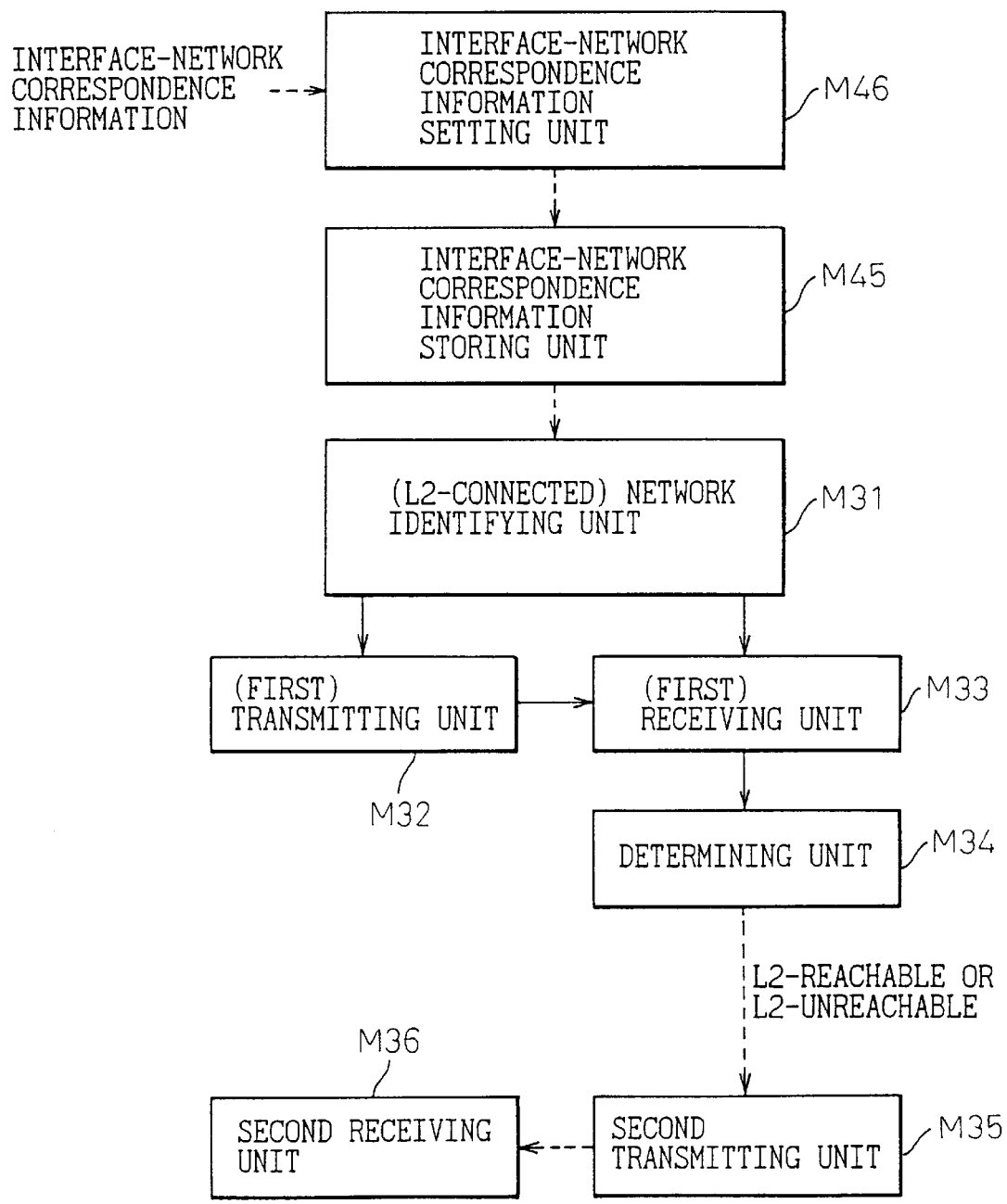
FIG. 21 is a diagram illustrating the basic construction of the apparatus according to the thirtieth aspect of the present invention.

OPERATIONS OR CONSTRUCTIONS OF TWENTY-NINTH TO THIRTY-FIRST ASPECTS OF INVENTION (FIGS. 20 AND 21)

FIG. 20 illustrates the basic sequence of the process according to the twenty-ninth aspect of the present invention. The steps SS11, SS12, SS13, SS14, SS15, SS16, and SS17, indicated in FIG. 20, respectively correspond to the steps (a), (b), (c), (d), (e), (f), and (g), described in the "SUMMARY OF THE INVENTION", paragraph (29).

As described in the "SUMMARY OF THE INVENTION", paragraph (29), according to the twenty-ninth aspect of the present invention, a message containing the layer-3 address of the second communication apparatus, is transmitted from the first communication apparatus to the first router in steps (a) and (b) (SS11 and SS12 in FIG. 20), and is then transmitted to the second router through the layer-3 communication path determined by at least one router on the layer-3 communication path based on the layer-3 address of the second communication apparatus. During the transfer of the message, the layer-2-connected communication network to which the first interface of the first router is connected, is determined in step (c) (SS13 in FIG. 20). Then, the network information indicating the determined layer-2-connected communication network, is contained in the message transmitted from the first router to the second router in steps (d) and (e) (SS14 and SS15 in FIG. 20).

After the second router receives the above message in step (e) (SS15 in FIG. 20), the second router determines the layer-2-connected communication network to which the second interface of the second router is connected, in step (f) (SS16 in FIG. 20). Then, the layer-2-connected communication networks determined in steps (c) and (f) are compared in step (g) to determine whether or not these layer-2-connected communication networks are identical. When these layer-2-connected communication networks are identical, it is determined that there exists layer-2 reachability between the first and second communication apparatuses.

As explained before, when the aforementioned NHRP request is transmitted from the first communication apparatus to the first router, the NHRP request is transferred from the first router to the second router through the layer-3 communication path in the same manner as the above message in the twenty-ninth aspect of the present invention. Therefore, the above message may be incorporated into the NHRP message. Since, usually, the request for the layer-2 address of the second communication apparatus and the request for the layer-2 reachability to the second communication apparatus will occur at the same time in the first communication apparatus, the above sequence of the twenty-ninth aspect of the present invention, and the incorporation, into the NHRP request, of the above message in the twenty-ninth aspect of the present invention, will be advantageous.

As a variation of the above sequence, information indicating the first interface, instead of the above network information indicating the determined layer-2-connected communication network, may be transmitted from the first router to the second router in step (d) (SS14 in FIG. 20). In this case, the layer-2-connected communication network to which the first interface is connected may be determined based on the transmitted information on the first interface at the second router.

As described in the "SUMMARY OF THE INVENTION", paragraph (29-1), as an additional feature, the first router may store first interface-network correspondence information indicating the first layer-2-connected communication network to which the first interface of the first router is connected, and the second router may store second interface-network correspondence information indicating the second layer-2-connected communication network to which the second interface of the second router is connected.

The apparatus according to the thirtieth aspect of the present invention, is provided for executing the above process according to the twenty-ninth aspect of the present invention.

FIG. 21 illustrates the basic construction of the apparatus according to the thirtieth aspect of the present invention. The elements M31, M32, M33, and M34, indicated in FIG. 21, respectively correspond to the network identifying unit, the transmitting unit, the receiving unit, and the determining unit, described in the "SUMMARY OF THE INVENTION", paragraph (30). Since the apparatus according to the thirtieth aspect of the present invention is provided for each of the first and second router, the process according to the twenty-ninth aspect of the present invention can be executed between any two communication apparatuses in the layer-3 communication network.

Corresponding to the above variation of the sequence of the twenty-ninth aspect of the present invention, the information indicating the first interface, instead of the above network information indicating the determined layer-2-connected communication network, may be transmitted from the first router to the second router by the transmitting unit (M32 in FIG. 21). In this case, the layer-2-connected communication network to which the first interface is connected may be determined based on the transmitted information on the first interface at the determining unit (M34 in FIG. 21) in the second router.

As an additional feature, the element M45 indicated in FIG. 21, which corresponds to the at least one interface-network correspondence information storing unit described in the "SUMMARY OF THE INVENTION", paragraph (30-1), may be provided. As a further additional feature, the element M46 indicated in FIG. 21, which corresponds to the at least one interface-network correspondence information setting unit described in the "SUMMARY OF THE INVENTION", paragraph (30-2), may be provided.

Further, as indicated in FIG. 21, the second transmitting unit M35 for transmitting the result of the determination by the determining unit M34 from the second router to the first router, may be provided in the second router, and the second receiving unit M36 for receiving the transmitted result at the first router, may be provided in the first router.

The product according to the thirty-first aspect of the present invention, described in the "SUMMARY OF THE INVENTION", paragraph (31), may be a storage medium such as a ROM, a CD-ROM, a CD-R, a DVD-ROM, a DVD-RAM, a DVD-R, and a floppy disc, or a programmed hardware logic circuit such as a custom LSI which, when used with an apparatus, outputs control signals and data for directing the apparatus to realize the functions of the respective units defined in the above apparatus according to the thirtieth aspect of the present invention. In addition, either of the above additional features (30-1) and (30-2) in the thirtieth aspect of the present invention may be adopted in the apparatus.

Figure 22:
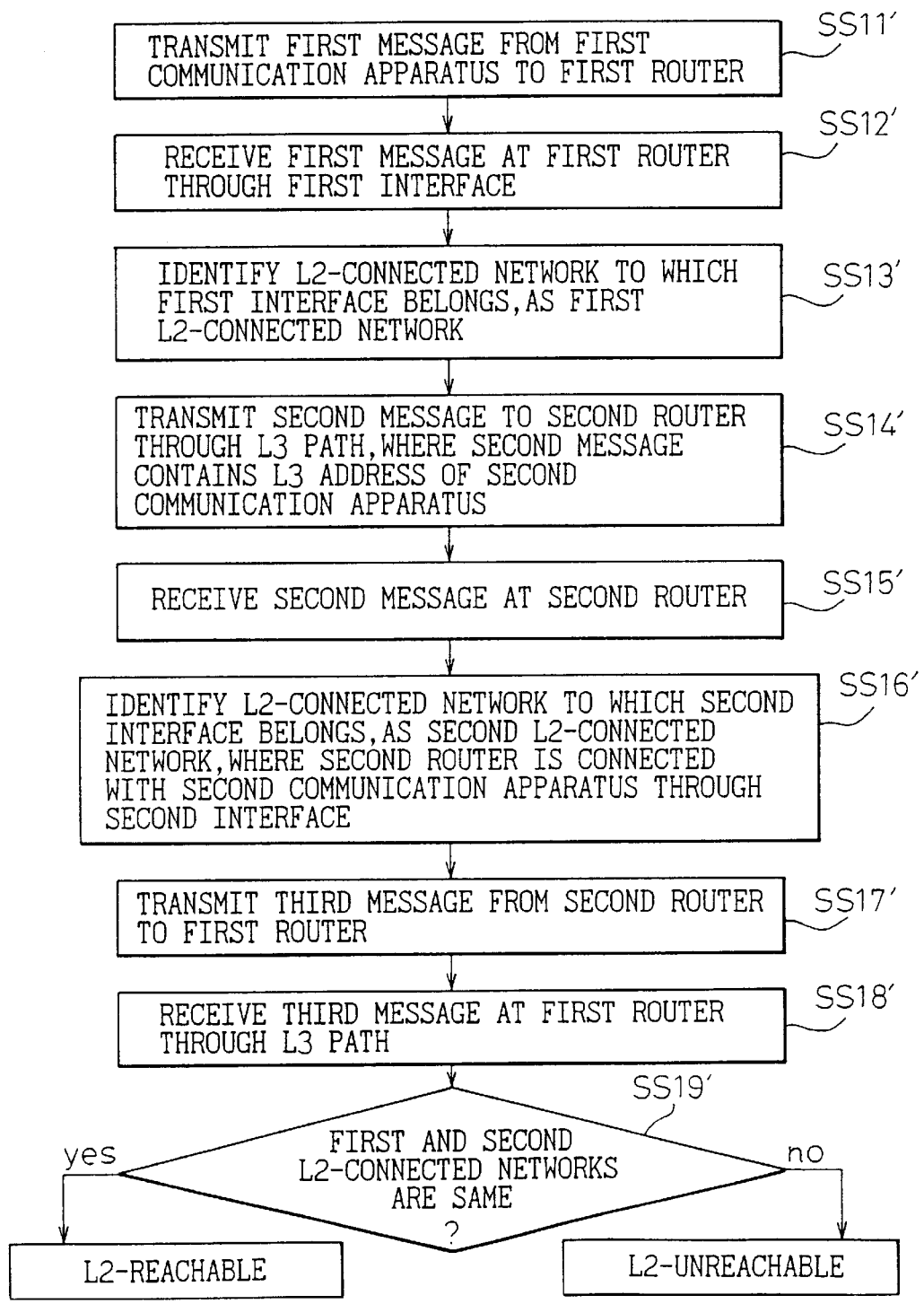
FIG. 22 is a diagram illustrating the basic sequence of the process according to the thirty-second aspect of the present invention.
Figure 23:
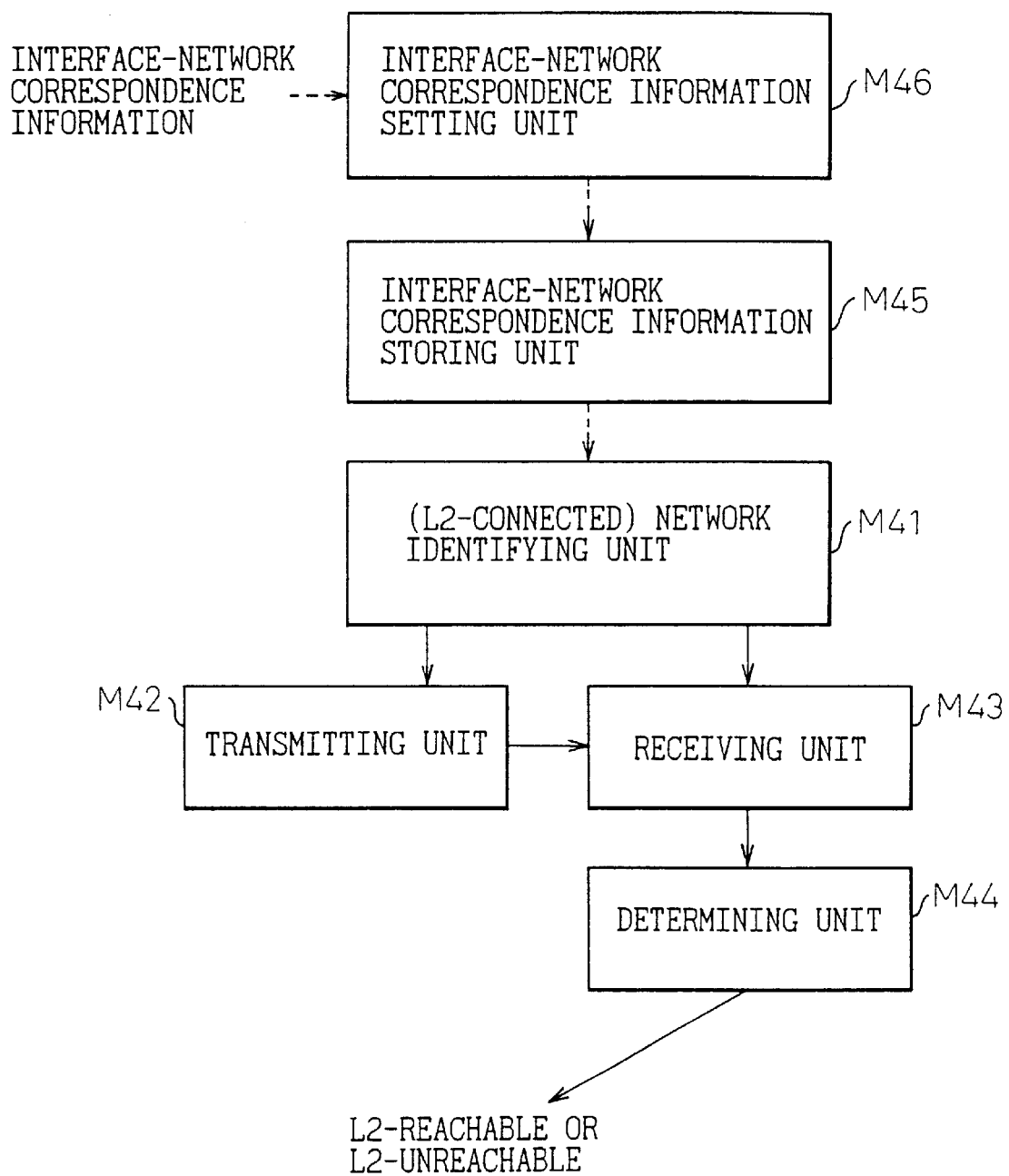
FIG. 23 is a diagram illustrating the basic construction of the apparatus according to the thirty-third aspect of the present invention.

OPERATIONS OR CONSTRUCTIONS OF THIRTY-SECOND TO THIRTY-FOURTH ASPECTS OF INVENTION (FIGS. 22 AND 23)

FIG. 22 illustrates the basic sequence of the process according to the thirty-second aspect of the present invention. The steps SS11', SS12', SS13', SS14', SS15', SS16', SS17', SS18', and SS19', indicated in FIG. 22, respectively correspond to the steps (a), (b), (c), (d), (e), (f), (g), (h), and (i), described in the "SUMMARY OF THE INVENTION", paragraph (32).

As described in the "SUMMARY OF THE INVENTION", paragraph (32), according to the thirty-second aspect of the present invention, the first message containing the layer-3 address of the second communication apparatus, is transmitted from the first communication apparatus to the first router in steps (a) and (b) (SS11' and SS12' in FIG. 22), and is then transmitted, as the second message, in steps (d) and (e) (SS14' and SS15' in FIG. 22), to the second router through the layer-3 communication path determined by at least one router on the layer-3 communication path based on the layer-3 address of the second communication apparatus. During the transfer of the message, the layer-2-connected communication network to which the first interface of the first router is connected, is determined in step (c) (SS13' in FIG. 22).

After the second router receives the above message in step (e) (SS15' in FIG. 22), the second router determines the layer-2-connected communication network to which the second interface of the second router is connected, in step (f) (SS16' in FIG. 22). Then, the network information indicating the determined layer-2-connected communication network, is transmitted, as the third message, from the second router to the first router, in steps (g) and (h) (SS17' and SS18' in FIG. 22).

When the first router receives the third message, the layer-2-connected communication networks determined in steps (c) and (f) are compared in step (i) to determine whether or not these layer-2-connected communication networks are identical. When these layer-2-connected communication networks are identical, it is determined that there exists layer-2 reachability between the first and second communication apparatuses.

Similar to the sequence according to the twenty-ninth aspect of the present invention, the first and second messages in the above sequence according to the thirty-second aspect of the present invention, may be incorporated into the NHRP request.

As a variation of the above sequence, information indicating the second interface, instead of the above network information indicating the layer-2-connected communication network determined in the second router in step (f), may be transmitted from the second router to the first router in step (g) (SS17' in FIG. 22). In this case, the layer-2-connected communication network to which the second interface is connected may be determined based on the transmitted information on the second interface at the first router.

As described in the "SUMMARY OF THE INVENTION", paragraph (32-1), as an additional feature, the first router may store first interface-network correspondence information indicating the first layer-2-connected communication network to which the first interface of the first router is connected, and the second router may store second interface-network correspondence information indicating the second layer-2-connected communication network to which the second interface of the second router is connected.

The apparatus according to the thirty-third aspect of the present invention, is provided for executing the above process according to the thirty-second aspect of the present invention.

FIG. 23 illustrates the basic construction of the apparatus according to the thirty-third aspect of the present invention. The elements M41, M42, M43, and M44, indicated in FIG. 23, respectively correspond to the network identifying unit, the transmitting unit, the receiving unit, and the determining unit, described in the "SUMMARY OF THE INVENTION", paragraph (33). Since the apparatus according to the thirty-third aspect of the present invention is provided for each of the first and second router, the process according to the thirty-second aspect of the present invention can be executed between any two communication apparatuses in the layer-3 communication network.

As an additional feature, the element M45 indicated in FIG. 23, which corresponds to the at least one interface-network correspondence information storing unit described in the "SUMMARY OF THE INVENTION", paragraph (33-1), may be provided. As a further additional feature, the element M46 indicated in FIG. 23, which corresponds to the at least one interface-network correspondence information setting unit described in the "SUMMARY OF THE INVENTION", paragraph (33-2), may be provided.

The product according to the thirty-fourth aspect of the present invention, described in the "SUMMARY OF THE INVENTION", paragraph (34), may be a storage medium such as a ROM, a CD-ROM, a CD-R, a DVD-ROM, a DVD-RAM, a DVD-R, and a floppy disc, or a programmed hardware logic circuit such as a custom LSI which, when used with an apparatus, outputs control signals and data for directing the apparatus to realize the functions of the respective units defined in the above apparatus according to the thirty-third aspect of the present invention. In addition, either of the above additional features (33-1) and (33-2) in the thirty-third aspect of the present invention may be adopted in the apparatus.

Figure 24:
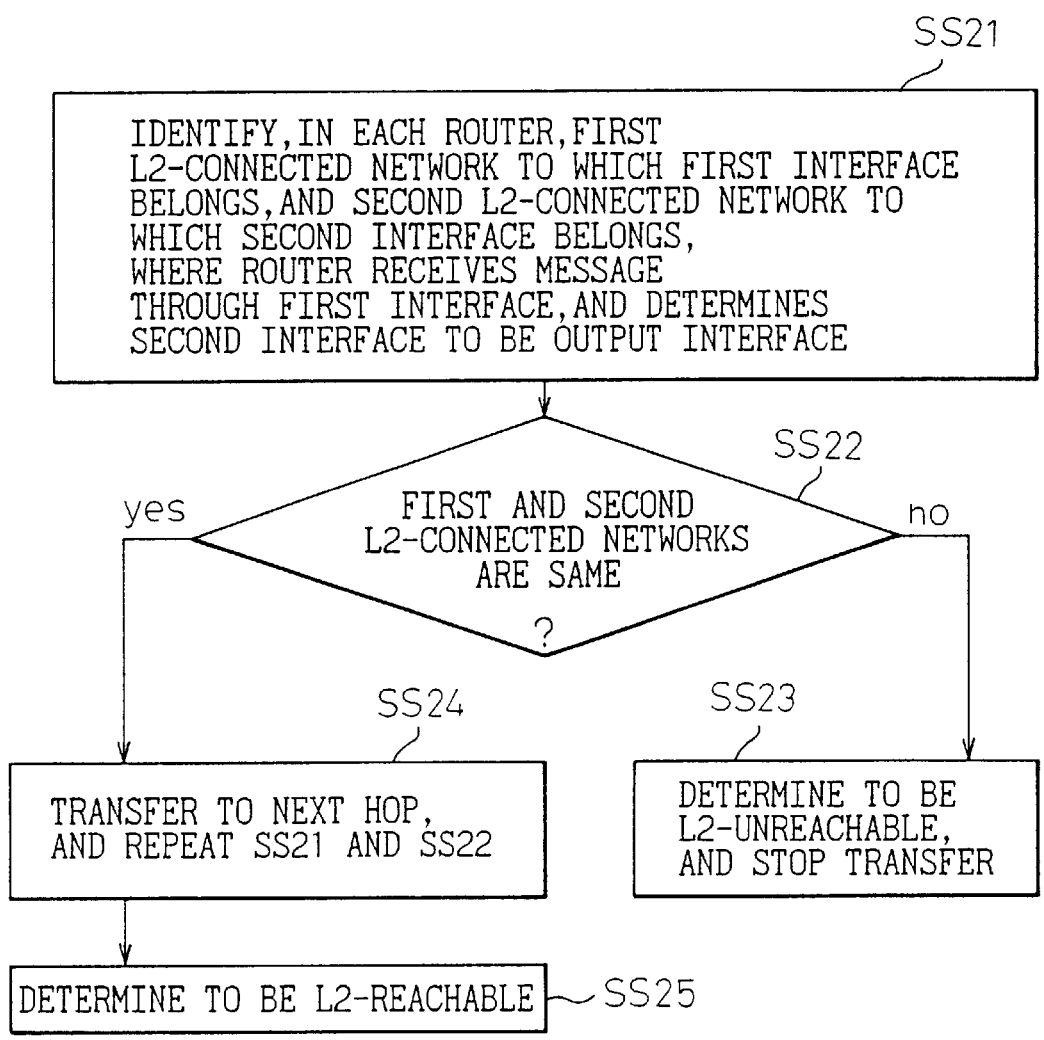
FIG. 24 is a diagram illustrating the basic sequence of the process according to the thirty-fifth aspect of the present invention.
Figure 25:
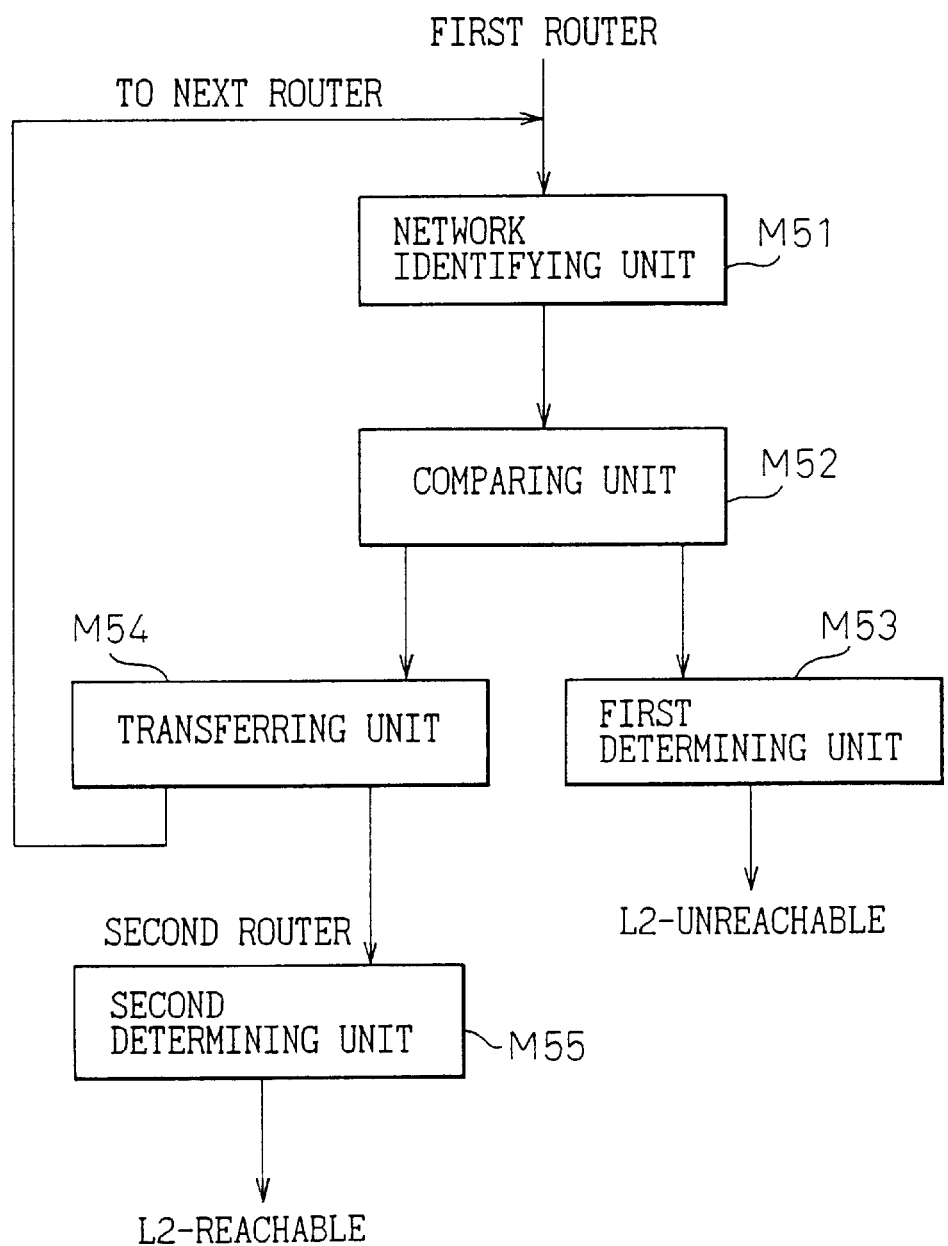
FIG. 25 is a diagram illustrating the basic construction of the apparatus according to the thirty-sixth aspect of the present invention.

OPERATIONS OR CONSTRUCTIONS OF THIRTY-FIFTH TO THIRTY-SEVENTH ASPECTS OF INVENTION (FIGS. 24 AND 25)

FIG. 24 illustrates the basic sequence of the process according to the thirty-fifth aspect of the present invention. The step SS21, SS22, SS23, SS24, and SS25, indicated in FIG. 24, correspond to the steps (a), (b), (c), (d), and (e), described in the "SUMMARY OF THE INVENTION", paragraph (35).

As described in the "SUMMARY OF THE INVENTION", paragraph (35), the process according to the thirty-fifth aspect of the present invention, is executed during the transfer operation of a message containing a layer-3 address of the second communication apparatus, from the first communication apparatus on a layer-3 communication path which is determined hop by hop by at least one router on the layer-3 communication path based on the layer-3 address of the second communication apparatus contained in the message.

In step (a) (SS21 in FIG. 24), at each router, when the above message reaches the router, the first layer-2-connected communication network to which the first interface through which the router received the message, is identified. In addition, the second layer-2-connected communication network to which the second interface through which the router determined to forward the message, is identified. Then, in step (b) (SS22 in FIG. 24), these first and second layer-2-connected communication networks are compared. When the said each router is not the last router on the layer-3 communication network, and the first and second layer-2-connected communication network are determined, in step (b), not to be identical, it is determined that the first and second communication apparatuses cannot communicate with each other by using a layer-2 communication path only, and the transfer of the message is stopped, in step (c) (SS23 in FIG. 24). When the said each router is not the last router on the layer-3 communication network, and the first and second layer-2-connected communication network are determined, in step (b), to be identical, the message is transferred to the next hop, and the operations of the above steps SS21 and SS22 are repeated, in step (d) (SS24 in FIG. 24). When the message reaches the last router on the layer-3 communication path, and it is determined, in step (b), that the first and second layer-2-connected communication networks are identical, it is determined, in step (e) (SS25 in FIG. 24), that the first and second communication apparatuses are layer-2 reachable from each other.

Similar to the sequence according to the twenty-ninth aspect of the present invention, the first and second messages in the above sequence according to the thirty-fifth aspect of the present invention, may be incorporated into the NHRP request.

As explained later with the example of FIG. 32, the process according to the thirty-fifth aspect of the present invention, has an imperfection that, in the case wherein the layer-3 communication path originates from a layer-2-connected communication network, then passes through a second layer-2-connected communication network which is not connected to the first layer-2-connected communication network in the data link layer, and goes back the first layer-2-connected communication network to terminate therein, the router located between the first and second layer-2-connected communication networks determines that first and second communication apparatuses cannot communicate with each other by using a layer-2 communication path only, before the message goes back to the first layer-2-connected communication network. Since the layer-3 communication path terminates in the same layer-2-connected communication network as the network the layer-3 communication path originated from, the twenty-fourth, twenty-ninth, and thirty-second aspects of the present invention will determine that first and second communication apparatuses can communicate with each other by using a layer-2 communication path only.

As described in the "SUMMARY OF THE INVENTION", paragraph (35-1), as an additional feature, the first router may store first interface-network correspondence information indicating the first layer-2-connected communication network to which the first interface of the first router is connected, and the second router may store second interface-network correspondence information indicating the second layer-2-connected communication network to which the second interface of the second router is connected.

The apparatus according to the thirty-sixth aspect of the present invention, is provided for executing the above process according to the thirty-fifth aspect of the present invention.

FIG. 25 illustrates the basic construction of the apparatus according to the thirty-sixth aspect of the present invention. The elements M51, M52, M53, M54, and M55, indicated in FIG. 25, respectively correspond to the network identifying unit, the comparing unit, the first determining unit, the transmitting unit, and the second determining unit, described in the "SUMMARY OF THE INVENTION", paragraph (36). Since the apparatus according to the thirty-sixth aspect of the present invention is provided for each of the first and second router, the process according to the thirty-fifth aspect of the present invention can be executed between any two communication apparatuses in the layer-3 communication network.

As an additional feature, the at least one interface-network correspondence information storing unit described in the "SUMMARY OF THE INVENTION", paragraph (36-1), may be provided. As a further additional feature, the at least one interface-network correspondence information setting unit described in the "SUMMARY OF THE INVENTION", paragraph (36-2), may also be provided.

The product according to the thirty-seventh aspect of the present invention, described in the "SUMMARY OF THE INVENTION", paragraph (37), may be a storage medium such as a ROM, a CD-ROM, a CD-R, a DVD-ROM, a DVD-RAM, a DVD-R, and a floppy disc, or a programmed hardware logic circuit such as a custom LSI which, when used with an apparatus, outputs control signals and data for directing the apparatus to realize the functions of the respective units defined in the above apparatus according to the thirty-sixth aspect of the present invention. In addition, either of the above additional features (36-1) and (36-2) in the thirty-sixth aspect of the present invention may be adopted in the apparatus.

Hereinafter, explanations are provided for embodiments in which the NHRP procedure is used. However, it will be understood that the technical concepts disclosed with those embodiments can be applied to any other types of networks.

APPLICATION OF INVENTION TO FIRST EXAMPLE (FIG. 26)

Figure 26:
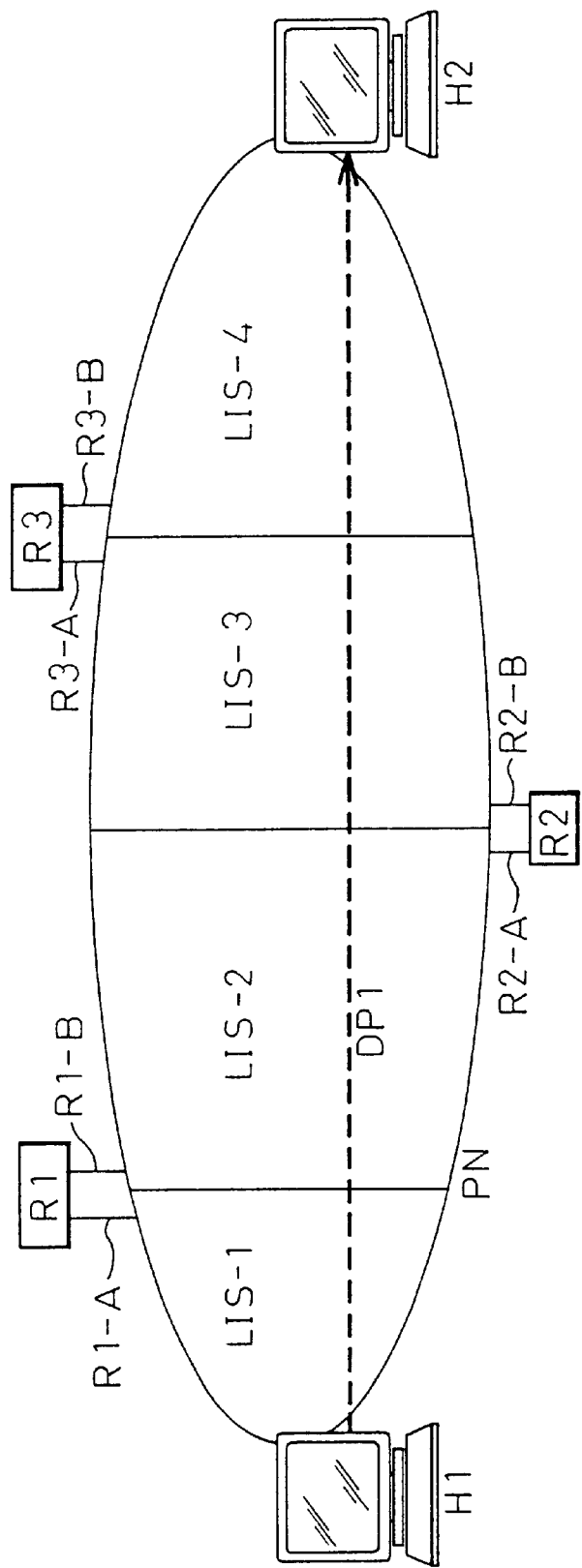
FIG. 26 is a diagram illustrating the first example configuration of the network.

FIG. 26 illustrates the first example configuration of the network. In FIG. 26, PN denotes a layer-2-connected communication network, on which the subnetworks LIS-1, LIS-2, LIS-3, and LIS-4 are logically defined. The subnetworks LIS-1 and LIS-2 are connected through the router R1, the subnetworks LIS-2 and LIS-3 are connected through the router R2, and the subnetworks LIS-3 and LIS-4 are connected through the router R3. Thus, a layer-3 communication network is constituted by these subnetworks LIS-1, LIS-2, LIS-3, and LIS-4 and routers R1, R2, and R3. The router R1 is connected to the subnetwork LIS-1 through the interface R1-A, and is connected to the subnetwork LIS-2 through the interface R1-B. The router R2 is connected to the subnetwork LIS-2 through the interface R2-A, and is connected to the subnetwork LIS-3 through the interface R2-B. The router R3 is connected to the subnetwork LIS-3 through the interface R3-A, and is connected to the subnetwork LIS-4 through the interface R3-B. The two interfaces of each router may be physically different interfaces, or two logical interfaces which are logically defined on a physically single path.

It is possible to perform communication through at least one of the routers between any hosts or routers in the layer-3 communication network of FIG. 26, based on layer-3 addresses of the hosts or routers. The host H1 is connected to the subnetwork LIS-1, and the host H2 is connected to the subnetwork LIS-4. For example, when the host H1 wishes to send a message to the host H2, the source host H1 sends a message containing an IP address of the destination host H2 in the header portion of the message (packet), to the router R1. When the router R1 receives the message from the source host H1, the router R1 forwards the message to the router R2, based on the IP address of the destination host contained in the message. When the router R2 receives the message from the router R1, the router R2 forwards the message to the router R3, based on the IP address of the destination host contained in the message. When the router R3 receives the message from the router R2, the router R3 obtains a layer-2 address of the destination host H2, based on the IP address of the destination host contained in the message, and forwards the message to the destination host H2. Namely, the message is transferred from the source host H1 to the destination host H2 through a layer-3 communication path passing through the routers R1, R2, and R3.

In order to determine layer-2 reachability from the source host H1 to the destination host H2, first, the twenty-fourth aspect of the present invention, is applied to this example. Since the layer-3 communication path is obtained as above, it is determined what is the layer-2-connected communication network to which the interface R1-A of the router R1 is connected. In this example, the layer-2-connected communication network is the network PN. In addition, it is also determined what is the layer-2-connected communication network to which the interface R3-B of the router R3 is connected. In this example, this layer-2-connected communication network is also the network PN. Namely, these layer-2-connected communication networks are identical. Therefore, it is determined that the destination host H2 is layer-2 reachable from the source host H1. That is, a shortcut path can be established from the source host H1 to the destination host H2, as indicated by DP1 in FIG. 26. When actually executing this process on the layer-3 communication network of FIG. 26, any of the apparatuses according to the twenty-fifth, twenty-seventh, thirtieth, and thirty-third aspects of the present invention, can be used.

EMBODIMENT OF TWENTY-NINTH AND THIRTIETH ASPECTS OF INVENTION (FIGS. 27, 28A, 28B, 28C, 29, 30A, 30B, 31A, 31B, AND 31C)

FIG. 27 illustrates an example construction of the apparatus according to the thirtieth aspect of the present invention, as the fifth embodiment. In FIG. 27, reference numeral 1001 denotes an interface-network correspondence information setting unit, 1002 denotes an interface-network correspondence information storing unit, 1003 denotes an interface-network correspondence information reading unit, 1004 denotes a send-side or receive-side interface-network correspondence information sending unit, 1005 denotes a send-side or receive-side interface information identifying unit, 1006 denotes an interface-network correspondence information comparing unit, and 1007 denotes a send-side or receive-side interface-network correspondence information receiving unit. The interface-network correspondence information storing unit 1002 may be realized by a random access memories (RAM), or the like. The other units in FIG. 27 may be realized by software, hardware circuitry, or combinations thereof.

When the interface-network correspondence information setting unit 1001 receives a request for setting interface-network correspondence information, and the interface-network correspondence information setting unit 1001 sets the requested interface-network correspondence information in the interface-network correspondence information storing unit 1002. FIGS. 28A, 28B, and 28C illustrate as example contents of the interface-network correspondence information storing unit 1002. FIG. 28A illustrates an example of contents of the interface-network correspondence information for the interfaces R1-A and R1-B of the router R1 in the configuration of FIG. 26, FIG. 28B illustrates an example of contents of the interface-network correspondence information for the interfaces R2-A and R2-B of the router R2 in the configuration of FIG. 26, and FIG. 28C illustrates an example of contents of the interface-network correspondence information for the interfaces R3-A and R3-B of the router R3 in the configuration of FIG. 26. Since there is only one layer-2-connected communication network PN in the example of FIG. 26, the interface-network correspondence information for all the interfaces are the same network PN.

The operation of the construction is explained for the case wherein the twenty-ninth aspect of the present invention is executed. First, the source host H1 in FIG. 26 generates and sends a first message containing the IP address of the destination host H2, to the router R1, for requesting information on whether or not the destination host H2 is layer-2 reachable from the host H1. This message may also contain, or may be contained in, an NHRP request. The router R1 receives the first message through the interface R1-A. The send-side or receive-side interface information identifying unit 1005 recognizes the interface R1-A as an interface which received the first message, and sends a request for reading information on the interface R1-A, to the interface-network correspondence information reading unit 1003. In response to this request, the interface-network correspondence information reading unit 1003 reads the interface-network correspondence information "PN" for the interface R1-A, which is stored in the interface-network correspondence information storing unit 1002. The interface-network correspondence information for the interface R1-A is contained in a second message, together with the IP address of the destination host H2, and the second message is sent, by the send-side or receive-side interface-network correspondence information sending unit 1004, to the router R2 as the next hop. Namely, examples of the contents, which is essential to the present invention, of the second message is indicated in FIG. 29. In particular, in the case of FIG. 26, the contents of the second message are as shown in FIG. 30A.

When the router R2 receives the second message, the router R2 forwards the second message to the router R3, based on the IP address of the destination host H2. The router R3 is connected to the subnetwork LIS-4 to which the destination host H2 is connected. Therefore, when the router R3 receives the second message, the send-side or receive-side interface information identifying unit 1005 in the apparatus of FIG. 27, which is provided with the router R3, recognizes that the interface R3-B is connected to the subnetwork LIS-4 to which the destination host H2 is connected, and the send-side or receive-side interface information identifying unit 1005 sends a request for reading information on the interface R3-B, to the interface-network correspondence information reading unit 1003. In response to this request, the interface-network correspondence information reading unit 1003 reads the interface-network correspondence information "PN" for the interface R3-B, which is stored in the interface-network correspondence information storing unit 1002. This interface-network correspondence information "PN" is sent to the interface-network correspondence information comparing unit 1006. On the other hand, the interface-network correspondence information for the interface R1-A, which is contained in the second message received by this router R3, is also sent to the interface-network correspondence information comparing unit 1006, in which these two pieces of interface-network correspondence information are compared. The comparison result, which indicates whether or not the destination host H2 is layer-2 reachable from the source host H1, is sent, as a message, to the source host H1, tracing back the layer-3 communication path, in this example. However, the route through which the comparison result is sent to the source host H1, may be any other route. Examples of the contents of the above message sent to the source host H1, are indicated in FIG. 30B. This message contains the result of the determination that the destination host H2 is layer-2 reachable ("L2-reachable"). The example message of FIG. 30B also contains the layer-2 address (data-link-layer address) of the destination host H2. This is a response to the aforementioned NHRP request.

Although, in the above sequence, the comparison of the network information is performed at the router R3 in accordance with the twenty-ninth aspect of the present invention, the comparison may be performed at the router R1 in accordance with the thirty-second aspect of the present invention. In this case, the network information indicating the layer-2-connected communication network to which the interface R3-B is connected, is transferred from the router R3 to the router R1, instead of transferring the network information indicating the layer-2-connected communication network to which the interface R1-A is connected, is transferred from the router R1 to the router R3. FIG. 31A illustrates example contents of a message, which is generated by and transferred from the router R1 to the router R3, when the process according to the thirty-second aspect of the present invention is executed on the configuration of FIG. 26, or when the apparatus according to the thirty-third aspect of the present invention is used in the configuration of FIG. 26. Although not shown in all the drawings indicating message contents, attached to the present specification, it is assumed that each message contains information which indicates a type of the message, for example, a request for the information on the layer-2 reachability, or a response to a request for the information on the layer-2 reachability. This message contains the IP address of the router R1 since the network information has to be transferred from the router R3 to the router R1. The above message may also contain, or may be contained in, the NHRP request. Example contents of a message transferred from the router R3 to the router R1, when the process according to the thirty-second aspect of the present invention is executed on the configuration of FIG. 26, or when the apparatus according to the thirty-third aspect of the present invention is used in the configuration of FIG. 26, is illustrated in FIG. 31B. Namely, the message of FIG. 31B contains the network information indicating the layer-2-connected communication network "PN" to which the interface R3-B is connected. This message may also contain, or may be contained in, an NHRP response generated by the router R3. By using this network information, the comparison of the network information is performed at the router R1, and the result is transmitted from the router R1 to the source host H1. FIG. 31C illustrates example contents of a message transferred from the router R1 to the host H1, when the process according to the thirty-second aspect of the present invention is executed on the configuration of FIG. 26, or when the apparatus according to the thirty-third aspect of the present invention is used in the configuration of FIG. 26. The message of FIG. 31C contains the result of the determination that the destination host H2 is layer-2 reachable ("L2-reachable"), together with the layer-2 address of the destination host H2, which is the NHRP response.

APPLICATION OF INVENTION TO SECOND EXAMPLE (FIGS. 32 TO 36C)

Figure 32:
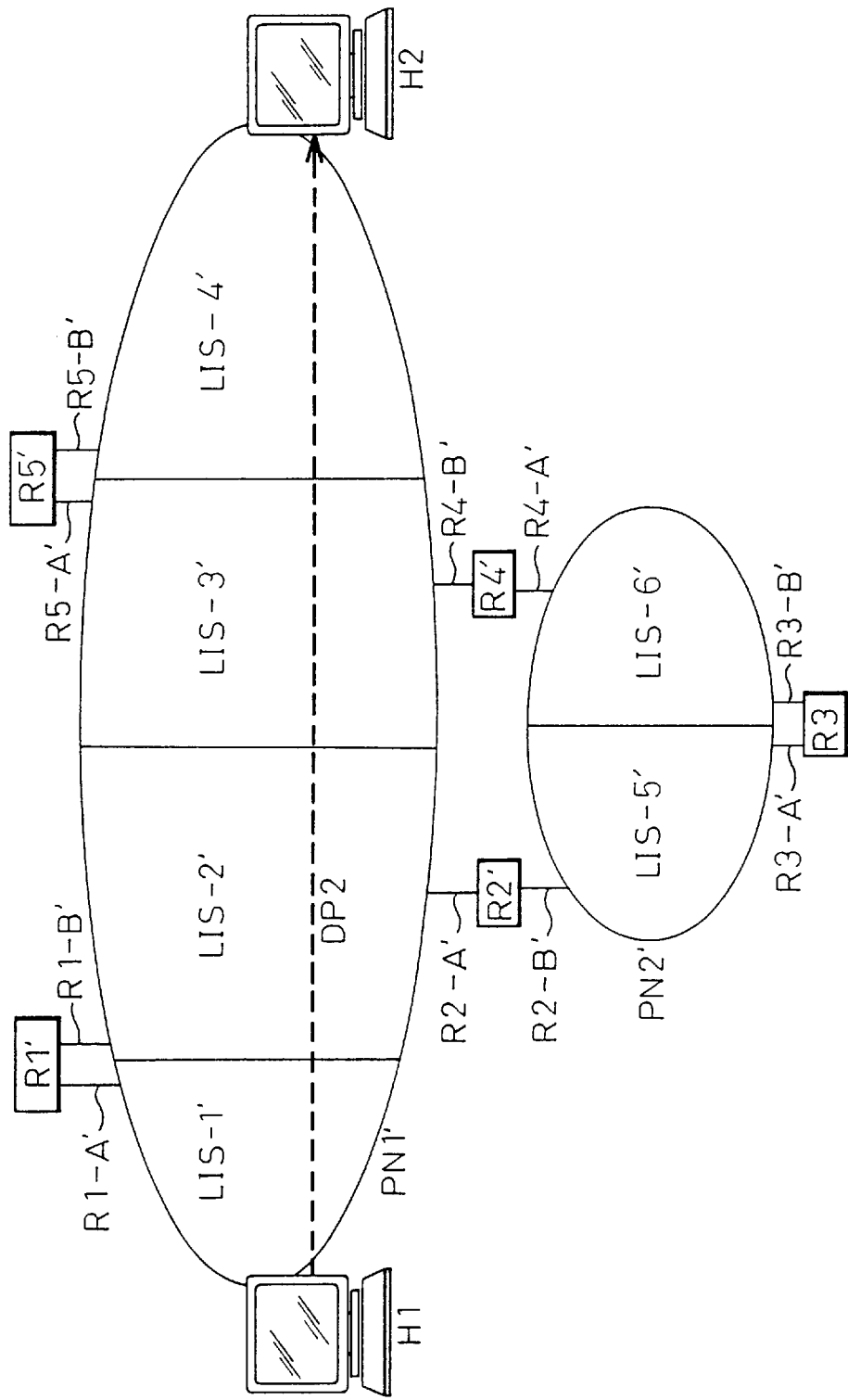
FIG. 32 is a diagram illustrating the second example configuration of the network.

FIG. 32 illustrates the second example configuration of the network. In FIG. 32, references PN1' and PN2' each denote a layer-2-connected communication network, for example, an ATM network. The subnetworks LIS-1', LIS-2', LIS-3', and LIS-4' are logically defined over the layer-2-connected communication network PN1', and the subnetworks LIS-5' and LIS-6' are logically defined over the layer-2-connected communication network PN2'. The router R1' connects the subnetworks LIS-1' and LIS-2', the router R2' connects the subnetworks LIS-2' and LIS-5', the router R3' connects the subnetworks LIS-5' and LIS-6', the router R4' connects the subnetworks LIS-6' and LIS-3', and the router R5' connects the subnetworks LIS-3' and LIS-4'. The router R1' is connected to the subnetwork LIS-1' through the interface R1-A', and to the subnetwork LIS-2' through the interface R1-B'. The router R2' is connected to the subnetwork LIS-2' through the interface R2-A', and to the subnetwork LIS-5' through the interface R2-B'. The router R3' is connected to the subnetwork LIS-5' through the interface R3-A', and to the subnetwork LIS-6' through the interface R3-B'. The router R4' is connected to the subnetwork LIS-6' through the interface R4-A', and to the subnetwork LIS-6' through the interface R4-B'. The router R5' is connected to the subnetwork LIS-3' through the interface R5-A', and to the subnetwork LIS-4' through the interface R5-B'. The layer-2-connected communication networks PN1' and PN2' and routers R1', R2', R3', R4', and R5' form a layer-3 communication network, and it is possible to perform communication between any hosts (or routers) connected to the layer-3 communication network of FIG. 32 by using the routers based on layer-3 addresses of the hosts (or routers).

The host H1 is connected to the subnetwork LIS-1', and the host H2 is connected to the subnetwork LIS-4'. When the host H1 wishes to send a message to the host H2, the source host H1 generates and sends to the router R1' a message containing the IP address of the destination host H2 in its header portion. The router R1' forwards the message to the router R2' as a next hop, based on the IP address of the destination host H2 in the header of the message, and then the message is forwarded through the router R2', the router R3', and the router R4' to the router R5'. The router R5' obtains the layer-2 address of the destination host H2, based on the IP address of the destination host H2, and sends the message to the destination host H2 based on the layer-2 address of the destination host H2.

According to the present invention, the interface-network correspondence information are stored in advance for (or in) the routers R1', R2', R3', R4', and R5'. Example contents of the interface-network correspondence information in the routers R1', R2', R3', R4', and R5', in the configuration of FIG. 32, are indicated in FIGS. 33A, 33B, 33C, 34A, and 34B, respectively. Namely, in the layer-3 communication network of FIG. 32, each of the interfaces of the routers is connected to one of the layer-2-connected communication networks PN1' and PN2'.

When the host H1 wishes to obtain information on whether or not the destination host H2 is layer-2 reachable from the host H1, in accordance with the process according to the twenty-ninth aspect of the present invention, the source host H1 generates and sends from the host H1 to the router R1' a message for requesting the information on whether or not the destination host H2 is layer-2 reachable from the host H1. This message may also contain, or may be contained in, an NHRP request. When the router R1' receives the message from the source host H1, the router R1' determines the interface R1-A' as an interface through which the router R1' received the message, and then identifies the layer-2-connected communication network PN1' to which the interface R1-A' is connected, according to the interface-network correspondence information as indicated in FIG. 33A. Thus, the router R1' generates a message containing the network information indicating "PN1'", and sends the message to the router R2', where the router R2' is determined by the router R1', based on the IP address of the destination host H2, as a router to which the message from the router R1' is to be sent next. FIG. 35A illustrates example contents of this message sent from the router R1' to the router R2', when the process according to the twenty-ninth aspect of the present invention is executed on the configuration of FIG. 32, or when the apparatus according to the thirtieth aspect of the present invention is used in the configuration of FIG. 32. This message is then transferred through the routers R2', R3', and R4', to the router R5'. This message may also contain, or may be contained in, the NHRP request. When the router R5' receives the above message, the router R5' determines the interface R5-B' to be an output interface directed to the destination host H2, based on the IP address of the destination host H2. According to FIG. 34B, the interface R5-B' is also connected to the layer-2-connected communication network PN1'. Therefore, after comparing the layer-2-connected communication networks to which the interfaces R1-A' and R5-B' are connected, the router R5' determines that the host H2 is layer-2 reachable from the source host H1. Then, a message containing the information on the determined layer-2 reachability, is transferred from the router R5' to the router R1' tracing back the layer-3 communication path through which the above message from the router R1' to the router R5' was transferred. FIG. 35B illustrates example contents of a message transferred from the router R5' to the router R1', when the process according to the twenty-ninth aspect of the present invention is executed on the configuration of FIG. 32, or when the apparatus according to the thirtieth aspect of the present invention is used in the configuration of FIG. 32. This message may also contain, or may be contained in, an NHRP response generated by the router R5'. The above message transferred from the router R5', is further transferred from the router R1' to the source host H1. Thus, the host H1 can establish a layer-2 communication path (shortcut path) from the host H1 to the host H2. Namely, according to the twenty-ninth aspect (and twenty-fourth and thirty-second aspects) of the present invention, the layer-2 reachability between two hosts can be determined even in the case wherein a layer-3 communication path determined between the two hosts passes, on the way, through another layer-2-connected communication network, which is different from the layer-2-connected communication network to which the two hosts are connected.

Otherwise, when the above message sent from the source host H1 to the router R1', and the message from the router R1' to the router R5', contain the layer-2 address of the source host H2, and the router R5' determines that the host H2 is layer-2 reachable from the host H1, the router R5' can directly transmit a message containing the information on the determined layer-2 reachability (and the layer-2 address of the host H2) to the host H1 through a layer-2 communication path (shortcut path) in the layer-2-connected communication network PN1' from the host H2 to the host H1, instead of transferring the message of FIG. 35B tracing back the above layer-3 communication path.

In addition, the layer-2 reachability between the hosts H1 and H2 can also be determined in accordance with the thirty-second aspect of the present invention. In this case, the host H1 also generates and sends to the router R1' a message containing the IP address of the destination host H2, for requesting the information on the layer-2 reachability.

When the host H1 wishes to obtain information on whether or not the destination host H2 is layer-2 reachable from the host H1, in accordance with the process according to the thirty-second aspect of the present invention. The host H1 also generates and sends from the host H1 to the router R1' a message for requesting the information on whether or not the destination host H2 is layer-2 reachable from the host H1. This message may also contain, or may be contained in, an NHRP request. When the router R1' receives the message from the source host H1, the router R1' generates and transfers through the routers R2', R3', and R4' to the router R5', a message requesting information on layer-2 reachability. The message contains the IP address of the destination host H2 and the IP address of the router R1' as, for example, indicated in FIG. 36A. This message may also contain, or may be contained in, the NHRP request. When the router R5' receives the message, the router R5' determines the interface R5-B' to be an output interface directed to the destination host H2, based on the IP address of the destination host H2. Then, the router R5' identifies the layer-2-connected communication network to which the interface R5-B' is connected, as "PN1'", according to the interface-network correspondence information as indicated in FIG. 34B. Then, the router R5' generates and sends to the router R1' a message, for example, as indicated in FIG. 36B. Namely, the message sent from the router R5' to the router R1' contains the network information indicating the determined layer-2-connected communication network, "PN1'", and may also contain the layer-2 address of the destination host H2. The layer-2 address of the destination host H2 is a response to the NHRP request. The above message is transferred from the router R5' to the router R1' through the routers R4', R3', and R2', tracing back the layer-3 communication path through which the message from the router R1' to the router R5' was transferred. When the router R1' receives the message from the router R5', the router R1' compares the layer-2-connected communication network indicated by the network information transferred by the message from the router R5', with the layer-2-connected communication network to which the interface R1-A' is connected, where the interface R1-A' is determined by the router R1' as an interface through which the router R1' received the above message from the host H1, and the layer-2-connected communication network to which the interface R1-A' is connected, is determined, as "PN1'", based on the interface-network correspondence information as indicated in FIG. 33A. In the case of FIG. 32, the two layer-2-connected communication networks to which the interfaces R1-A' and R5-B' are connected, are identical. Thus, the layer-2 reachability between the hosts H1 and H2 is determined by the router R1'. Then, the result of the comparison is contained in a message, for example, as indicated in FIG. 36C, to be sent to the host H1.

APPLICATION OF INVENTION TO THIRD EXAMPLE (FIGS. 37 TO 41C)

FIG. 37 illustrates the third example configuration of the network. In FIG. 37, references PN1", PN2", and PN3" each denote a layer-2-connected communication network (for example, an ATM network). The subnetworks LIS-1", LIS-2", and LIS-3" are logically defined over the layer-2-connected communication network PN1", the subnetworks LIS-4" and LIS-5" are logically defined over the layer-2-connected communication network PN2" and the subnetworks LIS-6" and LIS-7" are logically defined over the layer-2-connected communication network PN3". The router R1" connects the subnetworks LIS-1" and LIS-2", the router R2" connects the subnetworks LIS-2" and LIS-3", the router R3" connects the subnetworks LIS-3" and LIS-4", the router R4" connects the subnetworks LIS-4" and LIS-5", the router R5" connects the subnetworks LIS-5" and LIS-6" and the router R6" connects the subnetworks LIS-6" and LIS-7". The router R1" is connected to the subnetwork LIS-1" through the interface R1-A", and to the subnetwork LIS-2" through the interface R1-B". The router R2" is connected to the subnetwork LIS-2" through the interface R2-A", and to the subnetwork LIS-3" through the interface R2-B". The router R3" is connected to the subnetwork LIS-3" through the interface R3-A", and to the subnetwork LIS-4" through the interface R3-B". The router R4" is connected to the subnetwork LIS-4" through the interface R4-A", and to the subnetwork LIS-5" through the interface R4-B". The router R5" is connected to the subnetwork LIS-5" through the interface R5-A", and to the subnetwork LIS-6" through the interface R5-B". The router R6" is connected to the subnetwork LIS-6" through the interface R6-A", and to the subnetwork LIS-7" through the interface R6-B". The layer-2-connected communication networks PN1", PN2", and PN3" and routers R1", R2", R3", R4", R5", and R6" form a layer-3 communication network, and it is possible to perform communication between any hosts (or routers) connected to the layer-3 communication network of FIG. 32 by using the routers based on layer-3 addresses of the hosts (or routers).

The host H1 is connected to the subnetwork LIS-1", and the host H2 is connected to the subnetwork LIS-7". When the host H1 wishes to send a message to the host H2, the source host H1 generates and sends to the router R1" a message containing the IP address of the destination host H2 in its header portion. The router R1" forwards the message to the router R2" as a next hop, based on the IP address of the destination host H2 in the header of the message, and then the message is forwarded through the router R2", the router R3", the router R4", to the router R5" and the router R6". The router R6" obtains the layer-2 address of the destination host H2, based on the IP address of the destination host H2, and sends the message to the destination host H2 based on the layer-2 address of the destination host H2.

According to the present invention, the interface-network correspondence information are stored in advance for (or in) the routers R1", R2", R3", R4", R5", and R6". Example contents of the interface-network correspondence information in the routers R1", R2", R3", R4", R5", and R6", in the configuration of FIG. 37, are indicated in FIGS. 38A, 38B, 38C, 39A, and 39B, respectively. Namely, in the layer-3 communication network of FIG. 37, each of the interfaces of the routers is connected to one of the layer-2-connected communication networks PN1", PN2", and PN3".

When the host H1 wishes to obtain information on whether or not the destination host H2 is layer-2 reachable from the host H1, in accordance with the process according to the twenty-ninth aspect of the present invention, the source host H1 generates and sends from the host H1 to the router R1" a message for requesting the information on whether or not the destination host H2 is layer-2 reachable from the host H1. This message may also contain, or may be contained in, an NHRP request. When the router R1" receives the message from the source host H1, the router R1" determines the interface R1-A" as an interface through which the router R1" received the message, and then identifies the layer-2-connected communication network PN1" to which the interface R1-A" is connected, according to the interface-network correspondence information as indicated in FIG. 38A. Thus, the router R1" generates a message containing the network information indicating "PN1"", and sends the message to the router R2", where the router R2" is determined by the router R1", based on the IP address of the destination host H2, as a router to which the message from the router R1" is to be sent next. FIG. 40A illustrates example contents of this message sent from the router R1" to the router R2", when the process according to the twenty-ninth aspect of the present invention is executed on the configuration of FIG. 37, or when the apparatus according to the thirtieth aspect of the present invention is used in the configuration of FIG. 37. This message is then transferred through the routers R2", R3", R4", and R5", to the router R6". This message may also contain, or may be contained in, the NHRP request. When the router R6" receives the above message, the router R6" determines the interface R6-B" to be an output interface directed to the destination host H2, based on the IP address of the destination host H2. According to FIG. 39B, the interface R6-B" is connected to the layer-2-connected communication network PN3". Therefore, after comparing the layer-2-connected communication networks to which the interfaces R1-A" and R6-B" are connected, the router R6" determines that the host H2 is not layer-2 reachable from the source host H1. Then, a message containing the information on the determined layer-2 unreachability, is transferred from the router R6" to the router R1" tracing back the layer-3 communication path through which the above message from the router R1" to the router R6" was transferred. FIG. 40B illustrates example contents of a message transferred from the router R6" to the router R1", when the process according to the twenty-ninth aspect of the present invention is executed on the configuration of FIG. 37, or when the apparatus according to the thirtieth aspect of the present invention is used in the configuration of FIG. 37. The above message transferred from the router R6", is further transferred from the router R1" to the source host H1. Thus, the host H1 can recognize that the host H1 cannot establish a layer-2 communication path (shortcut path) from the host H1 to the host H2.

Otherwise, when the router R6" determines that the host H2 is not layer-2 reachable from the host H1, the router R6" may stop the operation without sending a response to the router R1" or to the host H1. The host H1 can recognize that the host H2 is not layer-2 reachable from the host H1, based on the fact that no response to the above request for the information on the layer-2 reachability reaches the host H1 in a predetermined time.

In addition, the layer-2 reachability between the hosts H1 and H2 can also be determined in accordance with the thirty-second aspect of the present invention. In this case, the host H1 also generates and sends to the router R1" a message containing the IP address of the destination host H2, for requesting the information on the layer-2 reachability.

When the host H1 wishes to obtain information on whether or not the destination host H2 is layer-2 reachable from the host H1, in accordance with the process according to the thirty-second aspect of the present invention. The host H1 also generates and sends from the host H1 to the router R1" a message for requesting the information on whether or not the destination host H2 is layer-2 reachable from the host H1. This message may also contain, or may be contained in, an NHRP request. When the router R1" receives the message from the source host H1, the router R1" generates and transfers through the routers R2", R3", R4", and R5" to the router R6", a message requesting information on layer-2 reachability. The message contains the IP address of the destination host H2 and the IP address of the router R1" as, for example, indicated in FIG. 41A. This message may also contain, or may be contained in, the NHRP request. When the router R6" receives the message, the router R6" determines the interface R6-B" to be an output interface directed to the destination host H2, based on the IP address of the destination host H2. Then, the router R6" identifies the layer-2-connected communication network to which the interface R6-B" is connected, as "PN3"", according to the interface-network correspondence information as indicated in FIG. 39B. Then, the router R6" generates and sends to the router R1" a message, for example, as indicated in FIG. 41B. Namely, the message sent from the router R6" to the router R1" contains the network information indicating the determined layer-2-connected communication network, "PN3"", and may also contain the layer-2 address of the destination host H2. The layer-2 address of the destination host H2 is a response to the NHRP request. The above message is transferred from the router R6" to the router R1" through the routers R5", R4", R3", and R2", tracing back the layer-3 communication path through which the message from the router R1" to the router R6" was transferred. When the router R1" receives the message from the router R6", the router R1" compares the layer-2-connected communication network indicated by the network information transferred by the message from the router R6", with the layer-2-connected communication network to which the interface R1-A" is connected, where the interface R1-A" is determined by the router R1" as an interface through which the router R1" received the above message from the host H1, and the layer-2-connected communication network to which the interface R1-A" is connected, is determined, as "PN1"", based on the interface-network correspondence information as indicated in FIG. 38A. In the case of FIG. 37, the two layer-2-connected communication networks to which the interfaces R1-A" and R6-B" are connected, are different. Thus, it is determined, by the router R1", that the host H2 is layer-2 unreachable from the host H1. Then, the result of the comparison is contained in a message, for example, as indicated in FIG. 41C, to be sent to the host H1.

Otherwise, when the router R1" determines that the host H2 is not layer-2 reachable from the host H1, the router R1" may stop the operation without sending a response to the host H1. The host H1 can recognize that the host H2 is not layer-2 reachable from the host H1, based on the fact that no response to the above request for the information on the layer-2 reachability reaches the host H1 in a predetermined time.

EMBODIMENT OF-THIRTY-FIFTH AND THIRTY-SIXTH ASPECTS OF INVENTION (FIGS. 42 TO 46)

Figure 42:
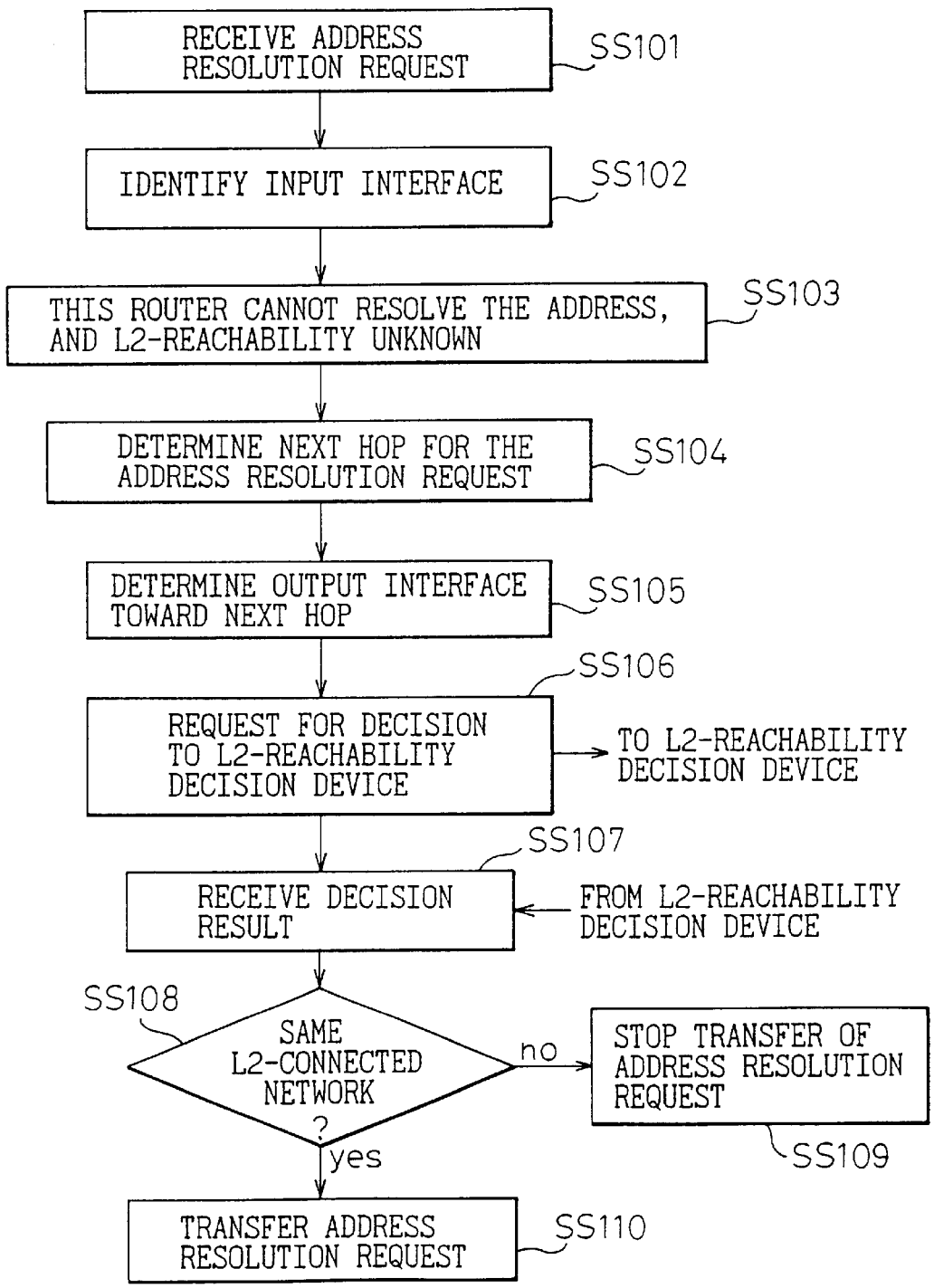
FIG. 42 is a diagram illustrating an example sequence of processing a layer-2-reachability determination request together with an address resolution request.

FIG. 42 illustrates an example sequence of processing a layer-2-reachability determination request together with an address resolution (NHRP) request, according to the thirty-fifth aspect of the present invention.

In this embodiment, a message containing the IP address of the destination host, is transferred from a source host through routers on a layer-3 communication path, in accordance with the thirty-fifth aspect of the present invention. For example, in the case of FIG. 24, the message is transferred from the source host H1 through the routers R1 and R2 to the router R3. It is assumed that this message is contained in (or contains) the aforementioned NHRP request. The sequence of FIG. 42 is a sequence to be performed in each of the router on the layer-3 communication path except for the router which is located nearest the destination host. In the case of the router located nearest the destination host, the step SS110 in FIG. 42 should be replaced with a step of transferring to the source host a message containing the information on the layer-2 reachability (and an NHRP response when the NHRP response is obtained during the transfer to the router).

When, in step SS101 of FIG. 42, a router (for example, one of the routers in the constructions of FIGS. 26, 32, and 37) receives the above message containing the address resolution request and the request for the information on the layer-2 reachability, the router then identifies the input interface through which the router received the message, in step SS102. In step SS103, the router determines that neither the address resolution nor the determination of the layer-2 reachability is performed. In steps SS104 and SS105, the router determines a next hop (i.e., a router or a host to which the message is to be sent next), and in particular, an output interface to the next hop. In step SS106, the router sends a request for decision, to a (layer-2-reachability) decision device, where the decision device in this embodiment has at least the function of the aforementioned comparing unit in the apparatus according to the thirty-sixth aspect of the present invention, as described in the "SUMMARY OF THE INVENTION", paragraph (36). In addition, the decision device may contain the interface-network correspondence information storing unit according to the aforementioned additional feature (36-1), as described in the "SUMMARY OF THE INVENTION", paragraph (36-1). Further, the decision device may contain the interface-network correspondence information setting unit according to the aforementioned additional feature (36-2), as described in the "SUMMARY OF THE INVENTION", paragraph (36-2). Namely, the decision device compares a layer-2-connected communication network to which the input interface (as determined in step SS102) is connected, with a layer-2-connected communication network to which the output interface (as determined in step SS105) is connected, to determine whether or not these layer-2-connected communication networks are identical. The router receives the result of the decision device in step SS107. When the result indicates that the layer-2-connected communication networks are identical, the message received in step SS101 is transferred to the next hop (router or host). When the result indicates that the layer-2-connected communication networks are not identical, the transfer of the message received in step SS101 is stopped at the router. The source host can recognize that the destination host is not layer-2 reachable from the source host, based on the fact that no response to the above request for the information on the layer-2 reachability reaches the source host in a predetermined time.

Figure 43:
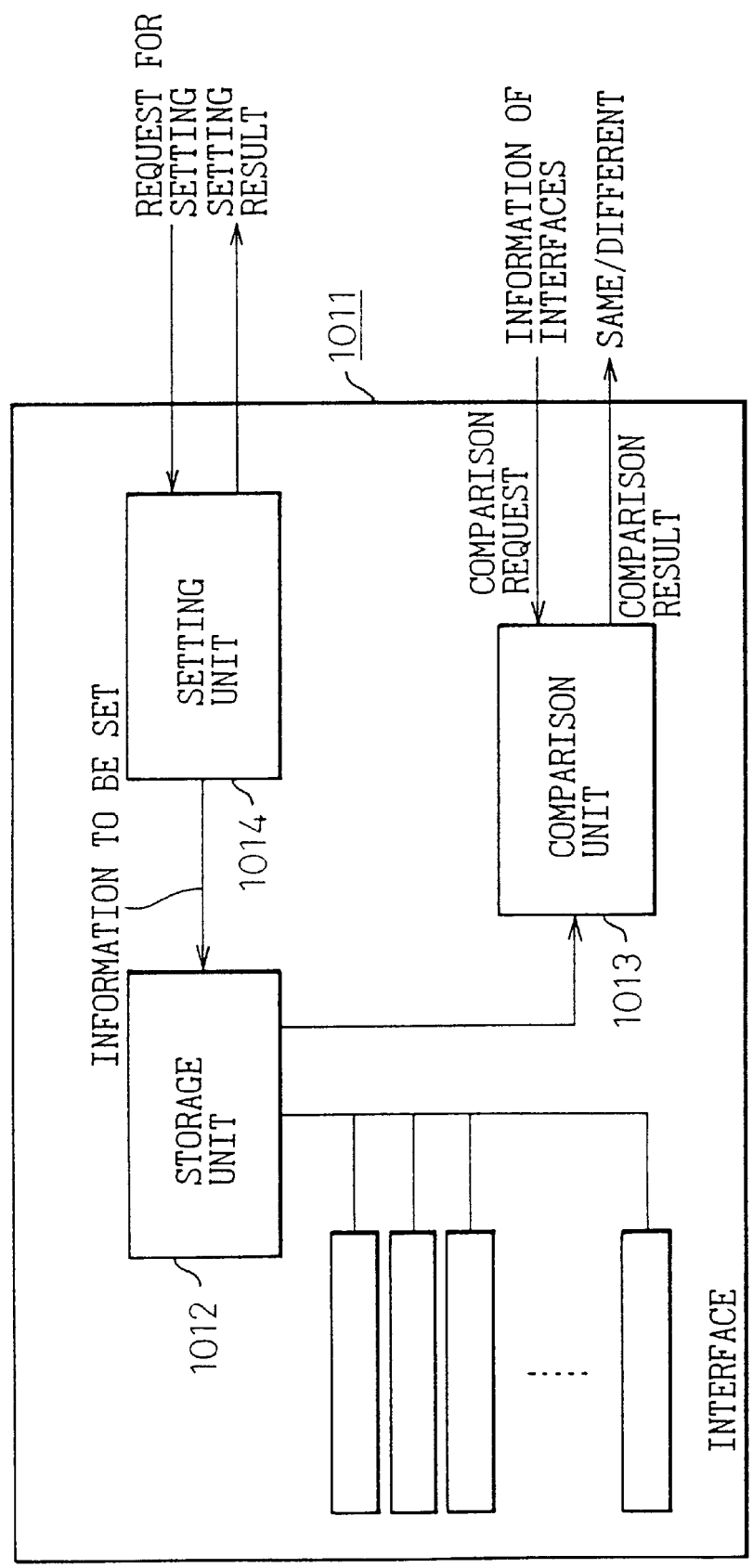
FIG. 43 is a diagram illustrating an example construction of a layer-2-reachability decision device which is used in the sequence of FIG. 42.

FIG. 43 illustrates an example construction of the aforementioned (layer-2-reachability) decision device which is used in the sequence of FIG. 42. In reference numeral 1012 denotes an interface-network correspondence information storage unit for storing the interface-network correspondence information for a plurality of interfaces, 1013 denotes a comparison unit, and 1014 denotes an interface-network correspondence information setting unit.

When the interface-network correspondence information setting unit 1014 receives a request for setting the interface-network correspondence information for a portion or all of the interfaces which the router comprises, the interface-network correspondence information setting unit 1014 stores the interface-network correspondence information in the interface-network correspondence information storing unit 1012. The contents of the interface-network correspondence information storing unit 1012 are, for example, as indicated in FIGS. 28A, 28B, 28C, 33A, 33B, 33C, 34A, 34B, 38A, 38B, 38C, 39A, and 39B. When the comparison unit 1013 receives a comparison request containing information on the input interface and the output interface as mentioned in the sequence of FIG. 42, the comparison unit 1013 refers to the interface-network correspondence information storing unit 1012 for obtaining information on the layer-2-connected communication networks corresponding to the input interface and the output interface, and compares the layer-2-connected communication networks to determine whether or not these layer-2-connected communication networks are identical, and output the comparison result.

FIG. 44A illustrates an example content of a message transferred from the host H1 to the router R1, when the process according to the thirty-fifth aspect of the present invention is executed on the configuration of FIG. 26, or when the apparatus according to the thirty-sixth aspect of the present invention is used in the configuration of FIG. 26. Namely, when a message for requesting information on the layer-2 reachability (and for the address resolution of the destination host H2), as indicated in FIG. 44A, is sent from the source host H1 to the router R1 in FIG. 26, the operations of FIG. 42 are performed at each of the routers R1, R2, and R3, and the comparison results at all of the routers R1, R2, and R3, are "identical" since all of the interfaces of the routers in FIG. 26 are connected to the same layer-2-connected communication network PN. Therefore, the router R3 generates and sends to the host H1 a message, for example, as indicated in FIG. 44B. Namely, the message contains that information on the layer-2 reachability, as "L2-reachable", (and the layer-2 address of the destination host H2 in response to the above address resolution request).

However, when the thirty-fifth aspect of the present invention is applied to the configuration of FIG. 32, the result is different from the results of the aforementioned twenty-ninth and thirty-second aspects of the present invention, as explained below.

When a message for requesting information on the layer-2 reachability (and for the address resolution of the destination host H2), as indicated in FIG. 44A, is sent from the source host H1 to the router R1' in FIG. 32, the operations of FIG. 42 are first performed at the router R1. Since both the input interface R1-A' and the output interface R1-B' are connected to the same layer-2-connected communication network PN1' in FIG. 32, the message is then transferred to the router R2' in accordance with step SS110 in FIG. 42. In the router R2', the input interface R2-A' is connected to the layer-2-connected communication network PN1', and the output interface R2-B' is connected to the layer-2-connected communication network PN2'. Therefore, the router R2' does not forward the message, nor send a response to the source host H1, in accordance with SS109 in FIG. 42.

However, as a variation of the sequence of FIG. 42, the router R2' may send a response indicating the layer-2 unreachability to the router R1' (and to the host H1). FIGS. 45 and 46 illustrate two examples of a message transferred from the router R2' to the router R1', when the process according to the thirty-fifth aspect of the present invention is executed on the configuration of FIG. 32, or when the apparatus according to the thirty-sixth aspect of the present invention is used in the configuration of FIG. 32. Namely, the layer-2 address of the destination host H2 may or may not be contained in the message to the host H1.

As explained before about the applications of the twenty-ninth and thirty-second aspects of the present invention to the configuration of FIG. 32, the host H2 is layer-2 reachable from the host H1 in the configuration of FIG. 32. However, according to the thirty-fifth aspect of the present invention, the correct result is not obtained in the configuration of FIG. 32, in which the layer-2 communication path from the source host H1 to the destination host H2 passes, on the way, through another layer-2-connected communication network PN2', which is different from the layer-2-connected communication network PN1' to which the two hosts are connected. This is an imperfection of the thirty-fifth aspect of the present invention. Nevertheless, the thirty-fifth aspect of the present invention may be advantageous due to its simplicity of the sequence.

When the thirty-fifth aspect of the present invention is applied to the configuration of FIG. 37, the operations are as follows.

When a message for requesting information on the layer-2 reachability (and for the address resolution of the destination host H2), as indicated in FIG. 44A, is sent from the source host H1 to the router R1' in FIG. 32, the operations of FIG. 42 are first performed at the router R1. Since both the input interface R1-A' and the output interface R1-B' are connected to the same layer-2-connected communication network PN1' in FIG. 32, the message is then transferred to the router R2' in accordance with step SS110 in FIG. 42. Also, in the router R2', both the input interface R2-A' and the output interface R2-B' are connected to the same layer-2-connected communication network PN1', the message is then transferred to the router R3' in accordance with step SS110 in FIG. 42. However, in the router R3', the input interface R3-A' is connected to the layer-2-connected communication network PN1', and the output interface R3-B' is connected to the layer-2-connected communication network PN2'. Therefore, the router R3' does not forward the message, nor send a response to the source host H1, in accordance with SS109 in FIG. 42.

However, also, in the case of FIG. 37, the router R2' may send a response indicating the layer-2 unreachability to the router R1' (and to the host H1), as indicated in FIGS. 45 and 46.

APPLICATIONS OF THE PRESENT INVENTION TO SYSTEMS OTHER THAN NHRP

The present invention can be applied to various communication systems other than the NHRP system. The following are examples of such systems.

(1) RISP (Receiver Initiated Shortcut Path)

The various aspects of the present invention can be applied to a system based on RISP, which is a protocol proposed to IETF by Fujitsu Laboratories Ltd. in March 1997 (draft-ogawa-receiver-shortcut-path-00.txt). In the RISP system, the address resolution protocol is unnecessary when establishing a data-link-layer shortcut path between LISs. In the RISP system, a request for a shortcut path, instead of the request for address resolution, is transferred between LISs, to reduce the cost by eliminating address resolution servers. In the RISP system, the request for a shortcut path, is transferred through LISs until the request reaches a destination host. When the destination host receives the request, the destination host establishes a shortcut path from the destination host to the source host.

In particular, in the RISP system, the message of the request for the information on the layer-2 reachability, and other messagees, according to the twenty-fourth to thirty-seventh aspects of the present invention, can be transferred through the path through which the above request for a shortcut path is transferred. Therefore, layer-2 reachability to a destination host can also be determined according to the twenty-fourth to thirty-seventh aspects of the present invention.

(2) CSR (Cell Switch Router)

The CSR is a kind of router, manufactured by the Toshiba Corporation, which has the functions of both an ATM switch and an router. The CSR functions as a network-layer router relaying a packet between LISs, at the initial stage of IP traffic, and then changes itself to a data-link-layer switch when IP traffic continues for a long time. The present invention can also be applied to a system using the CSR.

In particular, when specific IP traffic is to be changed from layer 3 to layer 2, the layer-2 reachability to a destination host is needed to be known, and the layer-2 reachability can be determined according to the twenty-fourth to thirty-seventh aspects of the present invention, by identifying the interfaces through which the IP traffic is input and output, and layer-2-connected communication networks to which the interfaces are connected.

(3) IPswitch

The IPswitch is a kind of layer-3 switch, manufactured by Epsilon Networks, which functions in a way similar to the above CSR. The various aspects of the present invention can also be applied to a system using the IPswitch.

(4) FastIP

The FastIP is a protocol, proposed by 3Com Corporation, for shortcutting routers by using an Ether switch. In the FastIP system, a kind of address resolution request, called dNHRP (distributed NHRP), is transferred to a router. When a source host receives a response to the request, the source host establishes a shortcut path to the destination host. The basic procedure of the FastIP is the same as the NHRP procedure. Therefore, the various aspects of the present invention can also be applied to the FastIP system.

In addition, the disclosures in the Japanese patent applications, Nos. 9-231674 and 9-231675 are incorporated in this specification by reference.

What is claimed is:

1. A process for determining layer-2 reachability between first and second communication apparatuses each connected to a layer-3 communication network comprised of at least one router and a plurality of subnetworks logically defined over at least one layer-2-connected communication network; said process comprising the steps of:

(a) determining a layer-3 communication path connecting said first communication apparatus to said second communication apparatus, through a portion or all of said at least one router and said plurality of subnetworks, based on a layer-3 address of the second communication apparatus, where a first router is connected to said first communication apparatus through a first interface and a first subnetwork among said plurality of subnetworks on the determined layer-3 communication path, and a second router is connected to the second communication apparatus through a second interface and a second subnetwork among said plurality of subnetworks on the determined layer-3 communication path, wherein at least said first and second subnetworks are logically defined over said at least one layer-2 connected communication network;

(b) identifying a first layer-2 communication network among said at least one layer-2-connected communication network to which said first interface is connected based on interface-network correspondence information associating said first interface to said first layer-2 communication network;

(c) identifying a second layer-2 communication network among said at least one layer-2-connected communication network to which said second interface is connected based on interface-network correspondence information associating said second interface to said second layer-2 communication network; and (d) facilitating layer-2 communications between said first and second communication apparatuses when said identified first and second layer-2 communication networks are identical, wherein the identical layer-2 communication network logically defines at least said first and second subnetworks.

2. A process according to claim 1, wherein said layer-3 communication network comprises at least one storage unit for storing at least one piece of the interface-network correspondence information indicating one of said at least one layer-2-connected communication network to which each of said first and second interfaces is connected.

3. A process according to claim 1, wherein said layer-3 communication network comprises a decision device which performs the operation of step (d) and said process further comprises the sub-steps of:

(e) transmitting a result of the operation of step (b), from said first router to said decision device, and (f) transmitting a result of the operation of step (c), from said second router to said decision device.

4. A process according to claim 1, wherein said second router comprises a decision device which performs the operation of step (d) and said process further comprises the sub-steps of:

(e) transmitting a result of the operation of step (b), from said first router to said second router, and (f) transmitting a result of the operation of step (d), from said second router to said first router.

5. A process according to claim 1, wherein said first router comprises a decision device which performs the operation of step (d) and said process further comprises the sub-step of:

(e) transmitting a result of the operation of step (c), from said second router to said first router.

6. An apparatus for determining layer-2 reachability between a first and second communication apparatus, each connected to a layer-3 communication network comprised of at least one router and a plurality of subnetworks logically defined over at least one layer-2-connected communication network, wherein a layer-3 communication path passing through a portion or all of said at least one router can be determined by said portion or all of said at least one router based on a layer-3 address of said second communication apparatus; said apparatus comprising:

a first identifying unit identifying a first layer-2 communication network among said at least one layer-2-connected communication network to which a first interface of a first router among said portion or all of said at least one router is connected based on interface-network correspondence information associating the first interface to said first layer-2 communication network, where said first router is connected to the first communication apparatus through said first interface and a first subnetwork among said plurality of subnetworks on said layer-3 communication path connecting said first and second communication apparatuses;

a second identifying unit identifying a second layer-2 communication network among said at least one layer-2-connected communication network to which a second interface of a second router among said portion or all of said at least one router is connected based on interface-network correspondence information associating the second interface to said second layer-2 communication network, where said second router is connected to the second communication apparatus through said second interface and a second subnetwork among said plurality of subnetworks on said layer-3 communication path connecting said first and second communication apparatuses;

a determining unit determining whether or not said first and second layer-2 communication networks are identical, wherein layer-2 communications are facilitated between said first and second communication apparatuses when said first and second layer-2 communication networks are identical, with the identical layer-2 communications network logically defining at least said first and second subnetworks.

7. An apparatus according to claim 6, wherein one of said layer-3 communication network and said apparatus comprises at least one interface-network correspondence information storing unit for storing at least one piece of interface-network correspondence information indicating said first and second layer-2 communication networks among said at least one layer-2-connected communication network corresponding to said first and second interfaces, respectively.

8. An apparatus according to claim 7, wherein one of said layer-3 communication network and said apparatus comprises an interface-network correspondence setting unit for setting said at least one piece of interface-network correspondence information in said at least one interface-network correspondence information storing unit.

9. A product for use with an apparatus for determining layer-2 reachability between first and second communication apparatuses each connected to a layer-3 communication network comprised of at least one router and a plurality of subnetworks logically defined over at least one layer-2-connected communication network, and a layer-3 communication path passing through a portion or all of said at least one router can be determined by said portion or all of said at least one router based on a layer-3 address of said second communication apparatus, said product, when used with said apparatus, is able to output control information which directs the apparatus to comprise:

a first identifying unit identifying a first layer-2 communication network among said at least one layer-2-connected communication network to which a first interface of a first router among said portion or all of said at least one router is connected based on information associating the first interface to said first layer-2 communication network, where said first router is connected to the first communication apparatus through said first interface and a first subnetwork among said plurality of subnetworks on said layer-3 communication path connecting said first and second communication apparatuses;

a second identifying unit identifying a second layer-2 communication network among said at least one layer-2-connected communication network to which a second interface of a second router among said portion or all of said at least one router is connected based on information associating the second interface to said second layer-2 communication network, where said second router is connected to the second communication apparatus through said second interface and a second subnetwork among said plurality of subnetworks on said layer-3 communication path connecting said first and second communication apparatuses;

a determining unit determining whether or not said first and second layer-2 communication networks are identical, wherein layer-2 communications are facilitated between said first and second communication apparatuses when said first and second layer-2 communication networks are identical, with the identical layer-2 communications network logically defining at least said first and second subnetworks.

10. A product for use as per claim 9, wherein said product, when used with said apparatus, is able to output control information which directs said apparatus to store at least one piece of interface-network correspondence information associating the first interface or second interface with a layer-2 communication network.

11. A product for use as per claim 10, wherein said at least one piece of interface-network correspondence information is stored in a device that is accessible over said layer-3 communication network.

12. An apparatus for determining layer-2 reachability between first and second communication apparatuses each connected to a layer-3 communication network comprised of at least one router and a plurality of subnetworks logically defined over at least one layer-2-connected communication network, and a layer-3 communication path passing through a portion or all of said at least one router can be determined by said portion or all of said at least one router based on a layer-3 address of said second communication apparatus; said apparatus comprising:

a first interface identifying unit for identifying a first interface of a first router among said portion or all of said at least one router, where said first router is connected to said first communication apparatus through said first interface and a first subnetwork among said plurality of subnetworks on said layer-3 communication path connecting said first and second communication apparatuses;

a second interface identifying unit for identifying a second interface of a second router among said portion or all of said at least one router, where said second router is connected to the second communication apparatus through said second interface and a second subnetwork among said plurality of subnetworks on said layer-3 communication path connecting said first and second communication apparatuses;

a first network identifying unit for identifying a first layer-2 communication network to which said first interface is connected based on information associating the first interface to said first layer-2 communication network;

a second network identifying unit for identifying a second layer-2 communication network among said at least one layer-2-connected communication network to which said second interface is connected based on information associating the second interface to said second layer-2 communication network; and a determining unit determining whether or not said first and second layer-2 communication networks are identical, wherein layer-2 communications are facilitated between said first and second communication apparatuses when said first and second layer-2 communication networks are identical, with the identical layer-2 communications network logically defining at least said first and second subnetworks.

13. An apparatus according to claim 12, wherein one of said layer-3 communication network and said apparatus comprises at least one interface-network correspondence information storing unit for storing at least one piece of interface-network correspondence information indicating said first and second layer-2 communication network among said at least one layer-2-connected communication network corresponding to said first and second interfaces, respectively.

14. An apparatus according to claim 12, wherein one of said layer-3 communication network and said apparatus comprises an interface-network correspondence setting unit for setting said at least one piece of interface-network correspondence information in said at least one interface-network correspondence information storing unit.

15. A product for use with an apparatus for determining layer-2 reachability between first and second communication apparatuses each connected to a layer-3 communication network comprised of at least one router and a plurality of subnetworks logically defined over at least one layer-2-connected communication network, and a layer-3 communication path passing through a portion or all of said at least one router can be determined by said portion or all of said at least one router based on a layer-3 address of said second communication apparatus, said product, when used with said apparatus, is able to output control information which directs the apparatus to comprise:

a first interface identifying unit for identifying a first interface of a first router among said portion or all of said at least one router, where said first router is connected to the first communication apparatus through said first interface and a first subnetwork among said plurality of subnetworks on said layer-3 communication path connecting said first and second communication apparatuses;

a second interface identifying unit for identifying a second interface of a second router among said portion or all of said at least one router, where said second router is connected to the second communication apparatus through said second interface and a second subnetwork among said plurality of subnetworks on said layer-3 communication path connecting said first and second communication apparatuses;

a first network identifying unit for identifying a first layer-2 communication network among said at least one layer-2-connected communication network which said first interface is connected to based on information associating the first interface to said first layer-2 communication network;

a second network identifying unit for identifying a second layer-2 communication network among said at least one layer-2-connected communication network which said second interface is connected to based on information associating the second interface to said second layer-2 communication network;

a determining unit determining whether or not said first and second layer-2 communication networks are identical, wherein layer-2 communications are facilitated between said first and second communication apparatuses when said first and second layer-2 communication networks are identical, with the identical layer-2 communications network logically defining at least said first and second subnetworks.

16. A product for use as per claim 15, wherein said product, when used with said apparatus, is able to output control information which directs said apparatus to store at least one piece of interface-network correspondence information associating the first interface or second interface with a layer-2 communication network.

17. A product for use as per claim 16, wherein said at least one piece of interface-network correspondence information is stored in a device that is accessible over said layer-3 communication network.

18. A process for determining layer-2 reachability between first and second communication apparatuses each connected to a layer-3 communication network comprised of at least one router and a plurality of subnetworks logically defined over at least one layer-2-connected communication network; said process comprising the steps of:

(a) transmitting a first message containing a layer-3 address of said second communication apparatus, from said first communication apparatus to a first router among said at least one router, where said first communication apparatus and said first router are connected to a first subnetwork among said plurality of subnetworks;

(b) receiving, at said first router, said first message through a first interface;

(c) identifying a first layer-2 communication network among said at least one layer-2-connected communication network to which said first interface is connected based on information associating the first interface to said first layer-2 communication network;

(d) transmitting a second message containing said layer-3 address of said second communication apparatus and network information indicating said first layer-2 communication network among said at least one layer-2-connected communication network, from said first router to a second router among said at least one router, on a layer-3 communication path passing through a portion or all of said at least one router and being determined by said portion or all of said at least one router based on said layer-3 address of said second communication apparatus, where said second router is connected to the second communication apparatus through a second interface of the second router and a second subnetwork among said plurality of subnetwork on said layer-3 communication path;

(e) receiving the second message at the second router;

(f) identifying a second layer-2 communication network among said at least one layer-2-connected communication network to which said second interface is connected based on information associating said second interface to said second layer-2 communication network; and (g) facilitating layer-2 communications between said first and second communication apparatuses when said identified first and second layer-2 communication networks are identical, wherein the identical layer-2 communication network logically defines at least said first and second subnetworks.

19. A process according to claim 18, wherein
said first router comprises a storage for storing a first piece of interface-network correspondence information indicating said first layer-2 communication network among said at least one layer-2-connected communication network to which said first interface is connected, and said second router comprises a storage for storing a second piece of interface-network correspondence information indicating said second layer-2 communication network to which said second interface is connected, and the operations in steps (c) and (f) are performed based on said first and second pieces of interface-network correspondence information, respectively.

20. An apparatus, for use with each of at least one router provided in a layer-3 communication network comprised of a plurality of subnetworks logically defined over at least one layer-2-connected communication network, and for determining layer-2 reachability between first and second communication apparatuses each connected to said layer-3 communication network, where a layer-3 communication path passing through a portion or all of said at least one router can be determined by said portion or all of said at least one router based on a layer-3 address of said second communication apparatus; said apparatus comprising:

a network identifying unit for identifying a first layer-2 communication network among said at least one layer-2-connected communication network to which a first interface of said each of said at least one router is connected based on information associating the first interface to said first layer-2 communication network, in a first case wherein said each of said at least one router is connected to said first communication apparatus through said first interface and a first subnetwork among said plurality of subnetworks, said each of said at least one router is a first router among said portion or all of said at least one router, and said first interface is on said layer-3 communication path connecting said first and second communication apparatuses, said network identifying unit further identifying a second layer-2 communication network among said at least one layer-2-connected communication network to which a second interface of said each of said at least one router is connected based on information associating the second interface to said second layer-2 communication network, in a second case wherein said each of said at least one router is connected to said second communication apparatus through said second interface and a second subnetwork among said plurality of subnetworks, said each of said at least one router is a second router among said portion or all of said at least one router, and said second interface is on said layer-3 communication path connecting said first and second communication apparatuses;

a transmitting unit for transmitting network information indicating said first layer-2 communication network among said at least one layer-2-connected communication network, from said first router to said second router, in said first case;

a receiving unit for receiving said network information transmitted from said first router, in said second case; and a determining unit determining, in said second case, whether or not said first and second layer-2 communication networks are identical, wherein layer-2 communications are facilitated between said first and second communication apparatuses when said first and second layer-2 communication networks are identical, with the identical layer-2 communications network logically defining at least said first and second subnetworks.

21. An apparatus according to claim 20, wherein one of said each of said at least one router and said apparatus comprises at least one interface-network correspondence information storing unit for storing interface-network correspondence information indicating a layer-2-connected communication network associated with each interface of a router, and the operations of said network identifying units are performed based on said stored interface-network correspondence information.

22. An apparatus according to claim 21, wherein one of said each of said at least one router and said apparatus comprises an interface-network correspondence setting unit for setting said at least one piece of interface-network correspondence information in said at least one interface-network correspondence information storing unit.

23. A product for use with an apparatus, for use with each of at least one router provided in a layer-3 communication network comprised of a plurality of subnetworks logically defined over at least one layer-2-connected communication network, and for determining layer-2 reachability between first and second communication apparatuses each connected to said layer-3 communication network, where a layer-3 communication path passing through a portion or all of said at least one router can be determined by said portion or all of said at least one router based on a layer-3 address of said second communication apparatus, said product, when used with said apparatus, is able to output control information which directs the apparatus to comprise:

a network identifying unit for identifying a first layer-2 communication network among said at least one layer-2-connected communication network to which a first interface of said each of said at least one router is connected based on interface-network correspondence information associating the first interface to said first layer-2 communication network, in a first case wherein said each of said at least one router is connected to said first communication apparatus through said first interface and a first subnetwork among said plurality of subnetworks, said each of said at least one router is a first router among said portion or all of said at least one router, and said first interface is on said layer-3 communication path, said network identifying unit further identifying a second layer-2 communication network among said at least one layer-2-connected communication network to which a second interface of said each of said at least one router is connected based on interface-network correspondence information associating the second interface to said second layer-2 communication network, in a second case wherein said each of said at least one router is connected to said second communication apparatus through said second interface and a second subnetwork among said plurality of subnetworks, each of said at least one router is a second router among said portion or all of said at least one router, and said second interface is on said layer-3 communication path connecting said first and second communication apparatuses;

a transmitting unit for transmitting network information indicating said first layer-2 communication network among said at least one layer-2-connected communication network, from said first router to said second router, in said first case;

a receiving unit for receiving said network information transmitted from said first router, in said second case; and a determining unit determining, in a second case, whether or not said first and second layer-2 communication networks are identical, wherein layer-2 communications are facilitated between said first and second communication apparatuses when said first and second layer-2 communication networks are identical, with the identical layer-2 communications network logically defining at least said first and second subnetworks.

24. A product for use as per claim 23, wherein said product, when used with said apparatus, is able to output control information which directs said apparatus to store at least one piece of interface-network correspondence information associating the first interface or second interface with a layer-2 communication network.

25. A product for use as per claim 24, wherein said at least one piece of interface-network correspondence information is stored in a device that is accessible over said layer-3 communication network.

26. A process for determining layer-2 reachability between first and second communication apparatuses each connected to a layer-3 communication network comprised of at least one router and a plurality of subnetworks logically defined over at least one layer-2-connected communication network; said process comprising the steps of:

(a) transmitting a first message containing a layer-3 address of said second communication apparatus, from said first communication apparatus to a first router among said at least one router, where said first communication apparatus and said first router are connected to a first subnetwork among said plurality of subnetworks;

(b) receiving, at said first router, said first message through a first interface;

(c) identifying a first layer-2 communication network among said at least one layer-2-connected communication network which said first interface is connected based on interface-network correspondence information associating the first interface to said first layer-2 communication network;

(d) transmitting a second message containing said layer-3 address of said second communication apparatus, from said first router to a second router among said at least one router, on a layer-3 communication path passing through a portion or all of said at least one router and being determined by said portion or all of said at least one router based on said layer-3 address of said second communication apparatus, where said second router is connected to said second communication apparatus through a second interface of the second router and a second subnetwork among said plurality of subnetworks on said layer-3 communication path connecting said first and second communication apparatuses;

(e) receiving, at said second router, said second message transmitted from said first router through said layer-3 communication path;

(f) identifying a second layer-2 communication network among said at least one layer-2-connected communication network to which said second interface is connected based on interface-network correspondence information associating the second interface to said second layer-2 communication network;

(g) transmitting a third message containing said second layer-2 communication among said at least one layer-2-connected communication network, from said second router to said first router through said layer-3 communication path;

(h) receiving, at said first router, said third message transmitted from said second router through said layer-3 communication path; and (i) facilitating Iayer-2 communications between said first and second communication apparatuses when said identified first and second layer-2 communication networks are identical, wherein the identical layer-2 communication network logically defines at least said first and second subnetworks.

27. A process as per claim 26, wherein said process further comprises the step of storing at least one piece of interface-network correspondence information associating the first interface or second interface with a layer-2 communication network.

28. A process as per claim 27, wherein said at least one piece of interface-network correspondence information is stored in a device that is accessible over said layer-3 communication network.

29. A process according to claim 26, wherein said first router comprises a storage for storing a first piece of interface-network correspondence information indicating said first layer-2 communication network aming said at least one layer-2-connected communication network to which said first interface is connected, and said second router comprises a storage for storing a second piece of interface-network correspondence information indicating said second layer-2-connected communication network to which said second interface is connected, and the operations in steps (c) and (f) are performed based on said first and second pieces of interface-network correspondence information, respectively.

30. An apparatus, for use with each of at least one router provided in a layer-3 communication network comprised of a plurality of subnetworks logically defined over at least one layer-2-connected communication network, and for determining layer-2 reachability between first and second communication apparatuses each connected to said layer-3 communication network, where a layer-3 communication path passing through a portion or all of said at least one router can be determined by said portion or all of said at least one router based on a layer-3 address of said second communication apparatus; said apparatus comprising:

a network identifying unit for identifying a first layer-2 communication network among said at least one layer-2-connected communication network to which a first interface of said each of said at least one router is connected based on interface-network correspondence information associating the first interface to said first layer-2 communication network, in a first case wherein said each of said at least one router is connected to said first communication apparatus through said first interface and a first subnetwork among said plurality of subnetworks, said each of said at least one router is a first router among said portion or all of said at least one router, and said first interface is on said layer-3 communication path, said network identifying unit further identifying a second layer-2 communication network among said at least one layer-2-connected communication network to which a second interface of said each of said at least one router is connected based on interface-network correspondence information associating the second interface to said second layer-2 communication network, in a second case wherein said each of said at least one router is connected to said second communication apparatus through said second interface and a second subnetwork among said plurality of subnetworks, said each of said at least one router is a second router among said portion or all of said at least one router, and said second interface is on said layer-3 communication path connecting said first and second communication apparatuses;

a transmitting unit for transmitting network information indicating said second layer-2 communication network among said at least one layer-2-connected communication network, from said second router to said first router, in said second case;

a receiving unit for receiving said network information transmitted from said second router, in said first case; and a determining unit, in said first case, determining whether or not said first and second layer-2 communication networks are identical, wherein layer-2 communications are facilitated between said first and second communication apparatuses when said first and second layer-2 communication networks are identical, with the identical layer-2 communications network logically defining at least said first and second subnetworks.

31. An apparatus according to claim 30, wherein one of said each of said at least one router and said apparatus comprises at least one interface-network correspondence information storing unit for storing at least one piece of interface-network correspondence information indicating one of said at least one layer-2-connected communication network corresponding to each of at least one interface which said each of said at least one router comprises, wherein the operations of said network identifying units are performed based on said at least one piece of interface-network correspondence information.

32. An apparatus according to claim 31, wherein one of said each of said at least one router and said apparatus comprises an interface-network correspondence setting unit for setting said at least one piece of interface-network correspondence information in said at least one interface-network correspondence information storing unit.

33. A product for use with an apparatus, for use with each of at least one router provided in a layer-3 communication network comprised of a plurality of subnetworks logically defined over at least one layer-2-connected communication network, and for determining layer-2 reachability between first and second communication apparatuses each connected to said layer-3 communication network, where a layer-3 communication path passing through a portion or all of said at least one router can be determined by said portion or all of said at least one router based on a layer-3 address of said second communication apparatus, said product, when used with said apparatus, is able to output control information which directs the apparatus to comprise:

a network identifying unit for identifying a first layer-2 communication network among said at least one layer-2-connected communication network to which a first interface of said each of said at least one router is connected based on interface-network correspondence information associating the first interface to said first layer-2 communication network, in a first case wherein said each of said at least one router is connected to said first communication apparatus through said first interface and a first subnetwork among said plurality of subnetworks, said each of said at least one router is a first router among said portion or all of said at least one router, and said first interface is on said layer-3 communication path, said network identifying unit further identifying a second layer-2 communication network among said at least one layer-2-connected communication network to which a second interface of said each of said at least one router is connected based on interface-network correspondence information associating the second interface to said second layer-2 communication network, in a second case wherein said each of said at least one router is connected to said second communication apparatus through said second interface and a second one of said plurality of subnetworks, said each of said at least one router is a second router among said portion or all of said at least one router, and said second interface is on said layer-3 communication path connecting said first and second communication apparatuses;

a transmitting unit for transmitting network information indicating said second layer-2 communication network among said at least one layer-2-connected communication network, from said second router to said first router, in said second case;

a receiving unit for receiving said network information transmitted from said second router, in said first case; and a determining unit, in said first case, determining whether or not said first and second layer-2 communication networks are identical, wherein layer-2 communications are facilitated between said first and second communication apparatuses when said first and second layer-2 communication networks are identical, with the identical layer-2 communications network logically defining at least said first and second subnetworks.

34. A product for use as per claim 33, wherein said product, when used with said apparatus, is able to output control information which directs said apparatus to store at least one piece of interface-network correspondence information associating the first interface or second interface with a layer-2 communication network.

35. A product for use as per claim 34, wherein said at least one piece of interface-network correspondence information is stored in a device that is accessible over said layer-3 communication network.

36. A process for determining, during transfer of a message, layer-2 reachability between first and second communication apparatuses each connected to a layer-3 communication network comprised of at least one router and a plurality of subnetworks logically defined over at least one layer-2-connected communication network, where said message contains a layer-3 address of said second communication apparatus, said transfer of the message is performed on a layer-3 communication path passing through a portion or all of said at least one router from the first communication apparatus to the second communication apparatus, and said layer-3 communication path is determined based on said layer-3 address of the second communication apparatus; said process comprising the steps of:

(a) identifying, at each of said portion or all of said at least one router, a first layer-2 communication network among said at least one layer-2-connected communication network to which a first interface of said each of said portion or all of said at least one router is connected based on interface-network correspondence information associating the first interface to said first layer-2 communication network, and a second layer-2 communication network among said at least one layer-2-connected communication network to which a second interface of said each of said portion or all of said at least one router is connected based on interface-network correspondence information associating the second interface to said second layer-2 communication network, where said message is received through said first interface, and the second interface is determined to be an output interface for the message, based on said layer-3 address of the second communication apparatus;

(b) comparing, at said each of said portion or all of said at least one router, said first and second layer-2 communication networks among said at least one layer-2-connected communication network, to determine whether or not first and second layer-2 communication network among said at least one layer-2-connected communication network are identical;

(c) determining that said first and second communication apparatuses cannot communicate with each other by using a layer-2 communication path only, and stopping the transfer of the message, when said first and second layer-2 communication networks of said at least one layer-2-connected communication network are determined, in step (b), not to be identical;

(d) transferring said message to a next router on said layer-3 communication path, when said first and second layer-2 communication networks among said at least one layer-2-connected communication network are determined, in step (b), to be identical, and said each of said portion or all of said at least one router is not a last router on said layer-3 communication path; and (e) determining that said first and second communication apparatuses can communicate with each other by using a layer-2 communication path only, when said first and second layer-2 communication networks among said at least one layer-2-connected communication network are determined, in step (b), to be identical, and said each of said portion or all of said at least one router is the last router on said layer-3 communication path, with the identical layer-2 communications network logically defining at least said plurality of said subnetworks.

37. A process according to claim 36, wherein each of said at least one router comprises at least one interface-network correspondence information storing unit for storing at least one piece of interface-network correspondence information indicating one of said at least one layer-2-connected communication network corresponding to each of at least one interface which said each of said at least one router comprises, and the operation of step (a) is performed based on said at least one piece of interface-network correspondence information.

38. A process according to claim 37, wherein said each of said at least one router comprises an interface-network correspondence setting unit for setting said at least one piece of interface-network correspondence information in said at least one interface-network correspondence information storing unit.

39. An apparatus, for use with each of at least one router provided in a layer-3 communication network comprised of a plurality of subnetworks logically defined over at least one layer-2-connected communication network, and for determining, during transfer of a message, layer-2 reachability between first and second communication apparatuses each connected to said layer-3 communication network, where said message contains a layer-3 address of said second communication apparatus, said transfer of the message is performed on a layer-3 communication path passing through a portion or all of said at least one router from the first communication apparatus to the second communication apparatus, and said layer-3 communication path is determined based on said layer-3 address of the second communication apparatus; said apparatus comprising:

a network identifying unit for identifying a first layer-2 communication network among said at least one layer-2-connected communication network to which a first interface of said each of said at least one router is connected based on interface-network correspondence information associating the first interface to said first layer-2 communication network, and a second layer-2 communication network among said at least one layer-2-connected communication network to which a second interface of said each of said at least one router is connected based on interface-network correspondence information associating the second interface to said layer-2 communication network, in a case wherein said each of at least one router receives said message through said first interface thereof, and said each of said at least one router determines said second interface to be an output interface for said message, based on said layer-3 address of the second communication apparatus connecting said first and second communication apparatuses;

a comparing unit for comparing said first layer-2 communication network and second layer-2 communication network among said at least one layer-2-connected communication network, to determine whether or not first and second layer-2 communication networks are identical;

a first determining unit for determining that said first and second communication apparatuses cannot communicate with each other by using a layer-2 communication path only, and stopping the transfer of the message, when said first and second layer-2 communication networks are determined, by said comparing unit, not to be identical;

a transferring unit for transferring said message to a next router on said layer-3 communication path, when said first and second layer-2 communication networks are determined, by said comparing unit, to be identical, and said each of said portion or all of said at least one router is not a last router on said layer-3 communication path; and a second determining unit for determining that said first and second communication apparatuses can communicate with each other by using a layer-2 communication path only, when said first and second layer-2 communication networks are determined, by said comparing unit, to be identical, and said each of said portion or all of said at least one router is the last router on said layer-3 communication path, wherein the identical layer-2 communication network logically defines at least said plurality of subnetworks.

40. An apparatus according to claim 39, wherein each of said at least one router comprises at least one interface-network correspondence information storing unit for storing at least one piece of interface-network correspondence information indicating one of said at least one layer-2-connected communication network corresponding to each of at least one interface which said each of said at least one router comprises, and the operation of the network identifying unit is performed based on said at least one piece of interface-network correspondence information.

41. An apparatus according to claim 39, wherein said each of said at least one router comprises an interface-network correspondence setting unit for setting said at least one piece of interface-network correspondence information in said at least one interface-network correspondence information storing unit.

42. A product for use with an apparatus, for use with each of at least one router provided in a layer-3 communication network comprised of a plurality of subnetworks logically defined over at least one layer-2-connected communication network, and for determining, during transfer of a message, layer-2 reachability between first and second communication apparatuses each connected to said layer-3 communication network, where said message contains a layer-3 address of said second communication apparatus, said transfer of the message is performed on a layer-3 communication path passing through a portion or all of said at least one router from the first communication apparatus to the second communication apparatus, and said layer-3 communication path is determined based on said layer-3 address of the second communication apparatus, said product, when used with said apparatus, is able to output control information which directs the apparatus to comprise:

a network identifying unit for identifying a first layer-2 communication network among said at least one layer-2-connected communication network to which a first interface of said each of said at least one router is connected based on interface-network correspondence information associating the first interface to said first layer-2 communication network, and a second layer-2 communication network among said at least one layer-2-connected communication network to which a second interface of said each of said at least one router is connected based on interface-network correspondence information associating the second interface to said second layer-2 communication network, in a case wherein said each of at least one router receives said message through said first interface thereof, and said each of said at least one router determines said second interface to be an output interface for said message, based on said layer-3 address of the second communication apparatus;

a comparing unit for comparing said first and second layer-2 communication networks among said at least one layer-2-connected communication network, to determine whether or not first and second ones of said at least one layer-2-connected communication network are identical;

a first determining unit for determining that said first and second communication apparatuses cannot communicate with each other by using a layer-2 communication path only, and stopping the transfer of the message, when said first and second ones of said at least one layer-2-connected communication network are determined, by said comparing unit, not to be identical;

a transferring unit for transferring said message to a next router on said layer-3 communication path, when said first and second layer-2 communication networks among said at least one layer-2-connected communication network are determined, by said comparing unit, to be identical, and said each of said portion or all of said at least one router is not a last router on said layer-3 communication path connecting said first and second communication apparatuses; and a second determining unit for determining that said first and second communication apparatuses can communicate with each other by using a layer-2 communication path only, when said first and second layer-2 communication network among said at least one layer-2-connected communication network are determined, by said comparing unit, to be identical, and said each of said portion or all of said at least one router is the last router on said layer-3 communication path, wherein the identical first and second layer-2 communication networks defines said plurality of subnetworks.

43. A product for use as per claim 42, wherein said product, when used with said apparatus, is able to output control information which directs said apparatus to store at least one piece of interface-network correspondence information associating the first interface or second interface with a layer-2 communication network.

44. A product for use as per claim 43, wherein said at least one piece of interface-network correspondence information is stored in a device that is accessible over said layer-3 communication network.

* * * * *